United States Patent
Handa

(10) Patent No.: US 9,341,475 B2
(45) Date of Patent: May 17, 2016

(54) GEOMAGNETISM MEASUREMENT APPARATUS

(75) Inventor: Ibuki Handa, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 707 days.

(21) Appl. No.: 13/605,296

(22) Filed: Sep. 6, 2012

(65) Prior Publication Data

US 2013/0060470 A1 Mar. 7, 2013

(30) Foreign Application Priority Data

Sep. 7, 2011 (JP) .................................. 2011-195001
Sep. 7, 2011 (JP) .................................. 2011-195002

(51) Int. Cl.
*G01V 3/00* (2006.01)
*G01C 17/38* (2006.01)

(52) U.S. Cl.
CPC ...................................... *G01C 17/38* (2013.01)

(58) Field of Classification Search
None
See application file for complete search history.

(56) References Cited

U.S. PATENT DOCUMENTS

| 7,532,991 | B2 | 5/2009 | Handa | |
| 7,613,581 | B2 * | 11/2009 | Skvortsov et al. | G01C 17/38 33/356 |
| 8,090,535 | B2 | 1/2012 | Sato et al. | |
| 8,581,935 | B2 | 11/2013 | Handa | |
| 2007/0084070 | A1 | 4/2007 | Honkura et al. | |
| 2007/0213950 | A1 | 9/2007 | Handa | |
| 2008/0071492 | A1 | 3/2008 | Skvortsov et al. | |
| 2010/0002015 | A1 | 1/2010 | Handa | |
| 2010/0324862 | A1 | 12/2010 | Sato et al. | |

FOREIGN PATENT DOCUMENTS

| CN | 1948905 A | 4/2007 |
| CN | 101023323 A | 8/2007 |
| CN | 101038329 A | 9/2007 |
| CN | 101619974 A | 1/2010 |
| CN | 101738181 A | 6/2010 |
| EP | 1 903 305 A2 | 3/2008 |
| JP | 2004-309227 A | 11/2004 |
| JP | 2007-113993 A | 5/2007 |
| JP | 2007-240270 A | 9/2007 |

(Continued)

OTHER PUBLICATIONS

1st Office Action from Chinese Patent Office issued for CN 201210331455.2, dated Nov. 3, 2014 with attached Search Report (English translation attached).

(Continued)

*Primary Examiner* — Aditya Bhat
(74) *Attorney, Agent, or Firm* — Blank Rome LLP

(57) ABSTRACT

In a geomagnetism measurement apparatus, a magnetic sensor detects magnetic data, and a storage unit stores the magnetic data sequentially output from the magnetic sensor. An ellipsoid generation unit calculates each ellipsoidal central point of first, second and third ellipsoids each of which has in the vicinity thereof a plurality of the magnetic data stored in the storage unit. An ellipsoidal central point decision unit decides whether or not a distance between respective ellipsoidal central points is equal to or less than a threshold value. A correction value generation unit calculates an ellipsoidal correction matrix for converting coordinates on an ellipsoid into coordinates on a sphere based on a coefficient matrix representing a shape of one of the first, second and third ellipsoids according to the decision result.

10 Claims, 20 Drawing Sheets

(56) References Cited

FOREIGN PATENT DOCUMENTS

| JP | 2008-76397 A | 4/2008 |
|---|---|---|
| JP | 2011164115 A | 8/2011 |

OTHER PUBLICATIONS

Partial European Search Report issued for corresponding application EP 12 00 6271, dated Sep. 10, 2014.

Vasconcelos, J.F. et al.; "A Geometric Approach to Strapdown Magnetometer Calibration in Sensor Frame"; in IFAC Workshop on Navigation, Guidance and Control of Underwater Vehicles, Killaloe, Ireland, Apr. 2008, pp. 1-11.

Foster, C.C. et al.; "Extension of a Two-Step Calibration Methodology to Include Nonorthogonal Sensor Axes"; IEEE Transactions on Aerospace and Electronic Systems, vol. 44, No. 3, Jul. 2008, pp. 1070-1078.

Alonso, Roberto et al.;"Complete Linear Attitude-Independent Magnetometer Calibration"; The Journal of the Astronautical Sciences, vol. 50, No. 4, Oct.-Dec. 2002, pp. 477-490.

C.C. Foster et al., "Extension of a Two-Step Calibration Methodology to Include Nonorthogonal Sensor Axes." IEEE Transactions on Aerospace and Electronic Systems, Vvol. 44, No. 3, pp. 1070-1078, Jul. 2008.

Japanese Office Action with English Language Translation dated Sep. 1, 2015 for corresponding Japanese Application No. 2011-195002.

* cited by examiner (A) FIRST DISTORTION DECISTON PROCESS (B) SECOND DISTORTION DECISTON PROCESS

GEOMAGNETISM MEASUREMENT APPARATUS

BACKGROUND OF THE INVENTION

1. Technical Field of the Invention

The present invention relates to a geomagnetism measurement apparatus.

2. Description of the Related Art

In recent years, there has been developed a three-dimensional magnetic sensor mounted in a portable instrument, such as a mobile phone, or a traveling object, such as a car, for detecting geomagnetism. Generally, a three-dimensional magnetic sensor includes three magnetic sensor modules for dividing a vector of a magnetic field into three directional components perpendicular to each other to detect each directional component of the vector as a scalar quantity, and outputs three-dimensional vector data having the scalar quantities output by the three magnetic sensor modules as three components.

An instrument, such as a mobile phone, having such a three-dimensional magnetic sensor mounted therein, frequently includes a part generating a magnetic field, such as various kinds of metal that can be magnetized and various electric circuits. In this case, vector data output by the three-dimensional magnetic sensor also include another vector representing a magnetic field generated by the part mounted in the instrument in addition to a vector representing geomagnetism. In order to correctly detect a value of geomagnetism, therefore, it is necessary to perform a correction process for removing another vector representing an internal magnetic field generated by the part of the instrument from the vector data output by the three-dimensional magnetic sensor. A component removed from the data output from the three-dimensional magnetic sensor to obtain a correct value of geomagnetism to be detected in the correction process is referred to as an offset.

An internal magnetic field is a magnetic field generated by the part of the instrument. The internal magnetic field has a uniform direction with respect to the instrument and uniform magnitude. When viewed from the three-dimensional magnetic sensor mounted in the instrument, the internal magnetic field is represented as a vector having a uniform indirection and uniform magnitude even if the posture of the instrument is changed.

On the other hand, geomagnetism is a magnetic field having a horizontal component directed to a north magnetic pole and a vertical component of a magnetic dip direction. The geomagnetism is a magnetic field having a uniform direction and uniform magnitude with respect to the ground. In a case where the posture of the instrument is changed with respect to the ground, therefore, the direction of the geomagnetism viewed from the instrument is also changed. That is, when viewed from the three-dimensional magnetic sensor mounted in the instrument, the geomagnetism is represented as a vector having a direction changed as the posture of the instrument is changed and having uniform magnitude.

In a case where a plurality of magnetic data are acquired in a state in which the three-dimensional magnetic sensor is rotated upward and downward and from side to side so that the posture of the three-dimensional magnetic sensor is greatly changed three-dimensionally, a plurality of coordinates indicated by a plurality of vector data sequentially output by the three-dimensional magnetic sensor are distributed in the vicinity of a spherical surface having a central point, the coordinates of which is indicated by the vector representing the internal magnetic field, and having a radius which corresponds to the magnitude of the vector representing the geomagnetism.

Patent literature 1 discloses a method of using properties of the geomagnetism and the internal magnetic field as described above to calculate a vector having a uniform direction and magnitude representing the internal magnetic field based on a plurality of magnetic data acquired in a state in which the posture of the three-dimensional magnetic sensor is changed and performing a correction process for removing the vector representing the internal magnetic field from output data as an offset to calculate a correct direction of the geomagnetism.

Meanwhile, in a case where the part of the instrument, in which the three-dimensional magnetic sensor is mounted, has a soft magnetic material, a plurality of coordinates indicated by the vector data sequentially output from the three-dimensional magnetic sensor are not distributed in the vicinity of a spherical surface but are distributed in the vicinity of an ellipsoid due to the influence of a magnetic field generated as the result that the soft magnetic material is magnetized. That is, a plurality of coordinates to be distributed in the vicinity of a spherical surface if the influence of the magnetic field generated by the soft magnetic material is not present are deviated due to the influence of a magnetic field generated by the soft magnetic material so that the coordinates expand and contract in main axis directions of an ellipsoid with the result that the coordinates are distributed in the vicinity of an ellipsoid having the same central point as the spherical surface. This phenomenon is referred to as a soft ion effect. Namely, the soft ion effect is a phenomenon in which a plurality of coordinates indicated by the vector data sequentially output from the three-dimensional magnetic sensor is distributed in the vicinity of an ellipsoid due to the influence of a magnetic field generated as the result that the soft magnetic material is magnetized as described above.

In a case where the soft iron effect is generated, it is not possible to calculate a correct direction of the geomagnetism based on the coordinates present in the vicinity of the ellipsoid. In order to calculate a correct direction of the geomagnetism, it is necessary to perform coordinate conversion for moving the coordinates on the ellipsoid to coordinates on the spherical surface, i.e. coordinate conversion for moving the coordinates on the ellipsoid so that the coordinates on the ellipsoid expand and contract in the main axis directions of the ellipsoid with the central point of the ellipsoid as the start point. A process of converting the coordinates on the ellipsoid into coordinates on the spherical surface is referred to as "ellipsoidal correction". It is possible to calculate the direction of the geomagnetism by subtracting coordinates indicated by the central point of the spherical surface from coordinates after coordinate conversion calculated by performing ellipsoidal correction.

Non-patent literature 1 and non-patent literature 2 disclose methods of calculating a coordinate conversion matrix to perform coordinate conversion for converting coordinates on an ellipsoid indicated by the vector data output from the three-dimensional magnetic sensor into coordinates on a spherical surface in a case where a soft iron effect is generated.

Specifically, a simultaneous linear equation representing that coordinates indicated by a plurality of vector data sequentially output from the three-dimensional magnetic sensor are located on an ellipsoid is set, and a matrix as a candidate of the coordinate conversion matrix is calculated based on a value presumed to be a solution of the simultaneous linear equation. After that, the matrix as the candidate of the coordinate conversion matrix is applied to an initial value of a nonlinear optimization operation to minimize a value of a nonlinear function representing an error between the coordinates after coordinate conversion and the spherical surface, and components of the matrix as the candidate of the coordinate conversion matrix are sequentially renewed to calculate an optimal value of the coordinate conversion matrix, i.e. the coordinate conversion matrix to minimize an error between the coordinates after coordinate conversion and the spherical surface.

[Patent Literature 1] Japanese Patent Application Publication No. 2007-240270

Non-Patent Literatures

[Non-Patent Literature 1] J. F. Vasconcelos, G. Elkaim, C. Silvestre, P. Oliveira, and B. Cardeira, "A Geometric Approach to Strapdown Magnetometer Calibration in Sensor Frame", in IFAC Workshop on Navigation, Guidance and Control of Underwater Vehicles, Killaloe, Ireland, April 2008

[Non-Patent Literature 2] C. C. Foster and G. H. Elkaim, "Extension of a Two-Step Calibration Methodology to Include Nonorthogonal Sensor Axes", IEEE Transactions on Aerospace and Electronic Systems, Vol. 44, No. 3, July 2008

However, the initial value of the coordinate conversion matrix calculated using the methods disclosed in non-patent literature 1 and non-patent literature 2, i.e. the matrix as the candidate of the coordinate conversion matrix, may be greatly different from a coordinate conversion matrix as a global optimal solution of a nonlinear function.

In a case where the initial value used in the nonlinear optimization operation is greatly different from the global optimal solution of the nonlinear function, there is a great possibility of an optimal solution found using the nonlinear optimization operation becoming a local optimal solution different from the global optimal solution. Consequently, there is a great possibility of failing to find a correct direction of the geomagnetism although coordinate conversion is performed with respect to the vector data output from the three-dimensional magnetic sensor using the coordinate conversion matrix calculated using the methods disclosed in non-patent literature 1 and non-patent literature 2.

There is another problem. In the coordinate conversion disclosed in non-patent literature 1, conversion to rotate the coordinates on the spherical surface is performed in addition to movement to expand and contract the coordinates in the main axis directions of the ellipsoid, and therefore, it is not possible to calculate the direction of the geomagnetism solely based on the coordinates after conversion on the spherical surface. For this reason, in non-patent literature 1, the direction and magnitude of rotation generated in the coordinate conversion are calculated using a reference magnetic field, which is a magnetic field generated from outside the instrument in which the three-dimensional magnetic sensor is mounted and is a magnetic field, the direction of which when viewed from the three-dimensional magnetic sensor is known. Also, conversion is performed to rotate the coordinates after coordinate conversion in a direction opposite to the direction of rotation generated in the coordinate conversion to specify coordinates on the spherical surface in a case where the soft iron effect is not generated.

However, the method of calculating the direction of the geomagnetism using the reference magnetic field as disclosed in non-patent literature 1 requires an environment to generate the reference magnetic field around the instrument in which the three-dimensional magnetic sensor is mounted with the result that it is not possible to apply the disclosed method to a portable instrument or a traveling object.

SUMMARY OF THE INVENTION

The present invention has been made in view of the above problems, and it is an object of the present invention to calculate a correct initial value approximate to a global optimal solution of the nonlinear function as a solution of a nonlinear optimization problem and also to calculate a coordinate conversion matrix based on the initial value, thereby calculating a correct direction of geomagnetism.

It is another object of the present invention to calculate a correct direction of geomagnetism without using a reference magnetic field in a case where a soft iron effect is generated.

It is a further object of the present invention to evaluate a shape of a three-dimensional figure indicating a distribution of coordinates of a plurality of magnetic data and to set an offset of a magnetic sensor according to results of the evaluation.

Hereinafter, the present invention will be described. Meanwhile, reference symbols of embodiments, modifications, and the accompanying drawings are parenthesized for ease of understanding, by which, however, the present invention is not limited to the embodiments.

In order to solve the above problems, a geomagnetism measurement apparatus according to the present invention comprises: a three-dimensional magnetic sensor ($60$) configured to detect magnetic components in three directions and configured to output magnetic data ($q_i$) representing a vector of three-dimension composed of the detected magnetic components; a storage unit ($100$) configured to store the magnetic data ($q_i$) sequentially output from the three-dimensional magnetic sensor; an ellipsoid generation unit (initial ellipsoid generation unit $310$) configured to calculate coordinates representing an ellipsoidal central point of each of at least two ellipsoids selected from among a first ellipsoid ($V_{xx}$), a second ellipsoid ($V_{yy}$), and a third ellipsoid ($V_{zz}$), each of which has a different shape and each of which has in the vicinity thereof coordinates indicated by a plurality of the magnetic data ($q_1$ to $q_N$) stored in the storage unit; an ellipsoidal central point decision unit (initial ellipsoidal central point decision unit $322$) configured to decide whether or not a distance between the coordinates representing the ellipsoidal central points of the at least two ellipsoids is equal to or less than a first threshold value ($\Delta c$); and a correction value generation unit (initial correction value generation unit $330$) configured to calculate an ellipsoidal correction matrix (initial ellipsoidal correction matrix $T_O$) for converting coordinates on an ellipsoid into coordinates on a sphere based on a coefficient matrix representing a shape of the at least one of the at least two ellipsoids and also configured to calculate coordinates of a central point (initial central point $c_{EO}$) based on the coordinates representing the ellipsoidal central point of the at least one ellipsoid in accordance with a decision result of the ellipsoidal central point decision unit.

In a practical form, the three-dimensional magnetic sensor is mounted in an instrument ($1$) containing a part having a soft magnetic material.

In a preferred form, the geomagnetism measurement apparatus further comprises an ellipsoidal coefficient matrix decision unit (initial ellipsoidal coefficient matrix decision unit $321$) configured to decide whether or not the coefficient matrix is a positive definite, wherein the correction value generation unit is configured to calculate the ellipsoidal correction matrix and to calculate the coordinates of the central point in accordance with a decision result of the ellipsoidal coefficient matrix decision unit as well as the decision result of the ellipsoidal central point decision unit. For example, the correction value generation unit is configured to calculate the ellipsoidal correction matrix and to calculate the coordinates of the central point in case that the ellipsoidal coefficient matrix decision unit decides that the coefficient matrix is a positive definite and in case that the ellipsoidal central point decision unit decides that a distance between the coordinates representing the ellipsoidal central points of the at least two ellipsoids is equal to or less than the first threshold value.

The present invention further includes a geomagnetism measurement method comprising: storing in a storage unit magnetic data sequentially output from a three-dimensional magnetic sensor which detects magnetic components in three directions and which outputs the magnetic data representing a vector of three-dimension composed of the detected magnetic components; calculating coordinates representing an ellipsoidal central point of each of at least two ellipsoids selected from among a first ellipsoid, a second ellipsoid, and a third ellipsoid, each of which has a different shape and each of which has in the vicinity thereof coordinates indicated by a plurality of the magnetic data sequentially stored in the storage unit; deciding whether or not a distance between the coordinates representing the ellipsoidal central points of the at least two ellipsoids is equal to or less than a first threshold value to provide a decision result; and calculating an ellipsoidal correction matrix for converting coordinates on an ellipsoid into coordinates on a sphere based on a coefficient matrix representing a shape of the at least one of the at least two ellipsoids in accordance with the decision result; and calculating coordinates of a central point based on the coordinates representing the ellipsoidal central point of the at least one ellipsoid in accordance with the decision result.

In a case where a soft iron effect is generated, coordinates indicated by a plurality of magnetic data are distributed in the vicinity of an ellipsoid. In order to calculate a direction of geomagnetism, therefore, it is necessary to perform coordinate conversion (that is, ellipsoidal correction) for converting the coordinates distributed in the vicinity of the ellipsoid into coordinates distributed in the vicinity of a spherical surface having the same central point as the ellipsoid. In order to calculate a matrix for performing such coordinate conversion, it is necessary to specify the shape of an ellipsoid having a plurality of magnetic data in the vicinity thereof and correctly expressing the distribution pattern of a plurality of magnetic data.

In a case where it is difficult to specify the shape of the ellipsoid from the distribution pattern of the coordinates indicated by the magnetic data, however, it is possible to calculate an ellipsoid having coordinates indicated by a plurality of magnetic data in the vicinity thereof in a high-handed manner, for example, even in a case where the coordinates indicated by the magnetic data are distributed in the vicinity of specific coordinates in a state in which the coordinates indicated by the magnetic data do not widely spread over a space.

Such an ellipsoid does not correctly express the distribution pattern of the magnetic data. In a case where ellipsoid correction is performed using a coordinate conversion matrix generated based on an improper ellipsoid which does not correctly represent the distribution pattern of the coordinates indicated by the magnetic data, it is difficult to calculate a correct direction of geomagnetism. In a case where it is difficult to specify the shape of the ellipsoid from the distribution pattern of the coordinates indicated by the magnetic data, therefore, it is necessary to prevent calculation of the coordinate conversion matrix for ellipsoidal correction.

According to the present invention, the initial ellipsoid generation unit calculates coordinates of a central point of each of at least two ellipsoids selected from among a first ellipsoid, second ellipsoid, and third ellipsoid, which have different shapes and coordinates indicated by a plurality of the magnetic data in the vicinity thereof. Also, the initial ellipsoidal central point decision unit decides whether or not a distance between the central points of the two ellipsoids is equal to or less than a first threshold value.

In a case where the decision result of the initial ellipsoidal central point decision unit is affirmative, both of at least two ellipsoids generated by the initial ellipsoid generation unit have the coordinates indicated by the magnetic data in the vicinity thereof, and the coordinates of the central point of each of at least two ellipsoids generated by the initial ellipsoid generation unit can be regarded as the same. In a case where decision result of the initial ellipsoidal central point decision unit is affirmative, therefore, at least two ellipsoids generated by the initial ellipsoid generation unit can be regarded as having the same shape.

In a case where the coordinates indicated by the magnetic data are distributed widely in a pattern by which it is possible to specify the shape of the ellipsoid, at least two different ellipsoids generated by the initial ellipsoid generation unit are calculated as ellipsoids having a shape that can be regarded as the same as that of an ellipsoid specified by distribution of the magnetic data.

On the other hand, in a case where it is difficult to specify the shape of the ellipsoid from the distribution pattern of the coordinates indicated by the magnetic data, the shapes of two different ellipsoids generated by the initial ellipsoid generation unit are set based on only a condition that each of the two shapes has coordinates indicated by a plurality of magnetic data in the vicinity thereof. In this case, there is a great possibility that the shapes of the at least two different ellipsoids cannot be regarded as the same, and there is a great possibility that the coordinates indicated by the central points of the at least two different ellipsoids cannot also be regarded as the same.

The geomagnetism measurement apparatus according to the present invention decides that at least two ellipsoids selected from among a first ellipsoid, second ellipsoid, and third ellipsoid can be regarded as having the same shape, and then generates an initial ellipsoidal correction matrix. In a case where it is difficult to specify the shape of the ellipsoid from the distribution pattern of the coordinates indicated by the magnetic data, therefore, it is necessary to prevent the generation of an improper initial ellipsoidal correction matrix.

In one form of the geomagnetism measurement apparatus, the ellipsoid generation unit (initial ellipsoid generation unit 310) is configured to assume that the coordinates indicated by the magnetic data stored in the storage unit probabilistically distribute in the vicinity of an ellipsoid and to assume that the ellipsoid is expressed by an ellipsoidal equation comprising a term ($x^2$) representing a square of a first axis component, a term ($y^2$) representing a square of a second axis component and a term ($z^2$) representing a square of a third axis component.

Under such assumption, the ellipsoid generation unit (initial ellipsoid generation unit 310) comprises at least two selected from among: a first ellipsoid generation unit (311) configured to calculate the coordinates representing the ellipsoidal central point ($c_{xx}$) of the first ellipsoid such as to minimize an error between a value obtained by substituting the coordinates indicated by the magnetic data into terms of the ellipsoidal equation excluding the term representing the square of the first axis component and a square value of the first axis component of the coordinates indicated by the magnetic data; a second ellipsoid generation unit (312) configured to calculate the coordinates representing the ellipsoidal central point ($c_{yy}$) of the second ellipsoid such as to minimize an error between a value obtained by substituting the coordinates indicated by the magnetic data into terms of the ellipsoidal equation excluding the term representing the square of the second axis component and a square value of the second axis component of the coordinates indicated by the magnetic data; and a third ellipsoid generation unit (313) configured to calculate the coordinates representing the ellipsoidal central point ($c_{zz}$) of the third ellipsoid such as to minimize an error between a value obtained by substituting the coordinates indicated by the magnetic data into terms of the ellipsoidal equation excluding the term representing the square of the third axis component and a square value of the third axis component of the coordinates indicated by the magnetic data.

In a case where the coordinates indicated by the magnetic data are distributed in a pattern by which it is possible to specify the shape of the ellipsoid, an ellipsoid generated by minimizing errors between the coordinates indicated by the magnetic data and the ellipsoid is set to have a shape that can be regarded as the same as that of an ellipsoid specified by distribution of the magnetic data although the errors between the coordinates indicated by the magnetic data and the ellipsoid are expressed in any form.

On the other hand, in a case where it is difficult to specify the shape of the ellipsoid from the distribution pattern of the coordinates indicated by the magnetic data, the shape of an ellipsoid generated by minimizing errors between the coordinates indicated by the magnetic data and the ellipsoid depends on an error expression form.

The present invention generates at least two ellipsoids selected from among a first ellipsoid to minimize errors between the coordinates indicated by the magnetic data and the ellipsoid when the errors are expressed based on a square value of the first axis component, a second ellipsoid to minimize errors between the coordinates indicated by the magnetic data and the ellipsoid when the errors are expressed based on a square value of the second axis component, and a third ellipsoid to minimize errors between the coordinates indicated by the magnetic data and the ellipsoid when the errors are expressed based on a square value of the third axis component. That is, the at least two ellipsoids generated by the initial ellipsoid generation unit are set to minimize errors expressed in different forms.

In a case where it is possible to specify the shape of the ellipsoid from the distribution pattern of the coordinates indicated by the magnetic data, therefore, the at least two ellipsoids generated by the initial ellipsoid generation unit are set to have a shape that can be regarded as the same as that of the ellipsoid specified by the distribution pattern of the coordinates indicated by the magnetic data.

On the other hand, in a case where it is difficult to specify the shape of the ellipsoid from the distribution pattern of the coordinates indicated by the magnetic data, the at least two ellipsoids generated by the initial ellipsoid generation unit have different shapes depending on the error expression form. In this case, the central points of the at least two ellipsoids cannot be regarded as the same coordinates, and the initial ellipsoidal correction matrix is not generated.

According to the present invention, therefore, it is possible to prevent the generation of an improper initial ellipsoidal correction matrix in a case where it is difficult to specify the shape of the ellipsoid from the distribution pattern of the coordinates indicated by the magnetic data as described above.

In an expedient from, the geomagnetism measurement apparatus further comprises: an optimal ellipsoidal correction value generation unit (400) configured to set a variable vector (c) of three-dimension indicating a start point and a first variable vector ($q_i$–c) of three-dimension indicating the coordinates of the magnetic data ($q_i$) relative to the start point, and configured to set a variable matrix (T) and a second variable vector ($s_X$–c) of three-dimension obtained by converting the first variable vector using the variable matrix so that coordinates of the second variable vector are defined as data ($s_{Xi}$) after conversion, wherein the optimal ellipsoidal correction value generation unit is further configured to set an ellipsoidal optimization function ($f_{EL}$) which represents an error between the coordinates indicated by a plurality of the data ($S_{X1}$ to $s_{XN}$) after conversion and a spherical surface having a center corresponding to the start point indicated by the variable vector and which contains components of the variable matrix and components of the variable vector as variables, and wherein the optimal ellipsoidal correction value generation unit is configured to apply components of the ellipsoidal correction matrix ($T_O$) and the coordinates of the central point ($c_{EO}$) calculated by the correction value generation unit (330) to the variables of the ellipsoidal optimization function as initial values, and then configured to sequentially update the variables of the ellipsoidal optimization function so as to calculate an optimal ellipsoidal correction matrix ($T_{OP}$) for converting coordinates on an ellipsoid to coordinates on a sphere and also to calculate coordinates indicating an optimal central point ($c_{EOP}$) as a solution which minimizes the ellipsoidal optimization function; and a geomagnetism calculation unit (600) configured to convert a vector ($q_i$–$c_{EOP}$) of three-dimension which represents coordinates indicated by the magnetic data ($q_i$) output from the three-dimensional magnetic sensor relative to the coordinates indicated by the optimal central point using the optimal ellipsoidal correction matrix so as to calculate a direction of the geomagnetism ($B_g$) based on a converted vector ($s_i$–$c_{EOP}$).

According to the present invention, components of the (initial) ellipsoidal correction matrix ($T_O$) and the three axis coordinates indicated by the (initial) central point ($c_{EO}$) are applied as initial values of variables of the ellipsoidal optimization function ($f_{EL}$).

As previously described, the initial ellipsoidal correction matrix and the initial central point are values generated based on at least two ellipsoids generated by the initial ellipsoid generation unit and set based on an ellipsoid correctly expressing the distribution pattern of the coordinates indicated by the magnetic data.

On the other hand, a nonlinear optimization operation to minimize the ellipsoidal optimization function is an operation for calculating an ellipsoid to minimize errors between the ellipsoid and the coordinates indicated by the magnetic data. That is, a global optimal solution of the ellipsoidal optimization function becomes a matrix representing the shape of an ellipsoid most correctly expressing the distribution pattern of the coordinates indicated by the magnetic data and a central point of the ellipsoid. Consequently, the initial ellipsoidal correction matrix and the initial central point are appropriate values approximate to the global optimal solution of the ellipsoidal optimization function.

That is, the geomagnetism measurement apparatus according to the present invention prevents the nonlinear optimization operation from inadvertently calculating a local optimal solution by applying the correct values approximate to the global optimal solution as an initial value of the nonlinear optimization operation, and therefore, it is possible to calculate a correct direction of geomagnetism.

In another expedient form, the geomagnetism measurement apparatus may comprise a geomagnetism calculation unit (600) configured to convert a vector ($q_i-c_{EO}$) of three-dimension which represents coordinates indicated by the magnetic data ($q_i$) output from the three-dimensional magnetic sensor relative to the coordinates of the (initial) central point ($c_{EO}$) generated by the correction value generation unit using the (initial) ellipsoidal correction matrix ($T_O$) also generated by the correction value generation unit so as to calculate a direction of the geomagnetism ($B_g$) according to a converted vector ($s_i-c_{EO}$).

According to the present invention, it is possible to perform ellipsoidal correction through simple calculation and to reduce computational load involved in calculating the direction of the geomagnetism.

In another aspect of the invention, a geomagnetism measurement apparatus comprises: a three-dimensional magnetic sensor configured to detect magnetic components in three directions and configured to output magnetic data ($q_i$) representing a vector of three-dimension composed of the detected magnetic components; a storage unit configured to store the magnetic data ($q_i$) sequentially output from the three-dimensional magnetic sensor; and an optimal ellipsoidal correction value generation unit (400) configured to assume that magnitude of the geomagnetism is unknown, the optimal ellipsoidal correction value generation unit being configured to set a variable vector (c) of three-dimension indicating a start point and a first variable vector ($q_i-c$) of three-dimension indicating the coordinates of the magnetic data relative to the start point, the optimal ellipsoidal correction value generation unit being configured to set a variable matrix (T) and a second variable vector ($s_X-c$) of three-dimension obtained by converting the first variable vector using the variable matrix so that coordinates of the second variable vector are defined as data ($s_{Xi}$) after conversion, the optimal ellipsoidal correction value generation unit being further configured to set an ellipsoidal optimization function ($f_{EL}$) which represents an error between the coordinates indicated by a plurality of the data ($s_{X1}$ to $s_{XN}$) after conversion and a spherical surface having a center corresponding to the start point indicated by the variable vector and which contains components of the variable matrix and components of the variable vector as variables, the optimal ellipsoidal correction value generation unit being configured to sequentially update the variables of the ellipsoidal optimization function so as to calculate an optimal ellipsoidal correction matrix ($T_{OP}$) for converting coordinates on an ellipsoid to coordinates on a sphere and also to calculate coordinates indicating an optimal central point ($c_{EOP}$) as a solution which minimizes the ellipsoidal optimization function, wherein the variable matrix (T) is set to a symmetric matrix.

In a practical form, the three-dimensional magnetic sensor is mounted in an instrument containing a part having a soft magnetic material.

In an expedient form, the optimal ellipsoidal correction value generation unit is configured to apply components of an initial ellipsoidal correction matrix and coordinates of an initial central point to the variables of the ellipsoidal optimization function before the optimal ellipsoidal correction value generation unit sequentially updates the variables of the ellipsoidal optimization function.

In a case where the instrument in which the three-dimensional magnetic sensor is mounted includes a mechanical or electronic part having a soft magnetic material, a soft iron effect is generated. For this reason, coordinates indicated by a plurality of magnetic data output from the three-dimensional magnetic sensor are distributed in the vicinity of an ellipsoid. In this case, a vector indicating coordinates of a central point of the ellipsoid represents an offset of the three-dimensional magnetic sensor. Consequently, it is possible to calculate a correct direction of geomagnetism by performing ellipsoid correction with respect to the coordinates indicated by the magnetic data using a coordinate conversion matrix for expanding and contracting coordinates on the ellipsoid in the main axis directions of the ellipsoid to convert the coordinates on the ellipsoid into coordinates on a sphere.

According to the present invention, the ellipsoidal optimization function having components of the variable matrix and elements of the variable vector as variables is minimized to calculate the optimal ellipsoidal correction matrix and the optimal central point.

The variable matrix is a symmetric matrix of 3×3 used to convert coordinates of a three-dimensional vector. Generally, the symmetric matrix of 3×3 has three eigenvectors perpendicular to each other and three eigenvalues corresponding to the three eigenvectors. Also, in a case in which a three axis vector is converted using the symmetric matrix, the vector after conversion becomes equal to a vector obtained by expanding and contracting the vector before conversion by the eigenvalues corresponding to the three eigenvectors of the symmetric matrix in the directions of the three eigenvectors.

The optimal ellipsoidal correction matrix is a variable matrix when the ellipsoidal optimization function is minimized, and therefore, the optimal ellipsoidal correction matrix is a symmetric matrix of 3×3. In a case in which the three axis vector is converted using the optimal ellipsoidal correction matrix, therefore, the vector after conversion becomes equal to a vector obtained by expanding and contracting the vector before conversion by the eigenvalues in the directions of the three eigenvectors of the optimal ellipsoidal correction matrix. That is, the optimal ellipsoidal correction matrix is a matrix for expanding and contracting coordinates on an ellipsoid having main axes arranged in the same directions as the respective eigenvectors of the optimal ellipsoidal correction matrix in three main axis directions of the ellipsoid to represent coordinate conversion for converting the coordinates on the ellipsoid into coordinates on a sphere. In a case in which a vector is converted using such an optimal ellipsoidal correction matrix, only conversion for expanding and contracting the vector in the three axis directions of the ellipsoid is performed, and conversion for rotating the vector is not performed. Consequently, it is possible to calculate a correct direction of geomagnetism by using the optimal ellipsoidal correction matrix in the ellipsoidal correction.

Also, according to the present invention, the ellipsoidal optimization function representing errors between the coordinates indicated by the data after conversion obtained by converting the coordinates indicated by the magnetic data using the variable matrix and the spherical surface is minimized to calculate the optimal ellipsoidal correction matrix and the optimal central point.

In a case in which the ellipsoidal optimization function is minimized, the errors between the coordinates indicated by the data after conversion converted by the variable matrix and the spherical surface are minimized. The optimal ellipsoidal correction matrix is a variable matrix when the ellipsoidal optimization function is minimized, and therefore, the optimal ellipsoidal correction matrix represents a matrix for converting coordinates indicated by a plurality of magnetic data into a plurality of coordinates having minimum errors with respect to the spherical surface.

As previously described, the optimal ellipsoidal correction matrix is a matrix for converting coordinates on the ellipsoid into coordinates on the spherical surface. In a case in which the errors between the coordinates after conversion and the spherical surface are minimized, therefore, the errors between the coordinates before conversion and the spherical surface are also minimized. That is, it is possible to specify an ellipsoid to minimize errors between the ellipsoid and the coordinates indicated by the magnetic data (that is, an ellipsoid most correctly expressing the distribution pattern of the coordinates indicated by the magnetic data) using the optimal ellipsoidal correction matrix. Also, a vector indicating coordinates of a central point (an optimal central point) of the ellipsoid specified by the optimal ellipsoidal correction matrix becomes a vector correctly representing the offset of the three-dimensional magnetic sensor. Ellipsoidal correction is performed by using such an optimal ellipsoidal correction matrix and an optimal central point expressing an ellipsoid correctly capturing the distribution pattern of the coordinates indicated by the magnetic data, and therefore, it is possible to calculate a correct direction of geomagnetism.

In an expedient form, the geomagnetism measurement apparatus may further comprise: an offset adoption unit (610) configured to adopt the coordinates indicated by the optimal central point ($c_{EOP}$) as an offset ($c_{OFF}$) of the three-dimensional magnetic sensor and to adopt the optimal ellipsoidal correction matrix ($T_{OP}$) as an ellipsoidal correction matrix ($T_E$), and configured to output the offset ($c_{OFF}$) and the ellipsoidal correction matrix ($T_E$) when the optimal ellipsoidal correction value generation unit calculates the optimal ellipsoidal correction matrix ($T_{OP}$) and the coordinates of the optimal central point ($c_{EOP}$); and a geomagnetic vector calculation unit (620) configured to convert the vector ($q_i$–$c_{OFF}$) of three-dimension which represents the coordinates indicated by the magnetic data ($q_i$) output from the three-dimensional magnetic sensor relative to the coordinates indicated by the offset using the ellipsoidal correction matrix so as to calculate a direction of the geomagnetism ($B_g$) according to a converted vector ($s_i$–$c_{OFF}$).

According to the present invention, ellipsoidal correction is performed by adopting the three axis coordinates indicated by the optimal central point as the offset and, in addition, adopting the optimal ellipsoidal correction matrix as the ellipsoidal correction matrix. As previously described, the optimal ellipsoidal correction matrix is a matrix specifying an ellipsoid correctly representing the distribution pattern of coordinates indicated by a plurality of magnetic data, and the optimal central point is a vector correctly representing an offset of the three-dimensional magnetic sensor. Consequently, it is possible to calculate a correct direction of geomagnetism by performing ellipsoidal correction using the optimal ellipsoidal correction matrix and the optimal central point.

In addition, there is provided a geomagnetism measurement method comprising: storing in a storage unit magnetic data ($q_i$) sequentially output from a three-dimensional magnetic sensor which detects magnetic components in three directions and which outputs the magnetic data ($q_i$) representing a vector of three-dimension composed of the detected magnetic components; assuming that magnitude of the geomagnetism is unknown; setting a variable vector (c) of three-dimension indicating a start point and a first variable vector ($q_i$–c) of three-dimension indicating the coordinates of the magnetic data relative to the start point; setting a variable matrix (T) and a second variable vector ($s_X$–c) of three-dimension obtained by converting the first variable vector using the variable matrix so that coordinates of the second variable vector are defined as data ($s_{Xi}$) after conversion; setting an ellipsoidal optimization function ($f_{EL}$) which represents an error between the coordinates indicated by a plurality of the data ($s_{X1}$ to $s_{XN}$) after conversion and a spherical surface having a center corresponding to the start point indicated by the variable vector and which contains components of the variable matrix and components of the variable vector as variables; and sequentially updating the variables of the ellipsoidal optimization function so as to calculate an optimal ellipsoidal correction matrix ($T_{OP}$) for converting coordinates on an ellipsoid to coordinates on a sphere and also to calculate coordinates indicating an optimal central point ($c_{EOP}$) as a solution which minimizes the ellipsoidal optimization function, wherein the variable matrix (T) is a symmetric matrix.

According to the present invention, ellipsoidal correction is performed by using the optimal ellipsoidal correction matrix and the optimal central point, and therefore, it is possible to calculate a correct direction of geomagnetism.

Also, as a concrete embodiment of the present invention, the geomagnetism measurement apparatus may further include: a central point calculation unit (800) for, on the assumption that three axis coordinates indicated by the magnetic data ($q_1$ to $q_N$) are probabilistically distributed in the vicinity of a spherical surface (S) for central point calculation, calculating three axis coordinates indicated by a central point ($c_S$) of the spherical surface (S) for central point calculation; and a distortion decision unit (900) for, on the assumption that a plurality of input three axis coordinates is probabilistically distributed in the vicinity of the surface of a three-dimensional figure (SD) having a shape distorting from a spherical surface ($S_2$) for distortion decision, for calculating a distortion evaluation value ($g_D(E)$) indicating to what extent the shape of the three-dimensional figure (SD) and the shape of the spherical surface ($S_2$) for distortion decision are different from each other and deciding whether or not the distortion evaluation value ($g_D(E)$) is equal to or less than an allowable distortion value ($\delta_O$). In a case in which the decision result of the distortion decision unit (900) is negative when the three axis coordinates indicated by the magnetic data ($q_1$ to $q_N$) are applied as the input coordinates, the optimal ellipsoidal correction value generation unit (400) in the ellipsoidal correction unit (200) may calculate the optimal ellipsoidal correction matrix ($T_{OP}$) and the three axis coordinates indicated by the optimal central point ($c_{EOP}$), and the offset adoption unit (610a) may adopt the three axis coordinates indicated by the optimal central point ($c_{EOP}$) as the offset ($c_{OFF}$) and, in addition, may adopt the optimal ellipsoidal correction matrix ($T_{O2}$) as the ellipsoidal correction matrix ($T_E$). In a case in which the decision result of the distortion decision unit (900) is affirmative, the offset adoption unit (610a) may adopt the three axis coordinates indicated by the central point ($c_S$) of the spherical surface (S) for central point calculation as the offset ($c_{OFF}$) and, in addition, may adopt a unit matrix (I) as the ellipsoidal correction matrix ($T_E$).

According to the present invention, the distortion decision unit calculates a distortion evaluation value indicating to what extent the shape of the three-dimensional figure having the three axis coordinates indicated by the magnetic data output by the three-dimensional magnetic sensor in the vicinity of the surface thereof and the shape of the spherical surface for distortion decision are different from each other.

In a case in which the decision result of the distortion decision unit is affirmative, i.e. in a case in which the distortion evaluation value is equal to or less than the allowable distortion value, the shape of the three-dimensional figure and the shape of the spherical surface for distortion decision can be regarded as the same. In this case, it is possible to set the spherical surface for central point calculation so that the spherical surface for central point calculation has the three axis coordinates indicated by the magnetic data in the vicinity thereof, and therefore, it is possible to adopt a vector indicating the coordinates of central point of the spherical surface for central point calculation calculated by the central point calculation unit as the offset. Also, in this case, the distribution pattern of the coordinates indicated by the magnetic data does not form an ellipsoid, and therefore, a soft iron effect is not generated. Consequently, it is possible for the geomagnetism measurement apparatus to calculate a correct direction of geomagnetism without using the optimal ellipsoidal correction matrix and the coordinates of the optimal central point.

In this way, it is possible for the geomagnetism measurement apparatus according to the present invention, including the distortion decision unit, to decide whether or not a soft iron effect is generated. In a case in which the soft iron effect is not generated, therefore, it is possible to calculate the direction of the geomagnetism through simple calculation without calculating the optimal ellipsoidal correction matrix and the coordinates of the optimal central point, thereby reducing computational load.

On the other hand, in a case where the decision result of the distortion decision unit is negative, i.e. in a case in which the distortion evaluation value is greater than the allowable distortion value, the three-dimensional figure has a distorted shape different from the shape of the sphere. As a result, a soft iron effect is generated, and it is assumed that the coordinates indicated by the magnetic data are distributed in the vicinity of an ellipsoid. In this case, the geomagnetism measurement apparatus calculates the optimal ellipsoidal correction matrix and the coordinates of the optimal central point, and converts the coordinates indicated by the magnetic data into coordinates indicated by magnetic data after conversion based thereon, thereby calculating a correct direction of geomagnetism.

As described above, it is possible for the geomagnetism measurement apparatus according to the present invention, including the distortion decision unit, to decide whether or not a soft iron effect is generated. Both in a case in which the soft iron effect is generated and in a case in which the soft iron effect is not generated, it is possible to calculate a correct direction of geomagnetism. Also, in a case in which the soft iron effect is not generated, it is possible to reduce the amount of computation.

Also, as a further concrete embodiment of the present invention, the geomagnetism measurement apparatus may further include an ellipsoid to spherical surface conversion unit (500) for converting a three-dimensional vector representing the three axis coordinates indicated by the magnetic data ($q_1$ to $q_N$) from the three axis coordinates indicated by the optimal central point ($c_{EOP}$) using the optimal ellipsoidal correction matrix ($T_{OP}$) to calculate a plurality of magnetic data ($s_1$ to $s_N$) after conversion. In a case in which the decision result of the distortion decision unit (900) is negative when the three axis coordinates indicated by the magnetic data ($q_1$ to $q_N$) are applied as the input coordinates, the ellipsoid to spherical surface conversion unit (500) may supply three axis coordinates indicated by the magnetic data ($s_1$ to $s_N$) after conversion to the distortion decision unit (900) as the input coordinates. In a case in which the decision result of the distortion decision unit (900) is affirmative when the three axis coordinates indicated by the magnetic data ($s_1$ to $s_N$) after conversion are applied as the input coordinates, the offset adoption unit (610) may adopt the three axis coordinates indicated by the optimal central point ($c_{EOP}$) as the offset ($c_{OFF}$) and, in addition, may adopt the optimal ellipsoidal correction matrix ($T_{OP}$) as the ellipsoidal correction matrix ($T_E$). In a case in which the decision result of the distortion decision unit (900) is negative, the offset and the ellipsoidal correction matrix ($T_E$) may not be adopted.

An external object generating a magnetic field may be present around the instrument, in which the three-dimensional magnetic sensor is mounted, and the three-dimensional magnetic sensor may detect the magnetic field (external magnetic field) generated by the object. In a case in which the external magnetic field is a nonuniform magnetic field, the direction and magnitude of which are changed depending upon a relative positional relationship between the object and the three-dimensional magnetic sensor, coordinates indicated by a plurality of magnetic data output by the three-dimensional magnetic sensor are distributed in the vicinity of the surface of a three-dimensional figure having a distorted shape that is different from both a sphere and an ellipsoid.

In this case, the coordinates indicated by the magnetic data are not distributed in the vicinity of the spherical surface or in the vicinity of the ellipsoid. In this case, therefore, a vector indicating the coordinates of the central point of the spherical surface or the ellipsoid calculated on the assumption that the coordinates indicated by the magnetic data are distributed in the vicinity of the spherical surface or in the vicinity of the ellipsoid cannot be adopted as the offset.

According to the present invention, in a case in which the three-dimensional figure having the coordinates indicated by the magnetic data in the vicinity thereof has a distorted shape different from the shape of the spherical surface, the ellipsoid to spherical surface conversion unit calculates a plurality of magnetic data after conversion from the coordinates indicated by the magnetic data, and then the distortion decision unit calculates a distortion evaluation value based on coordinates indicated by the magnetic data after conversion and decides whether or not the distortion evaluation value is equal to or less than the allowable distortion value.

In a case in which the decision result of the distortion decision unit is affirmative, the coordinates indicated by the magnetic data after conversion are distributed in the vicinity of the spherical surface, and therefore, the coordinates indicated by the magnetic data are distributed in the vicinity of the ellipsoid. That is, in a case in which the decision result of the distortion decision unit is affirmative when the coordinates indicated by the magnetic data after conversion are applied as the input coordinates, a nonuniform external magnetic field is not present, and a soft iron effect alone is present. In this case, it is possible for the geomagnetism measurement apparatus to calculate a correct direction of geomagnetism based on the coordinates indicated by the magnetic data after conversion and the coordinates indicated by the optimal central point.

On the other hand, in a case in which the decision result of the distortion decision unit is negative, the coordinates indicated by the magnetic data after conversion are distributed in the vicinity of the surface of a s three-dimensional figure having a distorted shape that is different from both the sphere and ellipsoid. That is, in a case in which the decision result of the distortion decision unit is negative when the coordinates indicated by the magnetic data after conversion are applied as the input coordinates, a nonuniform external magnetic field is present, and it is not possible to calculate a correct offset. In this case, the geomagnetism measurement apparatus prevents calculation of the offset.

Further, the present invention includes a geomagnetism measurement method (FIG. 19) comprising: (S2) storing in a storage unit a plurality of magnetic data sequentially output from a three-dimensional magnetic sensor; (S4) assuming a sphere having a surface which contains in the vicinity thereof coordinates represented by the plurality of the magnetic data and calculating coordinates representing a central point of the sphere; (S5) assuming a first three-dimensional figure having a surface which contains in the vicinity thereof the coordinates represented by the plurality of the magnetic data and determining whether or not a shape of the first three-dimensional figure approximates a sphere; (S10) adopting the calculated coordinates of the central point as an offset of the three-dimensional magnetic sensor, when it is determined that the shape of the first three-dimensional figure approximates a sphere; (S7) calculating an optimum ellipsoidal correction matrix capable of converting coordinates on an ellipsoid into coordinates on a sphere and calculating coordinates of an optimum central point, when it is determined that the shape of the first three-dimensional figure does not approximate a sphere; (S8) converting the coordinates represented by the plurality of the magnetic data by means of the optimum ellipsoidal correction matrix and the coordinates of the optimum central point to thereby provide converted coordinates; (S9) assuming a second three-dimensional figure having a surface which contains in the vicinity thereof the converted coordinates and determining whether or not a shape of the second three-dimensional figure approximates a sphere; and (S10) adopting the coordinates of the optimum central point as an offset of the three-dimensional magnetic sensor, when it is determined that the shape of the second three-dimensional figure approximates a sphere.

In a preferred form, the geomagnetism measurement method further comprises: calculating coordinates indicating an initial central point of an initial ellipsoid such that the coordinates of the plurality of the magnetic data distribute in the vicinity of a surface of the initial ellipsoid, and also calculating an initial ellipsoidal correction matrix capable of converting coordinates on the initial ellipsoid into coordinates on a sphere when it is determined that the shape of the first three-dimensional figure does not approximate a sphere, wherein the optimum ellipsoidal correction matrix and the coordinates of the optimum central point are calculated based on the initial ellipsoidal correction matrix and the initial central point.

In a preferred form, the geomagnetism measurement method further comprises: evaluating a degree of difference of the shape of the first three-dimensional figure from a sphere so as to determine whether or not the shape of the first three-dimensional figure approximates a sphere; and evaluating a degree of difference of the shape of the second three-dimensional figure from a sphere so as to determine whether or not the shape of the second three-dimensional figure approximates a sphere.

In this way, the geomagnetism measurement apparatus and method according to the present invention decide whether the distribution pattern of the coordinates indicated by the magnetic data corresponds to any one selected from among a spherical surface, an ellipsoid, and a three-dimensional figure having a distorted shape different from both the spherical surface and ellipsoid.

In a case in which it is determined that the coordinates indicated by the magnetic data are distributed in the vicinity of a three-dimensional figure having a distorted shape that is different from both the spherical surface and ellipsoid, the geomagnetism measurement apparatus prevents calculation of the offset. That is, it is possible for the geomagnetism measurement apparatus according to the present invention to prevent calculation of an incorrect offset based on a plurality of magnetic data influenced by a nonuniform external magnetic field.

On the other hand, in a case in which it is determined that the distribution pattern of the coordinates indicated by the magnetic data corresponds to an ellipsoid, i.e. in a case in which it is determined that a nonuniform external magnetic field is not present, and an internal soft iron effect is generated, it is possible for the geomagnetism measurement apparatus according to the present invention to calculate a correct direction of geomagnetism by adopting the coordinates indicating the central point of the ellipsoid as the offset.

BRIEF DESCRIPTION OF THE DRAWINGS

FIGS. 18(A) and 11(B) are conceptual views illustrating the external magnetic field measured by the three-dimensional magnetic sensor according to the second embodiment of the present invention.

DETAILED DESCRIPTION OF THE INVENTION

A. First Embodiment

Hereinafter, an embodiment of the present invention will be described.

1. OUTLINE OF MAGNETIC FIELD DETECTED BY THREE-DIMENSIONAL MAGNETIC SENSOR

In this embodiment, it is assumed that a magnetic field detected by a three-dimensional magnetic sensor includes a magnetic field generated by a part constituting an instrument in which the three-dimensional magnetic sensor is mounted, i.e. an internal magnetic field, and a magnetized magnetic field generated as a soft magnetic material constituting the part of the instrument is magnetized by a magnetic field from the outside of the instrument in addition to the geomagnetism to be detected.

Hereinafter, the outlines of these three kinds of magnetic fields assumed in this embodiment and vector data output from the three-dimensional magnetic sensor in a case where these magnetic fields are detected by the three-dimensional magnetic sensor will be described with reference to FIGS. 1 to 5.

Figure 1:
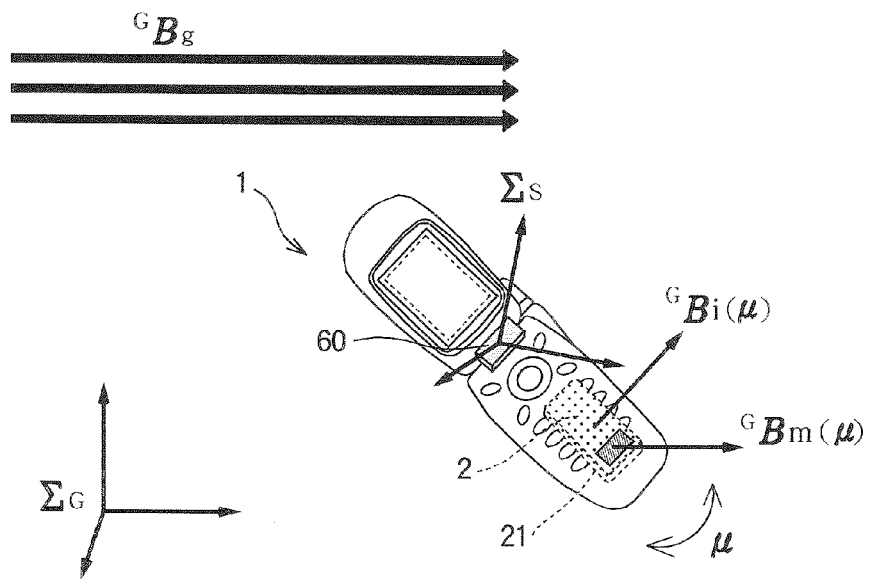
FIG. 1 is a conceptual view illustrating the outline of a magnetic field measured by a three-dimensional magnetic sensor according to an embodiment of the present invention.

FIG. 1 is a view illustrating geomagnetism $B_g$ to be measured, an internal magnetic field $B_i$ generated by a mechanical or electronic part 2 constituting an instrument 1 in which a three-dimensional magnetic sensor is mounted, and a magnetized magnetic field $B_m$ generated by a soft magnetic material 21 constituting the part 2.

The geomagnetism $B_g$ is a magnetic field, having a uniform direction and magnitude, directed to a north magnetic pole. Strictly speaking, the direction and magnitude of the geomagnetism $B_g$ are different depending upon regions. For example, in a case where movement distance is not large, e.g. movement between different cities does not occur, however, the geomagnetism $B_g$ has a uniform direction and magnitude. In the embodiments of the present invention, the magnitude of the geomagnetism $B_g$ is treated as an unknown parameter. As described later, the magnitude of the geomagnetism $B_g$ can be calculated based on the determinant of the optimal ellipsoidal correction matrix $T_{OP}$.

The internal magnetic field $B_i$ is a magnetic field generated by the part 2 constituting the instrument 1. The internal magnetic field $B_i$ has a uniform direction and magnitude when viewed from the instrument 1. That is, the internal magnetic field $B_i$ is detected by the three-dimensional magnetic sensor 60 as a magnetic field having a uniform direction and magnitude irrespective of how the posture of the instrument 1 is changed.

The magnetized magnetic field $B_m$ is a magnetic field generated by a soft magnetic material 21 as the soft magnetic material 21 is magnetized by a magnetic field (that is, geomagnetism $B_g$) generated from an object outside the instrument 1. Therefore, the direction and magnitude of the magnetized magnetic field $B_m$ are changed depending upon the direction and magnitude of the geomagnetism $B_g$ and the material, size, and shape of the soft magnetic material 21.

For the convenience of description, a ground coordinate system $\Sigma_G$ and a sensor coordinate system $\Sigma_S$ are introduced as shown in FIG. 1. A superscript G attached to the left upper part of each vector described in FIG. 1 means that the vector is expressed in the ground coordinate system $\Sigma_G$.

The ground coordinate system $\Sigma_G$ is a coordinate system fixed to the ground. Specifically, the ground coordinate system $\Sigma_G$ is a coordinate system having three directions perpendicular to each other, e.g. the east, the north, and the upper direction perpendicular thereto, as an x axis, y axis, and z axis with an arbitrary point on the ground as the origin.

The sensor coordinate system $\Sigma_S$ is a coordinate system fixed to the three-dimensional magnetic sensor 60. Specifically, the sensor coordinate system $\Sigma_S$ is a coordinate system provided to plot values output from three sensor modules constituting the three-dimensional magnetic sensor 60 on an x axis (first axis), y axis (second axis), and z axis (third axis), respectively. That is, magnetic data output by the three-dimensional magnetic sensor 60 are expressed as vector data of the sensor coordinate system $\Sigma_S$. Meanwhile, a posture μ shown in FIG. 1 indicates the direction of each axis of the sensor coordinate system $\Sigma_S$ in the ground coordinate system $\Sigma_G$ (that is, the direction of the three-dimensional magnetic sensor 60 in the ground coordinate system $\Sigma_G$).

Hereinafter, a description will be given of how the directions of the internal magnetic field $B_i$ and the magnetized magnetic field $B_m$ are changed in the ground coordinate system $\Sigma_G$ and the sensor coordinate system $\Sigma_S$ in a case where the posture μ is changed.

First, how the internal magnetic field $B_i$ and the geomagnetism $B_g$ appear in the ground coordinate system $\Sigma_G$ and the sensor coordinate system $\Sigma_S$ will be described with reference to FIGS. 2 and 3. Meanwhile, in FIGS. 2 and 3, it is assumed that the instrument 1 does not include a soft magnetic material 21, and a magnetized magnetic field $B_m$ is not present for simplicity.

Figure 2:
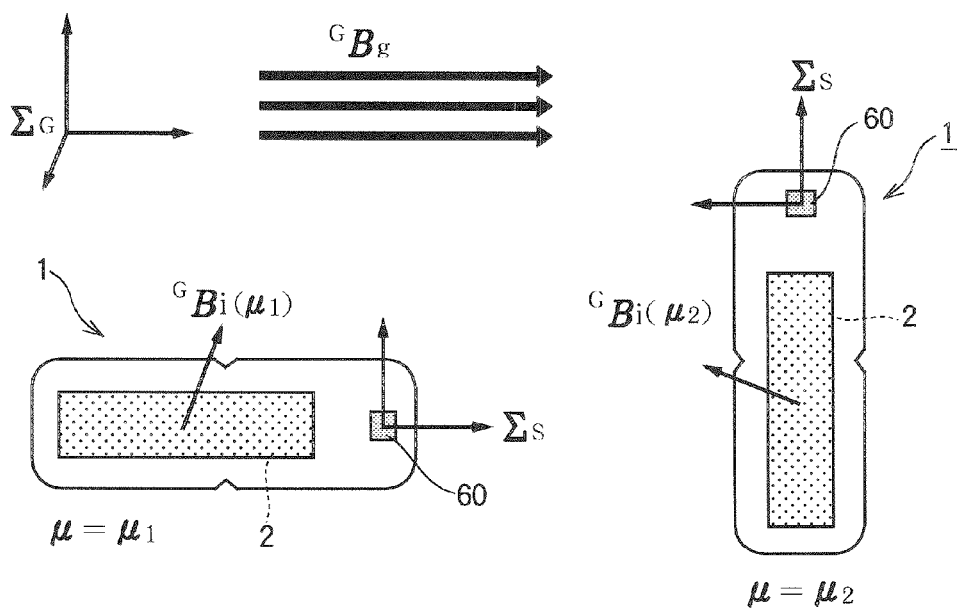
FIG. 2 is a conceptual view illustrating geomagnetism and an internal magnetic field measured by the three-dimensional magnetic sensor according to the embodiment of the present invention.

FIG. 2 is a view showing the direction and magnitude of the internal magnetic field $B_i$ and the geomagnetism $B_g$ in the ground coordinate system $\Sigma_G$. In a case where the posture μ of the instrument 1 is changed from a posture $\mu_1$ to a posture $\mu_2$, the magnitude of the internal magnetic field $^GB_i$ is uniform, but the direction of the internal magnetic field $^GB_i$ is changed according to the change of the posture μ. On the other hand, the direction and magnitude of the geomagnetism $^GB_g$ are uniform.

Figure 3:
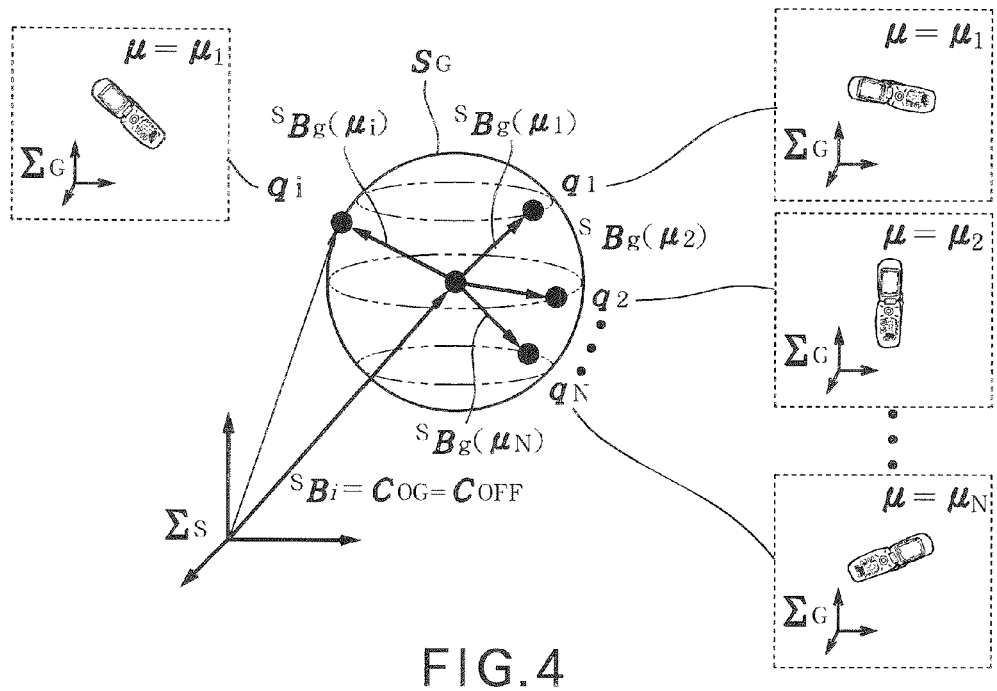
FIG. 3 is a conceptual view illustrating geomagnetism and an internal magnetic field measured by the three-dimensional magnetic sensor according to the embodiment of the present invention.

FIG. 3 is a view showing the direction and magnitude of the internal magnetic field $B_i$ and the geomagnetism $B_g$ in the sensor coordinate system $\Sigma_S$. Specifically, FIG. 3 is a view showing that, in a case where the posture μ of the instrument 1 is changed into $\mu_1$ to $\mu_N$ to measure a magnetic field, coordinates indicated by N magnetic data $q_1$ to $q_N$ output by the three-dimensional magnetic sensor 60 are plotted in sensor coordinate system $\Sigma_S$ (N being a natural number, equal to or greater than 9, indicating a prescribed number of times for measuring magnetic data necessary to derive a high-precision offset). Here, a superscript S attached to the left upper part of each vector described in FIG. 3 means that the vector is expressed in the sensor coordinate system $\Sigma_S$.

In the sensor coordinate system $\Sigma_S$, the internal magnetic field $B_i$ is expressed as a vector ${}^S B_i$ having a uniform direction and magnitude (a vector directed from the origin to a central point $c_{OG}$ of the sensor coordinate system $\Sigma_S$). On the other hand, the magnitude of the geomagnetism $B_g$ is uniform, but the direction of the geomagnetism $B_g$ is changed according to the posture μ of the three-dimensional magnetic sensor 60. That is, the geomagnetism $B_g$ is expressed as a vector ${}^S B_g(\mu)$ having a direction depending on the posture μ of the instrument 1 and uniform magnitude. In a case where the posture μ is changed in a state in which the start point of the vector ${}^S B_g(\mu)$ is located at the central point $c_{OG}$, therefore, the end point of the vector ${}^S B_g(\mu)$ indicates coordinates on a spherical surface $S_G$ having a central point corresponding to the central point $c_{OG}$ and a radius corresponding to the magnitude of the geomagnetism $B_g$.

Since the coordinates indicated by the magnetic data $q_1$ to $q_N$ represent the sum of the internal magnetic field ${}^S B_i$ and the geomagnetism ${}^S B_g$ in the sensor coordinate system $\Sigma_S$, the coordinates indicated by the magnetic data $q_1$ to $q_N$ are distributed on the spherical surface $S_G$. Meanwhile, a measurement value of the three-dimensional magnetic sensor 60 has a measurement error. Strictly speaking, therefore, the coordinates indicated by the magnetic data $q_1$ to $q_N$ are probably distributed in the vicinity of the spherical surface $S_G$.

Consequently, it is possible to calculate the direction and magnitude of the geomagnetism ${}^S B_g$ in the sensor coordinate system $\Sigma_S$ by subtracting the internal magnetic field ${}^S B_i$ from coordinates indicated by magnetic data $q_i$.

A process of subtracting the coordinates indicated by the central point $c_{OG}$ of the spherical surface $S_G$ representing the internal magnetic field $B_i$ output by the three-dimensional magnetic sensor 60 from the coordinates indicated by the magnetic data $q_i$ to obtain a correct direction of the geomagnetism $B_g$ to be detected is referred to as a correction process.

Also, a vector removed from the magnetic data $q_i$ in the correction process is referred to as an offset $c_{OFF}$. That is, the offset $c_{OFF}$ is a vector ${}^S B_i$ representing the internal magnetic field, and is represented as a vector indicating the central point $c_{OG}$ of the spherical surface $S_G$ from the origin in the sensor coordinate system $\Sigma_S$.

In a case where the instrument 1 includes a soft magnetic material 21, a magnetized magnetic field $B_m$ is generated by the soft magnetic material 21 as the result that the soft magnetic material 21 is magnetized under the influence of the geomagnetism $B_g$. How the direction and magnitude of the magnetized magnetic field $B_m$ are changed in the ground coordinate system $\Sigma_G$ and the sensor coordinate system $\Sigma_S$ in a case where the posture μ of the instrument 1 is changed will be described with reference to FIGS. 4 and 5.

Figure 4:
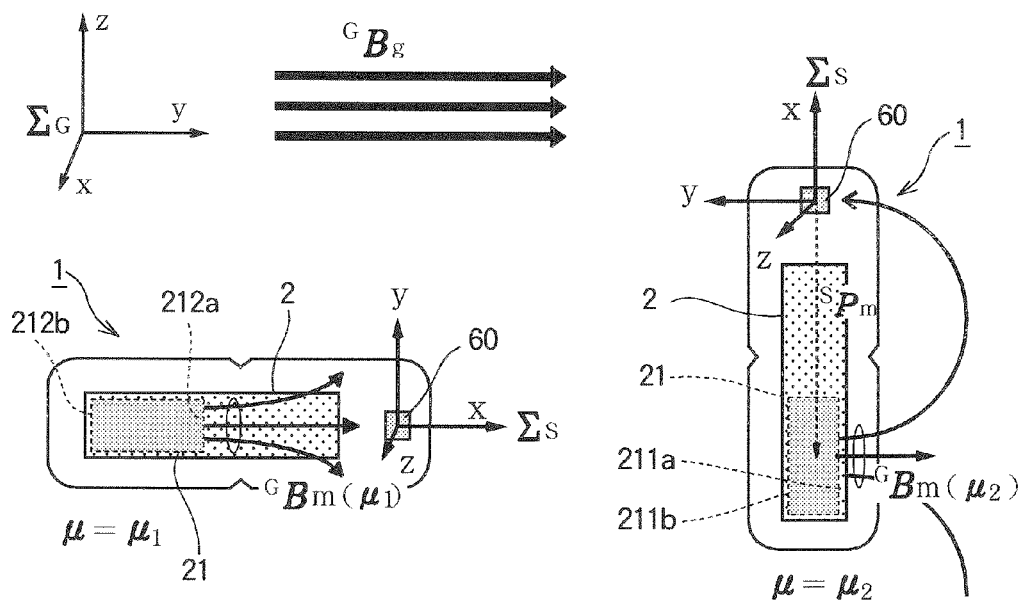
FIG. 4 is a conceptual view illustrating a magnetized magnetic field measured by the three-dimensional magnetic sensor according to the embodiment of the present invention.

FIG. 4 is a view illustrating the direction and magnitude of the magnetized magnetic field $B_m$ in the ground coordinate system $\Sigma_G$. FIG. 4 illustrates a case in which the instrument 1 includes a cuboidal soft magnetic material 21 having longer sides 211a and 211b parallel to the x axis of the sensor coordinate system $\Sigma_S$ and shorter sides 212a and 212b parallel to the y axis of the sensor coordinate system $\Sigma_S$, and the soft magnetic material 21 is disposed so as to be located on the x axis of the sensor coordinate system $\Sigma_S$.

The magnetized magnetic field $B_m$ is a magnetic field generated as the result that the soft magnetic material 21 is magnetized by the geomagnetism $B_g$. Specifically, the magnetized magnetic field $B_m$ is a magnetic field, the direction and magnitude of which are changed depending upon the posture μ of the instrument 1 and the material, size, and shape of the soft magnetic material 21. In a case where the posture μ of the instrument 1 is changed from a posture $\mu_1$ to a posture $\mu_2$, the direction and magnitude of the magnetized magnetic field ${}^G B_m$ are changed from ${}^G B_m(\mu_1)$ to ${}^G B_m(\mu_2)$. For example, in a case where the posture μ of the instrument 1 is a posture $\mu_1$, the soft magnetic material 21 generates a magnetized magnetic field ${}^G B_m(\mu_1)$ directed from one shorter side 212a of the soft magnetic material 21 to the other shorter side 212b of the soft magnetic material 21. In a case where the posture μ of the instrument 1 is a posture $\mu_2$, the soft magnetic material 21 generates a magnetized magnetic field ${}^G B_m(\mu_2)$ directed from one longer side 211a of the soft magnetic material 21 to the other longer side 211b of the soft magnetic material 21.

The direction and magnitude of the magnetized magnetic field ${}^G B_m(\mu)$ detected by the three-dimensional magnetic sensor 60 depend on the posture μ of the instrument and a position ${}^S P_m$ of the soft magnetic material 21 in the sensor coordinate system $\Sigma_S$. For example, in a case of FIG. 4, the three-dimensional magnetic sensor 60 measures the magnetized magnetic field ${}^G B_m(\mu_2)$ as a magnetic field directed in the same direction as a geomagnetism ${}^G B_g(\mu_1)$. Also, the three-dimensional magnetic sensor 60 measures the magnetized magnetic field ${}^G B_m(\mu_2)$ as a magnetic field directed in a direction opposite to geomagnetism ${}^G B_g(\mu_2)$.

Meanwhile, the soft magnetic material 21 is magnetized by a magnetic field generated by the part 2, which has a uniform direction and magnitude when viewed from the sensor coordinate system $\Sigma_S$, in addition to the geomagnetism $B_g$. A magnetic field generated by the soft magnetic material 21 as the result that the soft magnetic material 21 is magnetized by the magnetic field, the direction and magnitude of which are uniform when viewed from the sensor coordinate system $\Sigma_S$, has a uniform direction and magnitude even in a case where the posture μ of the instrument 1 is changed. Of such magnetic fields generated as the result that the soft magnetic material 21 is magnetized, a magnetic field having a uniform direction and magnitude even in a case where the posture μ of the instrument is changed is included in the above-mentioned internal magnetic field $B_i$.

Figure 5:
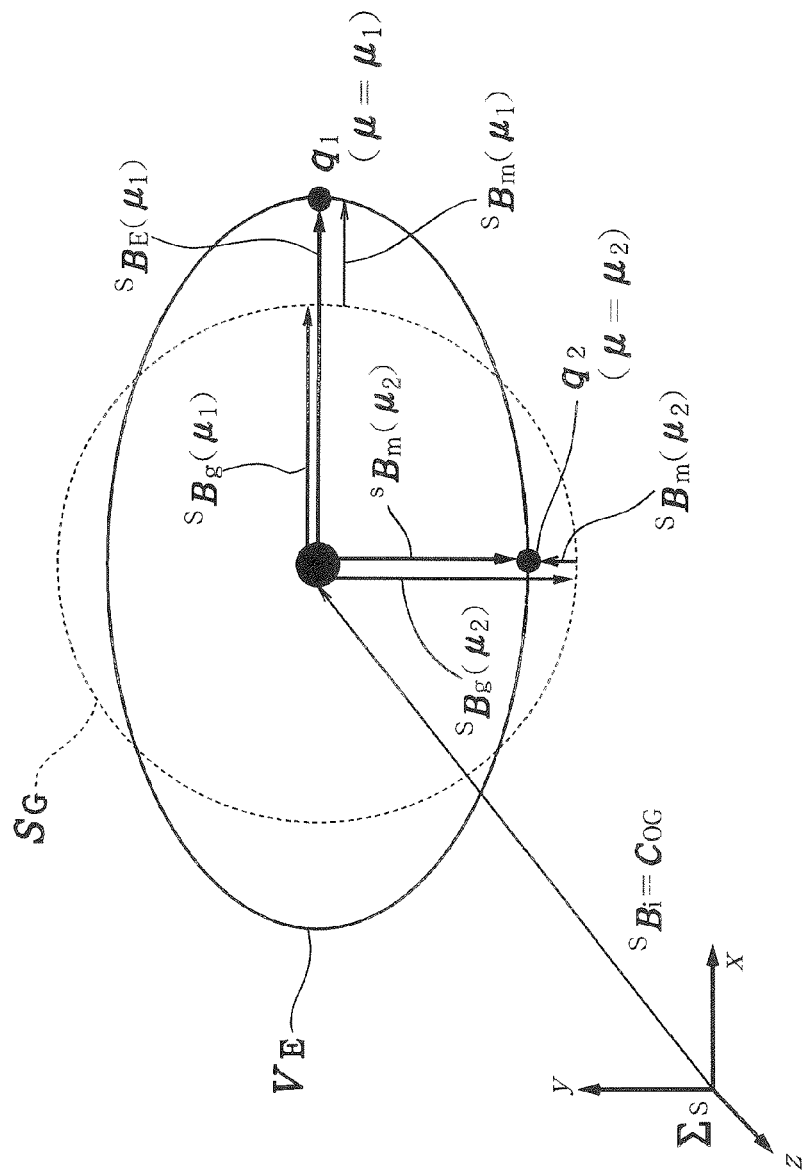
FIG. 5 is a conceptual view illustrating the magnetized magnetic field measured by the three-dimensional magnetic sensor according to the embodiment of the present invention.

FIG. 5 is a view showing that magnetic data $q_i$ measured when the instrument 1 takes a posture $\mu_1$ and magnetic data $q_2$ measured when the instrument 1 takes a posture $\mu_2$ are plotted in the sensor coordinate system $\Sigma_S$.

The magnetic data $q_1$ are coordinates indicated by a vector ${}^S B_E(\mu_1)$ obtained by adding a magnetized magnetic field ${}^S B_m(\mu_1)$ having coordinates indicated by the central point $c_{OG}$ as the start point and the same direction as a geomagnetism ${}^S B_g(\mu_1)$ to the geomagnetism ${}^S B_g(\mu_1)$. Consequently, the magnetic data $q_1$ are present at the outside of the spherical surface $S_G$. On the other hand, the magnetic data $q_2$ are coordinates indicated by a vector ${}^S B_E(\mu_2)$ obtained by adding a magnetized magnetic field ${}^S B_m(\mu_2)$ having coordinates indicated by the central point $c_{OG}$ as the start point and a direction opposite to a geomagnetism ${}^S B_g(\mu_2)$ to the geomagnetism ${}^S B_g(\mu_2)$. Consequently, the magnetic data $q_2$ are present at the inside of the spherical surface $S_G$.

That is, the magnetic data $q_1$ and $q_2$ are distributed on an ellipsoid $V_E$ obtained by expanding the spherical surface $S_G$ toward the vector $^SB_g(\mu_1)$ and contracting the spherical surface $S_G$ toward the vector $^SB_g(\mu_2)$.

In a case where the three-dimensional magnetic sensor is mounted in the instrument including the soft magnetic material, therefore, coordinates indicated by a plurality of magnetic data measured by the three-dimensional magnetic sensor are not distributed in the vicinity of a spherical surface but are distributed in the vicinity of an ellipsoid due to the influence of a magnetized magnetic field generated as the result that the soft magnetic material is magnetized by a magnetic field, such as geomagnetism, from the outside of the instrument. Such a phenomenon in which the coordinates indicated by the magnetic data are distributed in the vicinity of the ellipsoid due to the influence of the magnetic field generated as the result that the soft magnetic material is magnetized is referred to as a soft iron effect.

Coordinates indicated by a plurality of magnetic data $q_1$ to $q_N$ output by the three-dimensional magnetic sensor 60 in a case where the soft iron effect is generated will be described with reference to FIG. 6.

Figure 6:
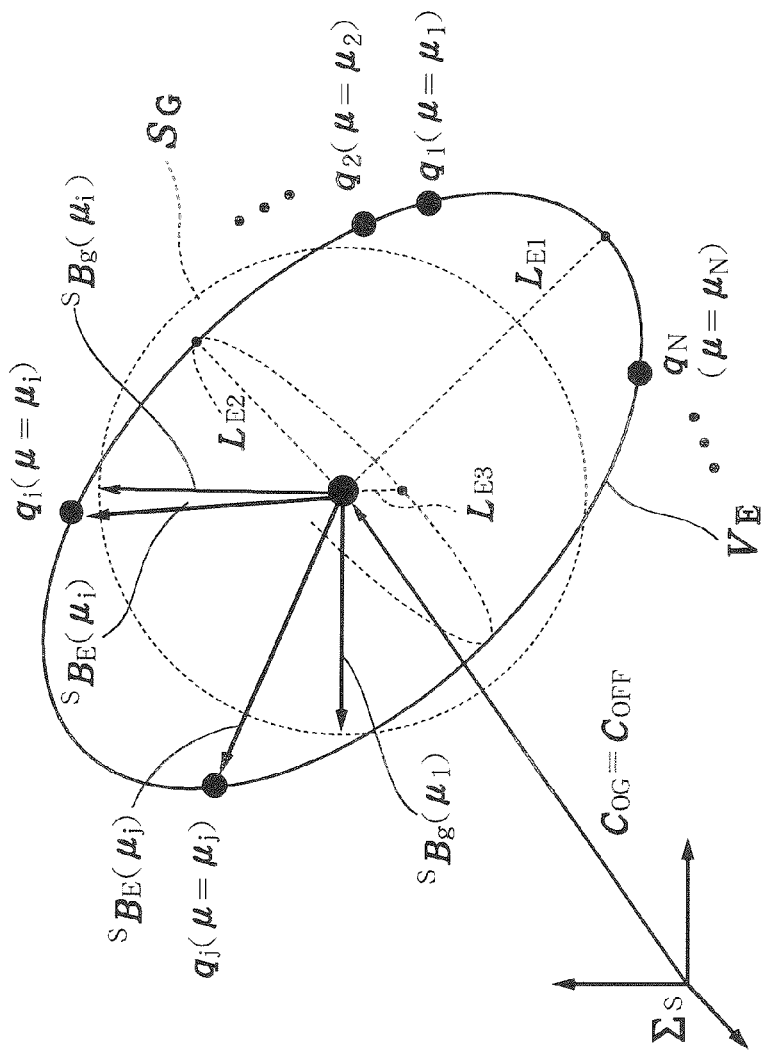
FIG. 6 is a conceptual view illustrating the magnetized magnetic field measured by the three-dimensional magnetic sensor according to the embodiment of the present invention.

FIG. 6 is a view showing that, in a case where the posture $\mu$ of the three-dimensional magnetic sensor 60 is changed into $\mu_1$ to $\mu_N$ (N being a natural number, equal to or greater than 9, indicating a prescribed number of times for measuring magnetic data necessary to derive a high-precision offset) to measure a magnetic field, coordinates indicated by N magnetic data $q_1$ to $q_N$ output by the three-dimensional magnetic sensor 60 are plotted in the sensor coordinate system $\Sigma_S$. In FIG. 6, it is assumed that the coordinates indicated by the magnetic data $q_1$ to $q_N$ are distributed on an ellipsoid $V_E$ having the central point $C_{OG}$ as the center by the soft iron effect. Meanwhile, in FIG. 6, a measurement error of the three-dimensional magnetic sensor 60 is not considered. In a case where such a measurement error is considered, however, the coordinates indicated by the magnetic data $q_1$ to $q_N$ are not distributed on the ellipsoid $V_E$ but are probably distributed in the vicinity of the ellipsoid $V_E$. That is, the ellipsoid $V_E$ is set so as to minimize errors between the ellipsoid and the coordinates indicated by the magnetic data $q_1$ to $q_N$.

Main axes of the ellipsoid $V_E$ are set to $L_{E1}$, $L_{E2}$, and $L_{E3}$ in order of length, and the lengths of these three main axes are set to $r_{E1}$, $r_{E2}$, and $r_{E3}$ (where, $r_{E1} \geq r_{E2} \geq r_{E3} \geq 0$). Also, the radius of the spherical surface $S_G$ is set to $r_G$.

At this time, the vector $^SB_E(\mu_1)$ indicating coordinates represented by the magnetic data $q_i$ from the central point $c_{OG}$ becomes a vector representing the sum of a vector corresponding to $r_{E1}/r_G$ times a component of the vector $^SB_E(\mu_1)$ representing the geomagnetism parallel to the main axis $L_{E1}$, a vector corresponding to $r_{E2}/r_G$ times a component of the vector $^SB_E(\mu_1)$ parallel to the main axis $L_{E2}$, and a vector corresponding to $r_{E3}/r_G$ times a component of the vector $^SB_E(\mu_1)$ parallel to the main axis $L_{E3}$.

Consequently, the direction of the vector $^SB_E(\mu_1)$ indicating the coordinates represented by the magnetic data $q_i$ from the central point $c_{OG}$ is different from that of the vector $^SB_g(\mu_1)$ representing the geomagnetism. Also, an angle between a vector $^SB_E(\mu_1)$ and a vector $^SB_E(\mu_1)$ (that is, an angle between coordinates indicated by two magnetic data $q_i$ and $q_j$ when viewed from the central point $c_{OG}$) and an angle between a vector $^SB_g(\mu_1)$ and a vector $^SB_g(\mu_1)$ representing the geomagnetism are different from each other. In a case where the soft iron effect is generated, therefore, it is not possible to correctly find the direction of the geomagnetism $^SB_g(\mu_1)$ although the coordinates of the central point $c_{OG}$ is subtracted from the coordinates of the magnetic data $q_i$.

Figure 7:
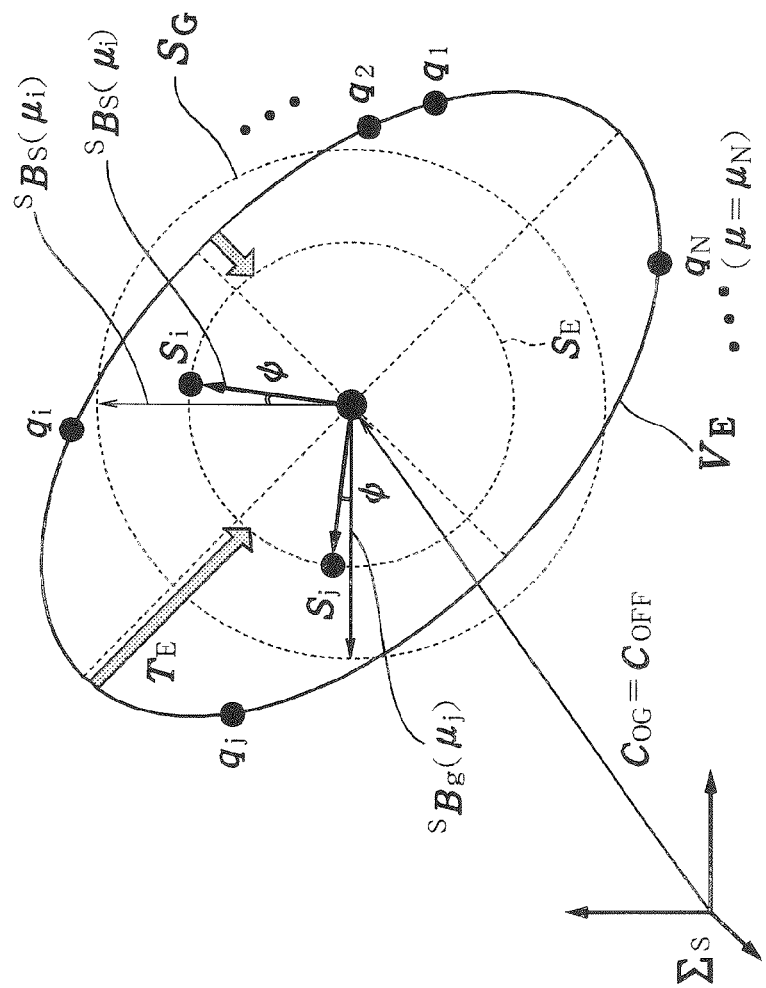
FIG. 7 is a conceptual view illustrating an ellipsoidal correction matrix according to an embodiment of the present invention.

In this embodiment, as shown in FIG. 7, an ellipsoidal correction matrix $T_E$ for converting the coordinates on the ellipsoid $V_E$ into coordinates of a spherical surface $S_E$ having a radius 1 is calculated, and the coordinates indicated by the magnetic data $q_i$ are converted into coordinates on the spherical surface $S_E$ represented by magnetic data $s_i$ after conversion by the ellipsoidal correction matrix $T_E$. A vector $^SBS(\mu_1)$ indicating coordinates represented by the magnetic data $s_i$ after conversion from the central point $c_{OG}$ is directed in the same direction as the vector $^SB_g(\mu_1)$ representing the geomagnetism if there is no misalignment angle $\phi$ between the vector $^SB_s(\mu_1)$ and the vector $^SB_g(\mu_i)$. Consequently, it is possible to find the direction of the vector $^SB_g(\mu_i)$ representing the geomagnetism by subtracting the coordinates indicated by the central point $c_{OG}$ from the coordinates indicated by the magnetic data $s_i$ after conversion.

A process of converting coordinates indicated by a plurality of magnetic data distributed in the vicinity of an ellipsoid into a plurality of coordinates distributed in the vicinity of a spherical surface, having a radius 1, the central point of which is the same as that of the ellipsoid, to calculate the direction of the geomagnetism $B_g$ is referred to as ellipsoidal correction.

Coordinate conversion from the coordinates indicated by the magnetic data $q_i$ on the ellipsoid $V_E$ to the coordinates indicated by the magnetic data $q_i$ on the ellipsoid $V_E$ to coordinates indicated by the magnetic data $s_i$ after conversion on the spherical surface $S_E$, performed by the ellipsoidal correction matrix $T_E$, is represented by the following equation (1).

Here, the ellipsoidal correction matrix $T_E$ is a symmetric matrix of 3×3 represented by the following equation (2). Also, a three-dimensional variable vector q represented by equation (3) is a variable vector for indicating the coordinates of the magnetic data $q_i$, a three-dimensional variable vector s represented by equation (4) is a variable vector for indicating the coordinates of the magnetic data $s_i$ after conversion, and a three-dimensional variable vector c represented by equation (5) is a variable vector for indicating the coordinates of the central point $c_{OG}$ (that is, the offset $c_{OFF}$).

Meanwhile, in equation (1), a vector (q-c) indicates coordinates on an ellipsoid obtained by moving the central point $c_{OG}$ of the ellipsoid $V_E$ in parallel to the origin of the sensor coordinate system $\Sigma_S$, and a vector (s-c) indicates coordinates on a spherical surface, having a radius 1, the center of which corresponds to the origin of the sensor coordinate system $\Sigma_S$.

$$s - c = T_E(q - c) \quad (1)$$

where $$T_E = \begin{bmatrix} t_{E11} & t_{E12} & t_{E13} \\ t_{E12} & t_{E22} & t_{E23} \\ t_{E13} & t_{E23} & t_{E33} \end{bmatrix} \quad (2)$$

$$q = [x \ y \ z]^T \quad (3)$$

$$s = [s_x \ s_y \ s_z]^T \quad (4)$$

$$c = [c_x \ c_y \ c_z]^T \quad (5)$$

As previously described, the ellipsoidal correction matrix $T_E$ is a matrix for converting the coordinates on the ellipsoid $V_E$ into the coordinates on the spherical surface $S_E$ having the radius 1 in the coordinate system having the central point $c_{OG}$ of the ellipsoid $V_E$ as the origin. That is, the ellipsoidal correction matrix $T_E$ is set so that three eigenvectors perpendicular to each other are parallel to three main axes of the ellipsoid $V_E$, respectively, and three eigenvalues corresponding to the three eigenvectors are equal to reciprocals of the lengths of the three main axes of the ellipsoid $V_E$, respectively.

Here, the three eigenvectors of the ellipsoidal correction matrix $T_E$ are set to $u_{T1}$, $u_{T2}$, and $u_{T3}$, and the eigenvalues corresponding to the eigenvectors are set to $\lambda_{T1}$, $\lambda_{T2}$, and $\lambda_{T3}$ (where, $\lambda_{T1} \geq \lambda_{T2} \geq \lambda_{T3} > 0$). At this time, the eigenvector $u_{T1}$ is set so as to be parallel to the main axis $L_{E1}$, the eigenvector $u_{T2}$ is set so as to be parallel to the main axis $L_{E2}$, and the eigenvector $u_{T3}$ is set so as to be parallel to the main axis $L_{E3}$. Also, the eigenvalue $\lambda_{T1}$ is set so as to be equal to a reciprocal of the length $r_{E1}$ of the main axis $L_{E1}$, the eigenvalue $\lambda_{T2}$ is set so as to be equal to a reciprocal of the length $r_{E2}$ of the main axis $L_{E2}$, and the eigenvalue $\lambda_{T3}$ is set so as to be equal to a reciprocal of the length $r_{E3}$ of the main axis $L_{E3}$. That is, the ellipsoidal correction matrix $T_E$ is a matrix for expanding and contracting an eigenvector $u_{T1}$ direction component of an arbitrary vector by the eigenvalue $\lambda_{T1}$, expanding and contracting an eigenvector $u_{T2}$ direction component of the vector by the eigenvalue $\lambda_{T2}$, and expanding and contracting an eigenvector $u_{T3}$ direction component of the vector by the eigenvalue $\lambda_{T3}$.

Meanwhile, all of the three eigenvalues $\lambda_{T1}$, $\lambda_{T2}$, and $\lambda_{T3}$ of the ellipsoidal correction matrix $T_E$ are positive values, and the ellipsoidal correction matrix $T_E$ is a positive definite matrix.

By the way, as shown in FIG. 7, a misalignment angle $\phi$ may be formed between the vector $^SB_s(\mu_1)$ indicating the coordinates represented by the magnetic data $s_i$ after conversion from the central point $c_{OG}$ and the vector $^SB_g(\mu_i)$ representing the geomagnetism. In this case, it is not possible to calculate a correct direction of the vector $^SB_g(\mu_1)$ from the magnetic data $s_i$ after conversion.

However, the misalignment angle $\phi$ is a value depending on a mutual positional relationship between the soft magnetic material 21 and the three-dimensional magnetic sensor 60 (that is, the direction and magnitude of the vector $^SP_m$). Consequently, it is possible to specify the misalignment angle $\phi$ using the vector $^SP_m$, and it is possible to calculate a correct direction of the geomagnetism $B_g$ from the specified misalignment angle $\phi$ and the plurality of magnetic data $s_i$ after conversion. Also, the disposition of the soft magnetic material 21 can be considered so as to minimize the misalignment angle $\phi$.

Hereinafter, a method of finding the shape of the ellipsoid $V_E$, calculating the ellipsoidal correction matrix $T_E$ to perform ellipsoidal correction, and calculating a correct direction of the geomagnetism $B_g$ will be described.

2. CONSTRUCTION OF INSTRUMENT AND CONSTRUCTION OF SOFTWARE

Figure 8:
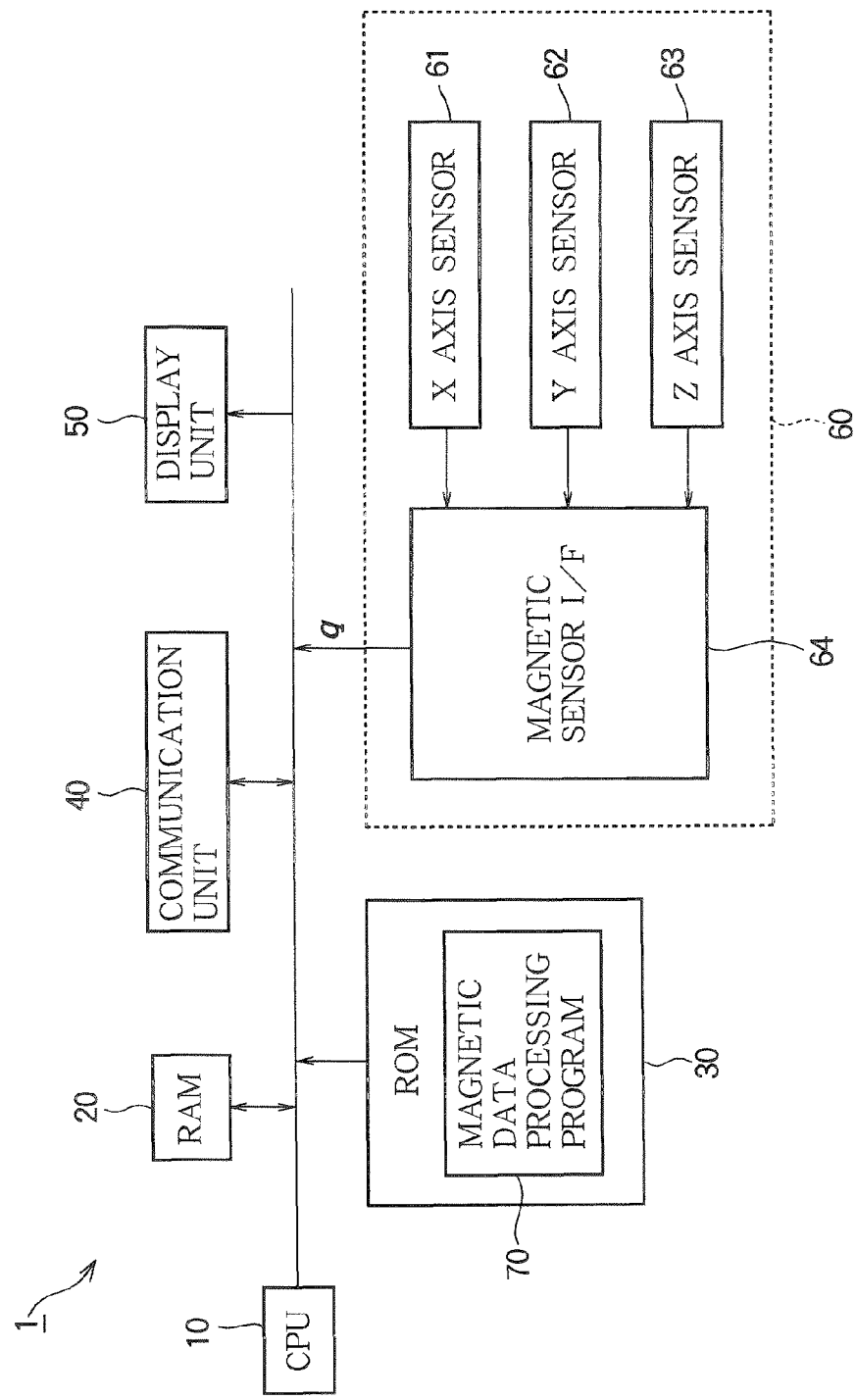
FIG. 8 is a block diagram showing the construction of an instrument in which the three-dimensional magnetic sensor according to the embodiment of the present invention is mounted.

FIG. 8 is a block diagram showing the construction of an instrument 1 according to a first embodiment of the present invention.

The instrument 1 includes a central processing unit (CPU) 10 connected to various kinds of constructional elements via buses for controlling the entirety of the apparatus, a random access memory (RAM) 20 functioning as a work area of the CPU 10, a read only memory (ROM) 30 for storing various kinds of programs and data, a communication unit 40 for performing communication, a display unit 50 for displaying a picture, and a three-dimensional magnetic sensor 60 for detecting magnetism to output magnetic data.

The three-dimensional magnetic sensor 60 includes an X axis geomagnetic sensor 61, a Y axis geomagnetic sensor 62, and a Z axis geomagnetic sensor 63. Each of the sensors can be configured using a magnetic impedance device (an MI device) or a magnetic resistance effect device (an MR device). A geomagnetic sensor interface (I/F) 64 converts analog output signals from the respective sensors into digital signals to thereby output magnetic data q. The magnetic data q are vector data on a sensor coordinate system $\Sigma_S$ indicating outputs from the X axis geomagnetic sensor 61, the Y axis geomagnetic sensor 62, and the Z axis geomagnetic sensor 63 according to three components, i.e. x axis, y axis, and z axis components, of the sensor coordinate system $\Sigma_S$.

The CPU 10, the RAM 20, the three-dimensional magnetic sensor 60, and a magnetic data processing program 70 function as a geomagnetism measurement apparatus for calculating geomagnetic data indicating a correct direction of geomagnetism based on the magnetic data q detected and output by the three-dimensional magnetic sensor 60.

The display unit 50 displays the direction of the geomagnetism calculated by the CPU 10 executing the magnetic data processing program 70 as azimuth information using arrows. Meanwhile, the magnetic data processing program 70 may be cooperated with a map application, and the display unit 50 may display arrows, which are azimuth information indicating the direction of the geomagnetism, on the map.

Figure 9:
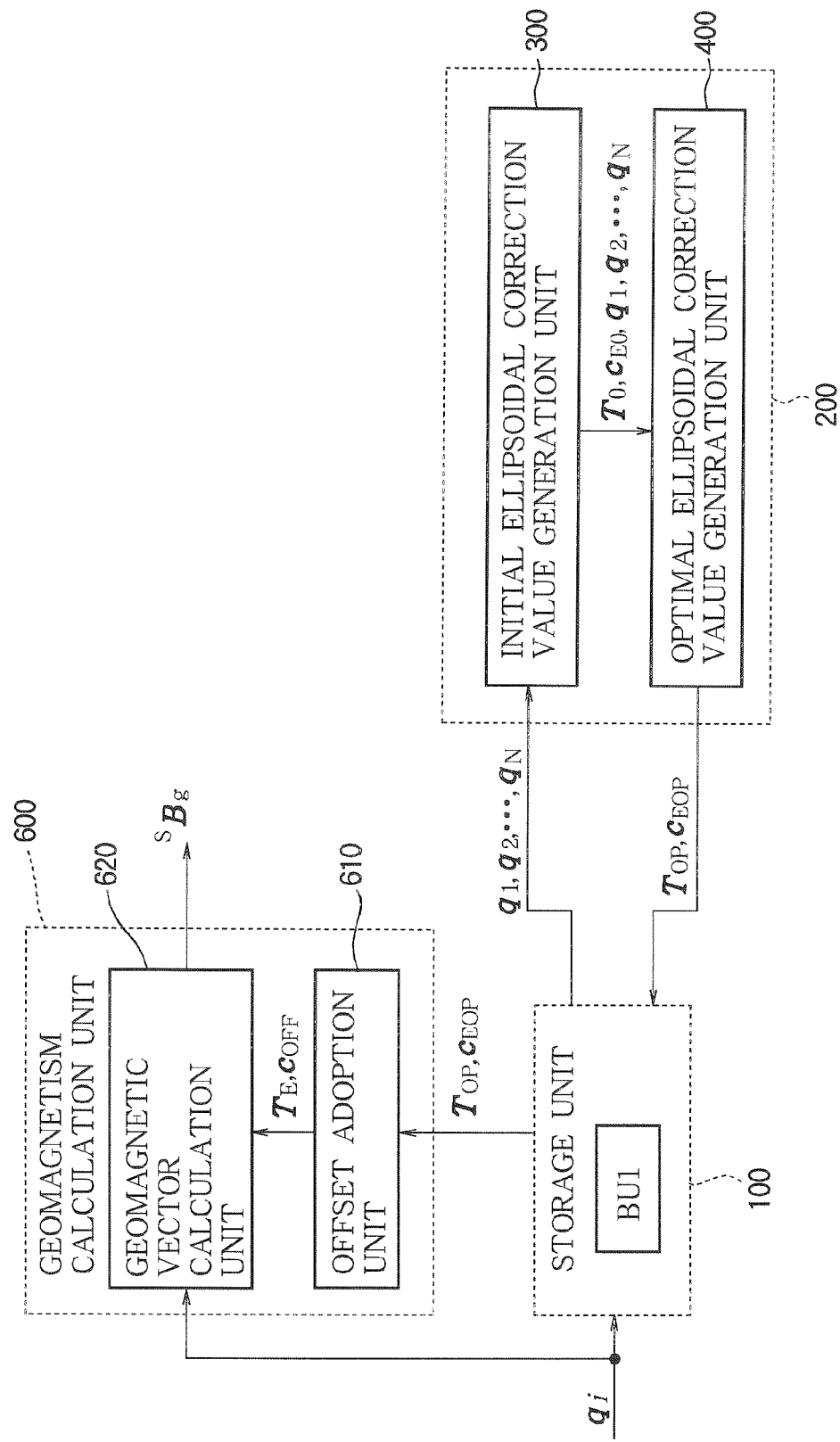
FIG. 9 is a functional block diagram showing the construction of a geomagnetism measurement apparatus according to an embodiment of the present invention.

FIG. 9 is a functional block diagram showing functions realized by the CPU 10 of the geomagnetism measurement apparatus executing the magnetic data processing program 70. The geomagnetism measurement apparatus includes a storage unit 100 for storing a plurality of magnetic data $q_1$ to $q_N$, an ellipsoidal correction unit 200 for calculating the coordinates of an optimal central point $c_{EOP}$ and an optimal ellipsoidal correction matrix $T_{OP}$, and a geomagnetism calculation unit 600 for calculating the direction of geomagnetism $B_g$ based on the magnetic data $q_i$, the optimal central point $c_{EOP}$, and the optimal ellipsoidal correction matrix $T_{OP}$. Here, the optimal central point $c_{EOP}$ is a central point of an optimal ellipsoid $V_{EOP}$, which is an ellipsoid set to minimize errors between the ellipsoid and the coordinates indicated by the magnetic data $q_1$ to $q_N$. Also, the optimal ellipsoidal correction matrix $T_{OP}$ is a symmetric matrix of 3×3 for converting coordinates on the optimal ellipsoid $V_{EOP}$ into coordinates on a spherical surface $S_{EOP}$ having the optimal central point $c_{EOP}$ as the center.

The storage unit 100 stores magnetic data $q_1$ to $q_N$ sequentially output from the three-dimensional magnetic sensor 60 in a buffer BU1 (N being a natural number, equal to or greater than 9, indicating a prescribed number of times for measuring magnetic data necessary to derive a high-precision offset). The buffer BU1 is formed by the RAM 20.

The ellipsoidal correction unit 200 includes an initial ellipsoidal correction value generation unit 300 and an optimal ellipsoidal correction value generation unit 400.

The initial ellipsoidal correction value generation unit 300 calculates an initial ellipsoidal correction matrix $T_O$ and coordinates of an initial central point $c_{EO}$ based on the magnetic data $q_1$ to $q_N$ stored in the storage unit 100. Here, the initial central point $c_{EO}$ is a central point of an initial ellipsoid $V_{EO}$, which has coordinates indicated by the magnetic data $q_1$ to $q_N$ stored in the storage unit 100 in the vicinity thereof. Also, the initial ellipsoidal correction matrix $T_O$ is a symmetric matrix of 3×3 for converting coordinates on the initial ellipsoid $V_{EO}$ into coordinates on a spherical surface $S_{EO}$ having the initial central point $c_{EO}$ as the center.

The optimal ellipsoidal correction value generation unit 400 calculates coordinates of the optimal central point $c_{EOP}$, which is the central point of the optimal ellipsoid $V_{EOP}$ for minimizing errors between coordinates indicated by the magnetic data $q_1$ to $q_N$ and the ellipsoid, and an optimal ellipsoidal correction matrix $T_{OP}$ indicating coordinate conversion from coordinates on the optimal ellipsoid $V_{EOP}$ to coordinates on the spherical surface $S_{EOP}$ having the optimal central point $c_{EOP}$ as the central point based on the initial ellipsoidal correction matrix $T_O$ and the coordinates of the initial central point $c_{EO}$ output by the initial ellipsoidal correction value generation unit 300.

In a case where the error between the coordinates indicated by the magnetic data $q_1$ to $q_N$ and the optimal ellipsoid $V_{EOP}$ is minimized to zero, the ellipsoid $V_E$ coincides with the optimal ellipsoid $V_{EOP}$, and the optimal central point $c_{EOP}$ coincides with the central point $c_{OG}$ (that is, the coordinates indicated by the internal magnetic field $B_i$).

The calculated optimal central point $c_{EOP}$ and optimal ellipsoidal correction matrix $T_{OP}$ are stored in the storage unit 100.

The geomagnetism calculation unit 600 performs ellipsoidal correction using the ellipsoidal correction matrix $T_E$ and the offset $c_{OFF}$ with respect to the coordinates indicated by the magnetic data $q_i$ output from the three-dimensional magnetic sensor 60 to calculate the direction of the geomagnetism $^SB_g$ (strictly speaking, the direction of the vector $^SB_s(\mu_1)$) in the sensor coordinate system $\Sigma_S$.

Specifically, the geomagnetism calculation unit 600 includes an offset adoption unit 610 and a geomagnetic vector calculation unit 620. The offset adoption unit 610 adopts the optimal ellipsoidal correction matrix $T_{OP}$ as the ellipsoidal correction matrix $T_E$, and adopts a vector indicating the coordinates of the optimal central point $c_{EOP}$ as the offset $c_{OFF}$. Also, the geomagnetic vector calculation unit 620 performs ellipsoidal correction using the ellipsoidal correction matrix $T_E$ and the offset $c_{OFF}$ with respect to the magnetic data $q_i$ output from the three-dimensional magnetic sensor 60 to calculate the direction of the geomagnetism $^SB_g$.

Hereinafter, the initial ellipsoidal correction value generation unit 300, the optimal ellipsoidal correction value generation unit 400, and the geomagnetism calculation unit 600 will be described in detail.

3. GENERATION OF INITIAL ELLIPSOID

Figure 10:
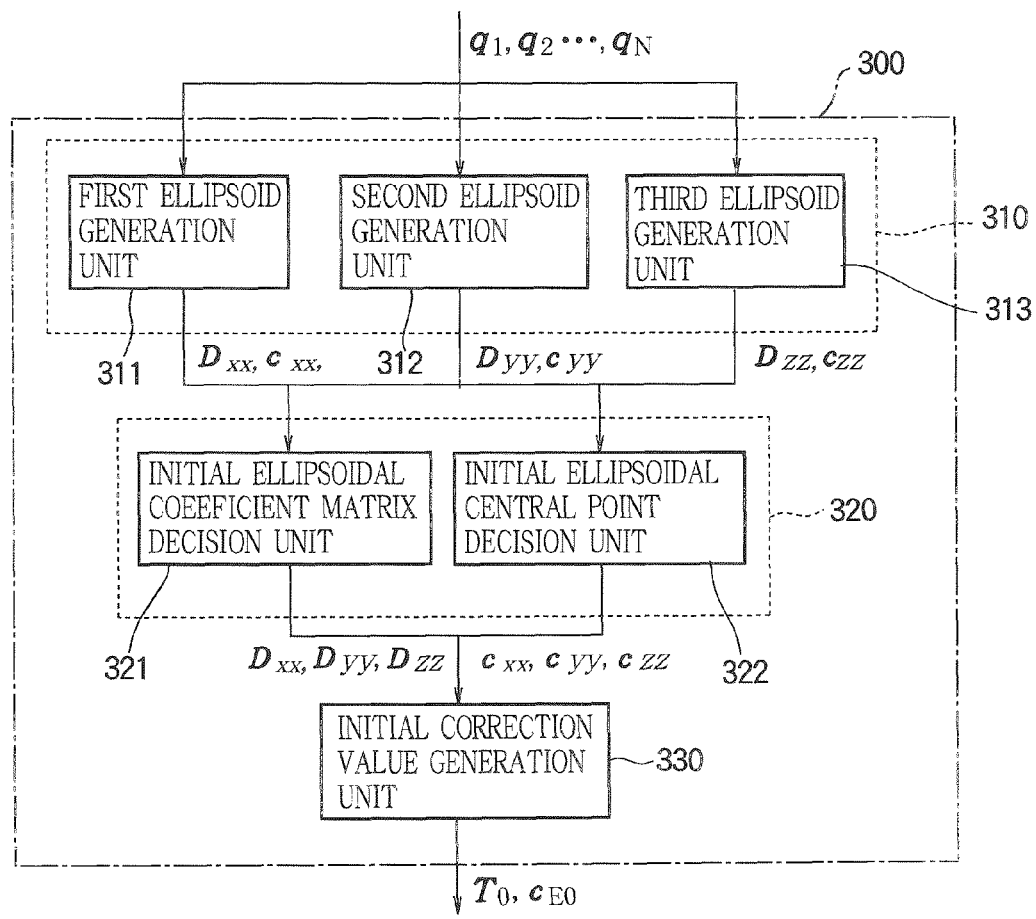
FIG. 10 is a functional block diagram showing the construction of an initial ellipsoidal correction value generation unit according to an embodiment of the present invention.

FIG. 10 is a functional block diagram showing the functional construction of the initial ellipsoidal correction value generation unit 300.

In this embodiment, when the initial ellipsoid $V_{EO}$ is calculated based on the magnetic data $q_1$ to $q_N$, a first ellipsoid $V_{xx}$, a second ellipsoid $V_{yy}$, and a third ellipsoid $V_{zz}$, each of which has coordinates indicated by the magnetic data $q_1$ to $q_N$ in the vicinity thereof, are generated, and an initial ellipsoid $V_{EO}$ is generated based on these three ellipsoids.

Hereinafter, a method of generating the initial ellipsoid $V_{EO}$ in this embodiment will be described in detail.

The initial ellipsoidal correction value generation unit 300 includes an initial ellipsoid generation unit 310 for calculating coefficient matrices $D_{xx}$, $D_{yy}$, and $D_{zz}$ of the first ellipsoid $V_{xx}$, the second ellipsoid $V_{yy}$, and the third ellipsoid $V_{zz}$ and coordinates of central points $c_{xx}$, $c_{yy}$, and $c_{zz}$ of the first ellipsoid $V_{xx}$, the second ellipsoid $V_{yy}$, and the third ellipsoid $V_{zz}$, an initial ellipsoid decision unit 320 for determining whether calculation of the initial ellipsoidal correction matrix $T_O$ and the coordinates of the initial central point $c_{EO}$ based on the coefficient matrices and the central points of the first ellipsoid $V_{xx}$, the second ellipsoid $V_{yy}$, and the third ellipsoid $V_{zz}$ is proper, and an initial correction value generation unit 330 for calculating the initial ellipsoidal correction matrix $T_O$ and the coordinates of the initial central point $c_{EO}$ based on the coefficient matrices and the coordinates of the central points of the first ellipsoid $V_{xx}$, the second ellipsoid $V_{yy}$, and the third ellipsoid $V_{zz}$.

The initial ellipsoid generation unit 310 includes a first ellipsoid generation unit 311 for calculating a first ellipsoidal coefficient matrix $D_{xx}$ representing the shape of the first ellipsoid $V_{xx}$ and coordinates of the central point $c_{xx}$ of the first ellipsoid $V_{xx}$ based on the magnetic data $q_1$ to $q_N$ stored in the storage unit 100, a second ellipsoid generation unit 312 for calculating a second ellipsoidal coefficient matrix $D_{yy}$ representing the shape of the second ellipsoid $V_{yy}$ and coordinates of the central point $c_{yy}$ of the second ellipsoid $V_{yy}$ based on the magnetic data $q_1$ to $q_N$, and a third ellipsoid generation unit 313 for calculating a third ellipsoidal coefficient matrix $D_{zz}$ representing the shape of the third ellipsoid $V_{zz}$ and coordinates of the central point $c_{zz}$ of the third ellipsoid $V_{zz}$ based on the magnetic data $q_1$ to $q_N$.

Hereinafter, a method of calculating the first ellipsoidal coefficient matrix $D_{xx}$, the second ellipsoidal coefficient matrix $D_{yy}$, and the third ellipsoidal coefficient matrix $D_{zz}$, and the coordinates of the central point $c_{xx}$, the coordinates of the central point $c_{yy}$, and the coordinates of the central point $c_{zz}$ will be described.

In a case where a variable representing the coordinates indicated by magnetic data $q$ output from the three-dimensional magnetic sensor 60 is represented by equation (3), an equation of an ellipsoid having the magnetic data $q$ on the surface thereof (an ellipsoidal equation) is represented by the following equation (6). Meanwhile, equation (6) represents an ellipsoid, and therefore, all coefficients $\theta_{xx}$, $\theta_{yy}$, and $\theta_{zz}$ present in equation (6) are positive values.

$$\theta_{xx}x^2+\theta_{xy}xy+\theta_{xz}xz+\theta_{yy}y^2+\theta_{yz}yz+\theta_{zz}z^2+\theta_x x+\theta_y y+\theta_z z+\theta_r=0 \quad (6)$$

The ellipsoidal equation represented by equation (6) is modified into the following equation (7).

$$-x^2 = \frac{\theta_{xy}}{\theta_{xx}}xy + \frac{\theta_{xz}}{\theta_{xx}}xz + \frac{\theta_{yy}}{\theta_{xx}}y^2 + \frac{\theta_{yz}}{\theta_{xx}}yz + \frac{\theta_{zz}}{\theta_{xx}}z^2 + \frac{\theta_x}{\theta_{xx}}x + \frac{\theta_y}{\theta_{xx}}y + \frac{\theta_z}{\theta_{xx}}z + \frac{\theta_r}{\theta_{xx}} \quad (7)$$

In a case where all of the coordinates indicated by the magnetic data $q_1$ to $q_N$ are positioned on the ellipsoid represented by equation (6), the following equation (8) is realized.

However, a vector $\theta_{XX}$ is a nine-dimensional vector in which 9 coefficients of equation (7) are arranged as represented by equation (9). Also, a matrix $R_{xx}$ is a matrix of N×9 in which N vectors obtained by substituting the coordinates indicated by the magnetic data $q_1$ to $q_N$ represented by equation (11) into a nine-dimensional vector $Q_{xx}$ represented by equation (13) are transposed and arranged at each row, as represented by equation (10). A vector $W_{XX}$ is a nine-dimensional vector having a value obtained by attaching a minus sign to a square value of an x component as each component of the coordinates indicated by the magnetic data $q_1$ to $q_N$ as represented by equation (12).

$$R_{xx}\theta_{XX} = W_{xx} \quad (8)$$

$$\theta_{XX} = \left[\frac{\theta_{xy}}{\theta_{xx}}\ \frac{\theta_{xz}}{\theta_{xx}}\ \frac{\theta_{yy}}{\theta_{xx}}\ \frac{\theta_{yz}}{\theta_{xx}}\ \frac{\theta_{zz}}{\theta_{xx}}\ \frac{\theta_x}{\theta_{xx}}\ \frac{\theta_y}{\theta_{xx}}\ \frac{\theta_z}{\theta_{xx}}\ \frac{\theta_r}{\theta_{xx}}\right]^T \quad (9)$$

$$R_{xx} = \begin{bmatrix} x_1y_1 & x_1z_1 & y_1^2 & y_1z_1 & z_1^2 & x_1 & y_1 & z_1 & 1 \\ \vdots & \vdots & \vdots & \vdots & \vdots & \vdots & \vdots & \vdots & \vdots \\ x_Ny_N & x_Nz_N & y_N^2 & y_Nz_N & z_N^2 & x_N & y_N & z_N & 1 \end{bmatrix} \quad (10)$$

-continued $$q_i = [x_i \ y_i \ z_i]^T \ (i = 1, \ldots, N) \quad (11)$$

$$W_{xx} = \begin{bmatrix} -x_1^2 \\ \vdots \\ -x_N^2 \end{bmatrix} \quad (12)$$

$$Q_{xx} = [xy \ xz \ y^2 \ yz \ z^2 \ x \ y \ z \ 1]^T \quad (13)$$

Equation (8) is a simultaneous linear equation having each element of the vector $\theta_{XX}$ as a variable. Consequently, equation (8) is solved with respect to the vector $\theta_{XX}$ to decide the coefficients of equation (7), and it is possible to specify an ellipsoidal equation having the coordinates indicated by the magnetic data $q_1$ to $q_N$ on the surface thereof.

When considering a measurement error of the three-dimensional magnetic sensor 60, however, all of the coordinates indicated by the magnetic data $q_1$ to $q_N$ are not present at correct coincidence positions on the ellipsoid represented by equation (7). Consequently, equation (8) does not have a solution, and it is not possible to calculate the vector $\theta_{XX}$ as a solution of equation (8). In this embodiment, therefore, the vector $\theta_{XX}$ presumed to be the solution of equation (8) is calculated using a statistical method.

For example, on the assumption that eight terms (xy, xz, $y^2$, yz, $z^2$, x, y, and z) present at the right side of equation (7) are independent variables, and $x^2$ present at the left side of equation (7) is a dependent variable, a normal equation represented by equation (14) is derived using a least squares method, and the vector $\theta_{XX}$ is found as a solution thereof. The vector $\theta_{XX}$ represented as the solution of the normal equation can be represented by equation (15) when a matrix $(R_{xx}^T R_{xx})$ is regular. An ellipsoid represented by applying the vector $\theta_{XX}$ calculated by equation (15) to equation (7) as a coefficient is referred to as a first ellipsoid $V_{xx}$.

$$R_{xx}^T R_{xx} \theta_{XX} = R_{xx}^T W_{xx} \quad (14)$$

$$\theta_{XX} = (R_{xx}^T R_{xx})^{-1} R_{xx}^T W_{xx} \quad (15)$$

Figure 11:
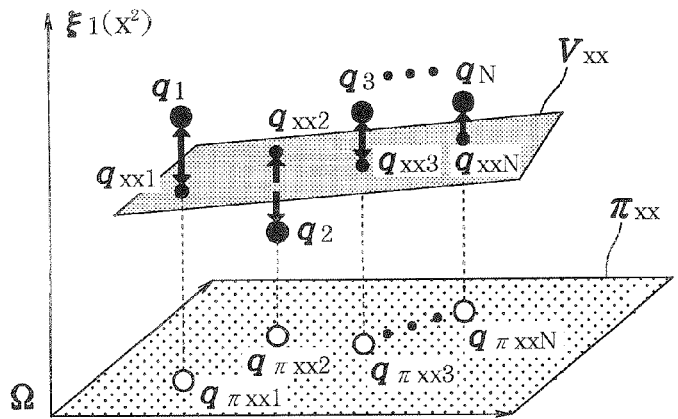
FIGS. 11(A), 11(B) and 11(C) are conceptual views illustrating a first ellipsoid, a second ellipsoid, and a third ellipsoid according to an embodiment of the present invention.
Figure 11:
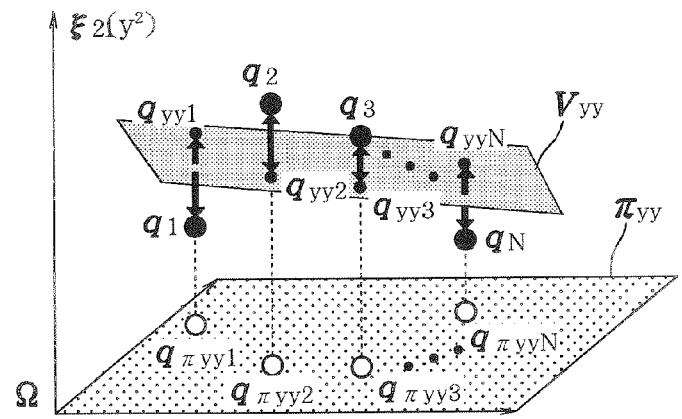
Figure 11:
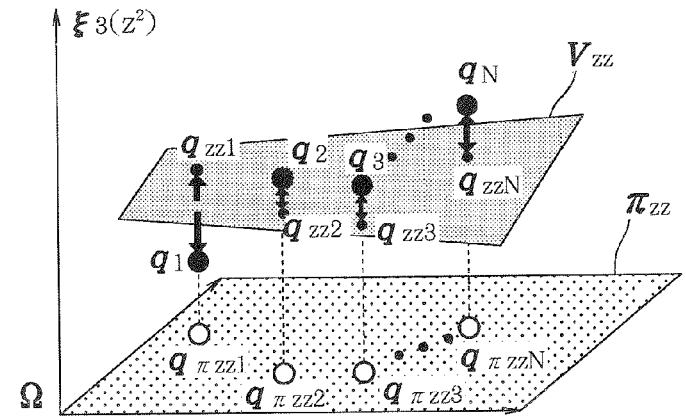

Here, as shown in FIG. 11(A), the magnetic data $q_1$ to $q_N$ are plotted on a nine-dimensional space $\Omega$ consisting of an eight-dimensional space $\pi_{xx}$ having eight axes representing xy, xz, $y^2$, yz, $z^2$, x, y, and z as variables and a first evaluation axis $\xi_1$ representing the value of $z^2$ as a variable. At this time, the ellipsoid $V_{xx}$ is found as a three-dimensional figure (an eight-dimensional plane in the space $\Omega$) which minimizes errors between the ellipsoid $V_{xx}$ and the coordinates indicated by the magnetic data $q_1$ to $q_N$ in the space $\Omega$ in a direction of the first evaluation axis $\xi_1$. That is, the ellipsoid $V_{xx}$ is set as a three-dimensional figure which minimizes errors between values $q_{xx1}$ to $q_{xxN}$ obtained by substituting a plurality of eight-dimensional vectors $q_{\pi xx1}$ to $q_{\pi xxN}$ obtained by plotting the magnetic data $q_1$ to $q_N$ in the space $\pi_{xx}$ into the right side of equation (7) and square values $x_1^2$ to $x_N^2$ of x axis components of the coordinates indicated by the magnetic data $q_1$ to $q_N$.

The equation of the first ellipsoid $V_{xx}$ represented by equation (7) is modified into equation (16) using a first ellipsoidal coefficient matrix $D_{xx}$ represented by equation (17). At this time, the coordinates of the central point $c_{xx}$ of the first ellipsoid $V_{xx}$ are represented by equation (18). As described above, the first ellipsoid generation unit 311 calculates and outputs the first ellipsoidal coefficient matrix $D_{xx}$ and the central point $c_{xx}$ of the first ellipsoid $V_{xx}$. Meanwhile, a condition necessary for equation (16) to represent the ellipsoid is that the first ellipsoidal coefficient matrix $D_{xx}$ is positive definite.

$$q^T D_{xx} q + \begin{bmatrix} \dfrac{\theta_x}{\theta_{xx}} & \dfrac{\theta_y}{\theta_{xx}} & \dfrac{\theta_z}{\theta_{xx}} \end{bmatrix} q + \dfrac{\theta_r}{\theta_{xx}} = 0 \quad (16)$$

$$D_{xx} = \begin{bmatrix} 1 & \dfrac{\theta_{xy}}{2\theta_{xx}} & \dfrac{\theta_{xz}}{2\theta_{xx}} \\ \dfrac{\theta_{xy}}{2\theta_{xx}} & \dfrac{\theta_{yy}}{\theta_{xx}} & \dfrac{\theta_{yz}}{2\theta_{xx}} \\ \dfrac{\theta_{xz}}{2\theta_{xx}} & \dfrac{\theta_{yz}}{2\theta_{xx}} & \dfrac{\theta_{zz}}{\theta_{xx}} \end{bmatrix} \quad (17)$$

$$c_{xx} = -\dfrac{1}{2\theta_{xx}} D_{xx}^{-1} \begin{bmatrix} \theta_x \\ \theta_y \\ \theta_z \end{bmatrix} \quad (18)$$

Next, the ellipsoidal equation represented by equation (6) is modified into the following equation (19).

$$-y^2 = \dfrac{\theta_{xx}}{\theta_{yy}} x^2 + \dfrac{\theta_{xy}}{\theta_{yy}} xy + \dfrac{\theta_{xz}}{\theta_{yy}} xz + \quad (19)$$
$$\dfrac{\theta_{yz}}{\theta_{yy}} yz + \dfrac{\theta_{zz}}{\theta_{yy}} z^2 + \dfrac{\theta_x}{\theta_{yy}} x + \dfrac{\theta_y}{\theta_{yy}} y + \dfrac{\theta_z}{\theta_{yy}} z + \dfrac{\theta_r}{\theta_{yy}}$$

The equation represented by equation (19) is modified into equation (20), which is a simultaneous linear equation having each element of a vector $\theta_{YY}$ as a variable. Since it is not possible to calculate the vector $\theta_{YY}$ as a solution of equation (20) in the same manner as equation (8), the vector $\theta_{YY}$ is calculated as a value presumed to be the solution of equation (20). Specifically, in a normal equation represented by equation (24), the vector $\theta_{YY}$ is calculated by equation (25) when a matrix $(R_{yy}^T R_{yy})$ is regular. An ellipsoid represented by applying the vector $\theta_{yy}$ specified by equation (25) to equation (19) as a coefficient is referred to as a second ellipsoid $V_{yy}$. Meanwhile, the vector $\theta_{YY}$ is a nine-dimensional vector represented by equation (21), a matrix $R_{yy}$ is a matrix of N×9 represented by equation (22), and a vector $W_{yy}$ is an N-dimensional vector represented by equation (23).

$$R_{yy} \theta_{YY} = W_{yy} \quad (20)$$

$$\theta_{YY} = \begin{bmatrix} \dfrac{\theta_{xx}}{\theta_{yy}} & \dfrac{\theta_{xy}}{\theta_{yy}} & \dfrac{\theta_{xz}}{\theta_{yy}} & \dfrac{\theta_{yz}}{\theta_{yy}} & \dfrac{\theta_{zz}}{\theta_{yy}} & \dfrac{\theta_x}{\theta_{yy}} & \dfrac{\theta_y}{\theta_{yy}} & \dfrac{\theta_z}{\theta_{yy}} & \dfrac{\theta_r}{\theta_{yy}} \end{bmatrix}^T \quad (21)$$

$$R_{yy} = \begin{bmatrix} x_1^2 & x_1 y_1 & x_1 z_1 & y_1 z_1 & z_1^2 & x_1 & y_1 & z_1 & 1 \\ \vdots & \vdots & \vdots & \vdots & \vdots & \vdots & \vdots & \vdots & \vdots \\ x_N^2 & x_N y_N & x_N z_N & y_N z_N & z_N^2 & x_N & y_N & z_N & 1 \end{bmatrix} \quad (22)$$

$$W_{yy} = \begin{bmatrix} -y_1^2 \\ \vdots \\ -y_N^2 \end{bmatrix} \quad (23)$$

$$R_{yy}^T R_{yy} \theta_{YY} = R_{yy}^T W_{yy} \quad (24)$$

$$\theta_{YY} = (R_{yy}^T R_{yy})^{-1} R_{yy}^T W_{yy} \quad (25)$$

Here, as shown in FIG. 11(B), the magnetic data $q_1$ to $q_N$ are plotted on a nine-dimensional space $\Omega$ consisting of an eight-dimensional space $\pi_{yy}$ having eight axes representing $x^2$, xy, xz, yz, $z^2$, x, y, and z as variables and a second evaluation axis $\xi_2$ representing the value of $y^2$ as a variable. At this time, the ellipsoid $V_{yy}$ is found as a three-dimensional figure (an eight-dimensional plane in the space $\Omega$) which minimizes errors between the ellipsoid $V_{yy}$ and the coordinates indicated by the magnetic data $q_1$ to $q_N$ in the space $\Omega$ in a direction of the second evaluation axis $\xi_2$. That is, the ellipsoid $V_{yy}$ is set as a three-dimensional figure which minimizes errors between values $q_{yy1}$ to $q_{yyN}$ obtained by substituting a plurality of eight-dimensional vectors $q_{\pi yy1}$ to $q_{\pi yyN}$ obtained by plotting the magnetic data $q_1$ to $q_N$ in the space $\pi_{yy}$ into the right side of equation (19) and square values $y_1^2$ to $y_N^2$ of y axis components of the coordinates indicated by the magnetic data $q_1$ to $q_N$.

The equation of the first ellipsoid $V_{yy}$ represented by equation (19) is modified into equation (26) using a second ellipsoidal coefficient matrix $D_{yy}$ represented by equation (27). At this time, the coordinates of the central point $c_{yy}$ of the second ellipsoid $V_{yy}$ are represented by equation (28). As described above, the second ellipsoid generation unit 312 calculates and outputs the second ellipsoidal coefficient matrix $D_{yy}$ and the central point $c_{yy}$ of the second ellipsoid $V_{yy}$. Meanwhile, a condition necessary for equation (26) to represent the ellipsoid is that the second ellipsoidal coefficient matrix $D_{yy}$ is positive definite.

$$q^T D_{yy} q + \left[ \frac{\theta_x}{\theta_{yy}} \quad \frac{\theta_y}{\theta_{yy}} \quad \frac{\theta_z}{\theta_{yy}} \right] q + \frac{\theta_r}{\theta_{yy}} = 0 \tag{26}$$

$$D_{yy} = \begin{bmatrix} \frac{\theta_{xx}}{\theta_{yy}} & \frac{\theta_{xy}}{2\theta_{yy}} & \frac{\theta_{xz}}{2\theta_{yy}} \\ \frac{\theta_{xy}}{2\theta_{yy}} & 1 & \frac{\theta_{yz}}{2\theta_{yy}} \\ \frac{\theta_{xz}}{2\theta_{yy}} & \frac{\theta_{yz}}{2\theta_{yy}} & \frac{\theta_{zz}}{\theta_{yy}} \end{bmatrix} \tag{27}$$

$$c_{yy} = -\frac{1}{2\theta_{yy}} D_{yy}^{-1} \begin{bmatrix} \theta_x \\ \theta_y \\ \theta_z \end{bmatrix} \tag{28}$$

Next, the ellipsoidal equation represented by equation (6) is modified into the following equation (29).

$$-z^2 = \tag{29}$$

$$\frac{\theta_{xx}}{\theta_{zz}} x^2 + \frac{\theta_{xy}}{\theta_{zz}} xy + \frac{\theta_{xz}}{\theta_{zz}} xz + \frac{\theta_{yy}}{\theta_{zz}} y^2 + \frac{\theta_{yz}}{\theta_{zz}} yz + \frac{\theta_x}{\theta_{zz}} x + \frac{\theta_y}{\theta_{zz}} y + \frac{\theta_z}{\theta_{zz}} z + \frac{\theta_r}{\theta_{zz}}$$

The equation represented by equation (29) is modified into equation (30), which is a simultaneous linear equation having each element of a vector $\theta_{ZZ}$ as a variable. Since it is not possible to calculate the vector $\theta_{ZZ}$ as a solution of equation (29) in the same manner as equation (8), the vector $\theta_{ZZ}$ is calculated as a value presumed to be the solution of equation (29). Specifically, in a normal equation represented by equation (34), the vector $\theta_{ZZ}$ is calculated by equation (35) when a matrix ($R_{zz}^T R_{zz}$) is regular. An ellipsoid represented by applying the vector $\theta_{ZZ}$ specified by equation (35) to equation (29) as a coefficient is referred to as a third ellipsoid $V_{zz}$. Meanwhile, the vector $\theta_{ZZ}$ is a nine-dimensional vector represented by equation (31), a matrix $R_{zz}$ is a matrix of N×9 represented by equation (32), and a vector $W_{zz}$ is an N-dimensional vector represented by equation (33).

$$R_{zz} \theta_{ZZ} = W_{zz} \tag{30}$$

$$\theta_{ZZ} = \left[ \frac{\theta_{xx}}{\theta_{zz}} \quad \frac{\theta_{xy}}{\theta_{zz}} \quad \frac{\theta_{xz}}{\theta_{zz}} \quad \frac{\theta_{yy}}{\theta_{zz}} \quad \frac{\theta_{yz}}{\theta_{zz}} \quad \frac{\theta_x}{\theta_{zz}} \quad \frac{\theta_y}{\theta_{zz}} \quad \frac{\theta_z}{\theta_{zz}} \quad \frac{\theta_r}{\theta_{zz}} \right]^T \tag{31}$$

$$R_{zz} = \begin{bmatrix} x_1^2 & x_1 y_1 & x_1 z_1 & y_1^2 & y_1 z_1 & x_1 & y_1 & z_1 & 1 \\ \vdots & \vdots & \vdots & \vdots & \vdots & \vdots & \vdots & \vdots & \vdots \\ x_N^2 & x_N y_N & x_N z_N & y_N^2 & y_N z_N & x_N & y_N & z_N & 1 \end{bmatrix} \tag{32}$$

$$W_{zz} = \begin{bmatrix} -z_1^2 \\ \vdots \\ -z_N^2 \end{bmatrix} \tag{33}$$

$$R_{zz}^T R_{zz} \theta_{ZZ} = R_{zz}^T W_{zz} \tag{34}$$

$$\theta_{ZZ} = (R_{zz}^T R_{zz})^{-1} R_{zz}^T W_{zz} \tag{35}$$

Here, as shown in FIG. 11(C), the magnetic data $q_1$ to $q_N$ are plotted on a nine-dimensional space $\Omega$ consisting of an eight-dimensional space $\pi_{zz}$ having eight axes representing $x^2$, xy, xz, $y^2$, yz, x, y, and z as variables and a third evaluation axis $\xi_3$ representing the value of $z^2$ as a variable. At this time, the ellipsoid $V_{zz}$ is found as a three-dimensional figure (an eight-dimensional plane in the space $\Omega$) which minimizes errors between the ellipsoid $V_{zz}$ and the coordinates indicated by the magnetic data $q_1$ to $q_N$ in the space $\Omega$ in a direction of the third evaluation axis $\xi_3$. That is, the ellipsoid $V_{zz}$ is set as a three-dimensional figure which minimizes errors between values $q_{zz1}$ to $q_{zzN}$ obtained by substituting a plurality of eight-dimensional vectors $q_{\pi zz1}$ to $q_{\pi zzN}$ obtained by plotting the magnetic data $q_1$ to $q_N$ in the space $\pi_{zz}$ into the right side of equation (29) and square values $z_1^2$ to $z_N^2$ of z axis components of the coordinates indicated by the magnetic data $q_1$ to $q_N$.

The equation of the third ellipsoid $V_{zz}$ represented by equation (29) is modified into equation (36) using a third ellipsoidal coefficient matrix $D_{zz}$ represented by equation (37). At this time, the coordinates of the central point $c_{zz}$ of the third ellipsoid $V_{zz}$ are represented by equation (38). As described above, the third ellipsoid generation unit 313 calculates and outputs the third ellipsoidal coefficient matrix $D_{zz}$ and the central point $c_{zz}$ of the third ellipsoid $V_{zz}$. Meanwhile, a condition necessary for equation (36) to represent the ellipsoid is that the third ellipsoidal coefficient matrix $D_{zz}$ is positive definite.

$$q^T D_{zz} q + \left[ \frac{\theta_x}{\theta_{zz}} \quad \frac{\theta_y}{\theta_{zz}} \quad \frac{\theta_z}{\theta_{zz}} \right] q + \frac{\theta_r}{\theta_{zz}} = 0 \tag{36}$$

$$D_{zz} = \begin{bmatrix} \frac{\theta_{xx}}{\theta_{zz}} & \frac{\theta_{xy}}{2\theta_{zz}} & \frac{\theta_{xz}}{2\theta_{zz}} \\ \frac{\theta_{xy}}{2\theta_{zz}} & \frac{\theta_{yy}}{\theta_{zz}} & \frac{\theta_{yz}}{2\theta_{zz}} \\ \frac{\theta_{xz}}{2\theta_{zz}} & \frac{\theta_{yz}}{2\theta_{zz}} & 1 \end{bmatrix} \tag{37}$$

$$c_{zz} = -\frac{1}{2\theta_{zz}} D_{zz}^{-1} \begin{bmatrix} \theta_x \\ \theta_y \\ \theta_z \end{bmatrix} \tag{38}$$

In this way, the initial ellipsoid generation unit 310 calculates and outputs the first ellipsoidal coefficient matrix $D_{xx}$, the second ellipsoidal coefficient matrix $D_{yy}$, the third ellipsoidal coefficient matrix $D_{zz}$, the coordinates of the central point $c_{xx}$, the coordinates of the central point $c_{yy}$, and the coordinates of the central point $c_{zz}$.

As shown in FIG. 10, the initial ellipsoid decision unit 320 includes an initial ellipsoidal coefficient matrix decision unit 321 and an initial ellipsoidal central point decision unit 322. The first ellipsoidal coefficient matrix $D_{xx}$, the second ellipsoidal coefficient matrix $D_{yy}$, the third ellipsoidal coefficient matrix $D_{zz}$, the coordinates of the central point $c_{xx}$, the coordinates of the central point $c_{yy}$, and the coordinates of the central point $c_{zz}$ are supplied to the initial ellipsoidal coefficient matrix decision unit 321 and the initial ellipsoidal central point decision unit 322.

The initial ellipsoidal coefficient matrix decision unit 321 decides whether or not a condition (first condition) that all of the first ellipsoidal coefficient matrix $D_{xx}$, the second ellipsoidal coefficient matrix $D_{yy}$, and the third ellipsoidal coefficient matrix $D_{zz}$ are positive definite is satisfied. Also, the initial ellipsoidal central point decision unit 322 decides whether or not a condition (second condition) that the distance between the central point $c_{xx}$ and the central point $c_{yy}$ is equal to or less than a first threshold value $\Delta c$ as represented by equation (39), the distance between the central point $c_{yy}$ and the central point $c_{zz}$ is equal to or less than the first threshold value $\Delta c$ as represented by equation (40), and the distance between the central point $c_{zz}$ and the central point $c_{xx}$ is equal to or less than the first threshold value $\Delta c$ as represented by equation (41) is satisfied.

In a case where the decision result according to the first condition is affirmative, and the decision result according to the second condition is affirmative, the initial ellipsoid decision unit 320 outputs the first ellipsoidal coefficient matrix $D_{xx}$, the second ellipsoidal coefficient matrix $D_{yy}$, the third ellipsoidal coefficient matrix $D_{zz}$, the coordinates of the central point $c_{xx}$, the coordinates of the central point $c_{yy}$, and the coordinates of the central point $c_{zz}$.

On the other hand, in a case where the decision result according to the first condition or the second condition is negative, the geomagnetism measurement apparatus interrupts processing.

$$\|c_{xx}-c_{yy}\|_2 \leq \Delta c \tag{39}$$

$$\|c_{yy}-c_{zz}\|_2 \leq \Delta c \tag{40}$$

$$\|c_{zz}-c_{xx}\|_2 \leq \Delta c \tag{41}$$

Meanwhile, although, in this embodiment, the initial ellipsoid decision unit 320, including the initial ellipsoidal coefficient matrix decision unit 321 and the initial ellipsoidal central point decision unit 322, decides whether or not both of the first condition and the second condition are satisfied, the present invention is not limited to such a decision method.

For example, the initial ellipsoid decision unit 320 may be configured not to include the initial ellipsoidal coefficient matrix decision unit 321. In this case, the initial ellipsoid decision unit 320 may not perform decision based on the first condition but may perform decision based on the second condition, and, in a case where the decision result is affirmative, the initial ellipsoid decision unit 320 may output the first ellipsoidal coefficient matrix $D_{xx}$, the second ellipsoidal coefficient matrix $D_{yy}$, the third ellipsoidal coefficient matrix $D_{zz}$, the coordinates of the central point $c_{xx}$, the coordinates of the central point $c_{yy}$, and the coordinates of the central point $c_{zz}$.

In a case where the result of the decision performed by the initial ellipsoid decision unit 320 is affirmative, the initial correction value generation unit 330 calculates the initial ellipsoidal correction matrix $T_O$ and the coordinates of the initial central point $c_{EO}$ based on the output from the initial ellipsoid decision unit 320.

Figure 12:
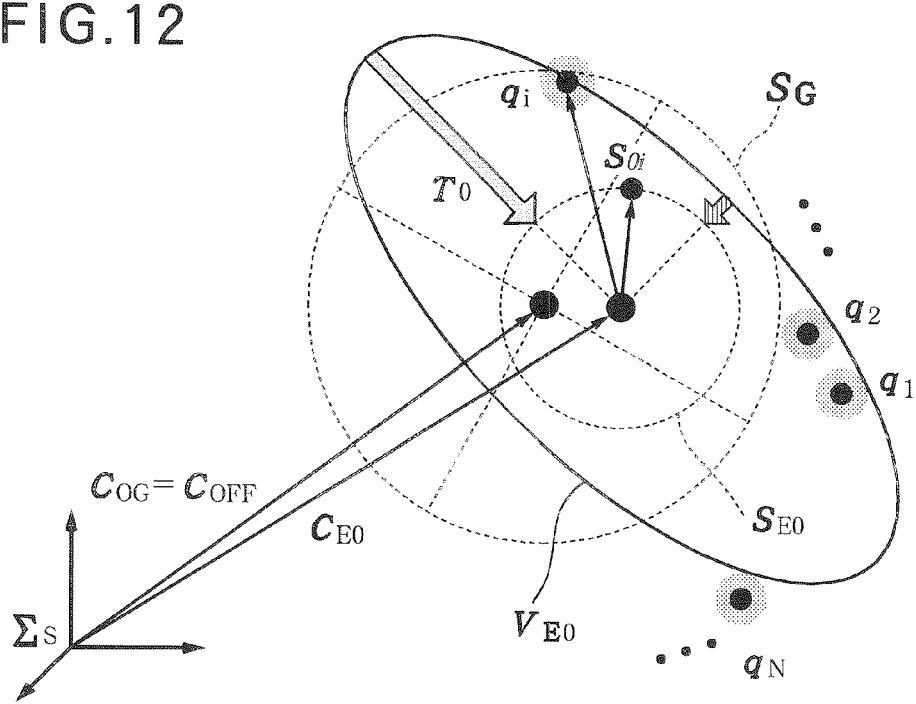
FIG. 12 is a conceptual view illustrating an initial ellipsoidal correction matrix according to an embodiment of the present invention.

Here, the initial ellipsoidal correction matrix $T_O$ is a symmetric matrix for converting the coordinates on the initial ellipsoid $V_{EO}$ having the initial central point $c_{EO}$ as the central point into the coordinates on the spherical surface $S_{EO}$ having the initial central point $c_{EO}$ as the central point as shown in FIG. 12. The initial ellipsoid $V_{EO}$ is an ellipsoid set based on at least one ellipsoid selected from among the first ellipsoid $V_{xx}$, the second ellipsoid $V_{yy}$, and the third ellipsoid $V_{zz}$. In addition, the initial ellipsoid $V_{EO}$ is an ellipsoid having the coordinates indicated by the magnetic data $q_1$ to $q_N$ in the vicinity of the surface thereof.

A concrete method of calculating the initial ellipsoidal correction matrix $T_O$ will be described. First, a method of calculating the ellipsoidal correction matrix $T_E$ on the assumption that the shape of the ellipsoid $V_E$ is well known, will be described (see paragraph 0043 and FIG. 7). The ellipsoidal correction matrix $T_E$ is a matrix for converting the coordinates on the ellipsoid $V_E$ into the coordinates on the spherical surface $S_E$ having the radius 1 with the central point $c_{OG}$ of the ellipsoid $V_E$ as the center. The ellipsoidal correction matrix $T_E$ is calculated based on the ellipsoidal coefficient matrix D representing the shape of the ellipsoid $V_E$ and the central point $c_{OG}$ of the ellipsoid $V_E$.

The ellipsoidal equation indicating the ellipsoid $V_E$ represented by equation (6) can be modified into the following equation (42) using the ellipsoidal coefficient matrix D represented by the following equation (43). Also, the coordinates indicated by the central point $c_{OG}$ of the ellipsoid $V_E$ are represented by the following equation (44).

$$q^T D q + [\theta_x \quad \theta_y \quad \theta_z] q + \theta_r = 0 \tag{42}$$

$$D = \begin{bmatrix} \theta_{xx} & \frac{1}{2}\theta_{xy} & \frac{1}{2}\theta_{xz} \\ \frac{1}{2}\theta_{xy} & \theta_{yy} & \frac{1}{2}\theta_{yz} \\ \frac{1}{2}\theta_{xz} & \frac{1}{2}\theta_{yz} & \theta_{zz} \end{bmatrix} \tag{43}$$

$$c_{0G} = -\frac{1}{2}D^{-1}\begin{bmatrix} \theta_x \\ \theta_y \\ \theta_z \end{bmatrix} \tag{44}$$

Here, in a case where a relationship of equation (45) is realized between a positive definite symmetric matrix G of M and M and a positive definite symmetric matrix H of M and M, the matrix G is referred to as a square root matrix of the matrix H. In the following, the square root matrix G of the matrix H is expressed as a half square of the matrix as represented by equation (46).

$$G^2 = GG = H \tag{45}$$

$$G = H^{1/2} \tag{46}$$

At this time, the square root matrix G of the matrix H is found by equation (47). Where, a matrix U and a matrix $\Lambda$ are calculated by diagonalizing the matrix H as represented by equation (48). Specifically, the matrix $\Lambda$ is a matrix of M×M having M positive eigenvalues $\lambda_{H1}$ to $\lambda_{HM}$ of the matrix H as diagonal components as represented by equation (49), and the matrix U is a rotational matrix of M×M obtained by normalizing eigenvectors corresponding to the eigenvalues $\lambda_{H1}$ to $\lambda_{HM}$ of the matrix H and arranging the normalized eigenvectors at each column.

$$G = U^T \Lambda^{\frac{1}{2}} U = U^T \begin{bmatrix} \sqrt{\lambda_{H1}} & 0 & 0 \\ 0 & \ddots & 0 \\ 0 & 0 & \sqrt{\lambda_{HM}} \end{bmatrix} U \quad (47)$$

$$UHU^T = \Lambda \quad (48)$$

$$\Lambda = \begin{bmatrix} \lambda_{H1} & 0 & 0 \\ 0 & \ddots & 0 \\ 0 & 0 & \lambda_{HM} \end{bmatrix} \quad (49)$$

A relationship between the ellipsoidal coefficient matrix D and the ellipsoidal correction matrix $T_E$ is represented by the following equation (50) using the square root matrix G defined as described above. Meanwhile, a value r(D) indicates an average value of distances between a plurality of coordinates obtained by converting the coordinates indicated by the magnetic data $q_1$ to $q_N$ using the square root matrix of the ellipsoidal coefficient matrix D and the central point $c_{OG}$, as represented by the following equation (51).

$$T_E = \frac{1}{r(D)} D^{\frac{1}{2}} \quad (50)$$

$$r(D) = \sqrt{\frac{1}{N} \sum_{i=1}^{N} (q_i - c_{0G})^T D(q_i - c_{0G})} \quad (51)$$

Eigenvalues $\lambda_{D1}$, $\lambda_{D2}$, and $\lambda_{D3}$ of the ellipsoidal coefficient matrix D are equal to reciprocals of square values of the lengths $r_{E1}$, $r_{E2}$, and $r_{E3}$ of the main axes of the ellipsoid $V_E$, respectively. Therefore, eigenvalues $\lambda_{T1}$, $\lambda_{T2}$, and $\lambda_{T3}$ of the ellipsoidal correction matrix $T_E$ are equal to reciprocals of the lengths $r_{E1}$, $r_{E2}$, and $r_{E3}$ of the main axes of the ellipsoid $V_E$, respectively. Consequently, it is possible to covert the coordinates on the ellipsoid $V_E$ to the coordinates on the spherical surface $S_E$ having the radius 1 using the ellipsoidal correction matrix $T_E$.

Next, a method of calculating the initial ellipsoidal correction matrix $T_O$ and the coordinates of the initial central point $c_{EO}$ will be described.

The initial ellipsoidal correction matrix $T_O$ is calculated based on at least one selected from among the first ellipsoidal coefficient matrix $D_{xx}$, the second ellipsoidal coefficient matrix $D_{yy}$, and the third ellipsoidal coefficient matrix $D_{zz}$. Also, the coordinates of the initial central point $c_{EO}$ are calculated based on at least one selected from among the central point $c_{xx}$, the central point $c_{yy}$, and the central point $c_{zz}$.

In a case where the above-mentioned second condition is satisfied, the distance between two arbitrary points selected from among the central point $c_{xx}$, the central point $c_{yy}$, and the central point $c_{zz}$ is shorter than the first threshold value $\Delta c$. In a case where the first threshold value $\Delta c$ is sufficiently small, therefore, all of the first ellipsoid $V_{xx}$, the second ellipsoid $V_{yy}$, and the third ellipsoid $V_{zz}$ have the coordinates indicated by the magnetic data $q_1$ to $q_N$ in the vicinity thereof, and all of the central points of the first ellipsoid $V_{xx}$, the second ellipsoid $V_{yy}$, and the third ellipsoid $V_{zz}$ can be regarded as the same coordinates. Consequently, these three ellipsoids (strictly speaking, the three ellipsoids having different shapes) can be regarded as substantially the same ellipsoid. In this case, all of the first ellipsoid $V_{xx}$, the second ellipsoid $V_{yy}$, and the third ellipsoid $V_{zz}$ may be adopted as the initial ellipsoid $V_{EO}$.

In this embodiment, the first ellipsoid $V_{xx}$ is adopted as the initial ellipsoid $V_{EO}$. At this time, the initial ellipsoidal correction matrix $T_O$ and the coordinates of the initial central point $c_{EO}$ are represented by the following equations (52) and (53).

As described above, the initial correction value generation unit 330 generates and outputs the initial ellipsoidal correction matrix $T_O$ and the coordinates of the initial central point $c_{EO}$.

$$T_0 = \frac{1}{r(D_{xx})} (D_{xx})^{\frac{1}{2}} \quad (52)$$

$$c_{E0} = c_{xx} \quad (53)$$

Meanwhile, although, in this embodiment, the initial ellipsoidal correction value generation unit 300 outputs the magnetic data $q_1$ to $q_N$ acquired from the storage unit 100 to the optimal ellipsoidal correction value generation unit 400, the optimal ellipsoidal correction value generation unit 400 may directly acquire the magnetic data $q_1$ to $q_N$ from the storage unit 100.

Also, although, in this embodiment, the first ellipsoid $V_{xx}$ is adopted as the initial ellipsoid $V_{EO}$, the present invention is not limited to such a form. For example, the second ellipsoid $V_{yy}$ may be adopted as the initial ellipsoid $V_{EO}$. At this time, the initial ellipsoidal correction matrix $T_O$ is represented by equation (54), and the central point $c_{yy}$ is adopted as the initial central point $c_{EO}$. Also, the third ellipsoid $V_{zz}$ may be adopted as the initial ellipsoid $V_{EO}$. In this case, the initial ellipsoidal correction matrix $T_O$ is represented by equation (55), and the central point $c_{zz}$ is adopted as the initial central point $c_{EO}$.

$$T_0 = \frac{1}{r(D_{yy})} (D_{yy})^{\frac{1}{2}} \quad (54)$$

$$T_0 = \frac{1}{r(D_{zz})} (D_{zz})^{\frac{1}{2}} \quad (55)$$

Also, the initial ellipsoidal correction matrix $T_O$ may be calculated by the following equation (56). In this case, the coordinates of the initial central point $c_{EO}$ may be calculated by the following equation (57) or (58).

$$T_0 = \frac{1}{r(D_{xx} + D_{yy} + D_{zz})} (D_{xx} + D_{yy} + D_{zz})^{\frac{1}{2}} \quad (56)$$

$$c_{E0} = -\frac{1}{2} (D_{xx} + D_{yy} + D_{zz})^{-1} \begin{bmatrix} \frac{\theta_x}{\theta_{xx}} + \frac{\theta_x}{\theta_{yy}} + \frac{\theta_x}{\theta_{zz}} \\ \frac{\theta_y}{\theta_{xx}} + \frac{\theta_y}{\theta_{yy}} + \frac{\theta_y}{\theta_{zz}} \\ \frac{\theta_z}{\theta_{xx}} + \frac{\theta_z}{\theta_{yy}} + \frac{\theta_z}{\theta_{zz}} \end{bmatrix} \quad (57)$$

$$c_{E0} = \frac{1}{3} (c_{xx} + c_{yy} + c_{zz}) \quad (58)$$

By the way, the method of calculating the initial ellipsoidal correction matrix $T_O$ may include the following method (hereinafter, referred to as a comparative example) (see Non-patent literature 2).

Specifically, first, the ellipsoidal equation represented by equation (6) is divided by an $x^2$ term, a $y^2$ term, or a $z^2$ term so as to be modified into a simultaneous linear equation represented by the following equation (59), which is equivalent to the ellipsoidal equation. Next, a normal equation represented by the following equation (60) is calculated from equation (59) using a least squares method. When a matrix $R^T R$ is regular, a vector 8 indicating the shape of an ellipsoid is calculated by the following equation (61) as a solution of the normal equation represented by equation (60). The initial ellipsoidal correction matrix $T_O$ and the initial central point $c_{EO}$ are calculated using the vector $\theta$ calculated by equation (61) and equations (43), (44), and (50).

Meanwhile, for example, in a case where the ellipsoidal equation represented by equation (6) is divided by the $z^2$ term to calculate the simultaneous linear equation represented by equation (59), the vector $\theta$ is a nine-dimensional vector represented by the following equation (62), a matrix R is a matrix of N×9 represented by the following equation (64), which is generated by transposing vectors obtained by substituting the coordinates indicated by the magnetic data $q_1$ to $q_N$ represented by equation (11) into a nine-dimensional vector Q represented by the following equation (63) and arranging the vectors at each row, and a vector W is a nine-dimensional vector represented by the following equation (65).

$$R\theta = W \quad (59)$$

$$R^T R \theta = R^T W \quad (60)$$

$$\theta = (R^T R)^{-1} R^T W \quad (61)$$

$$\theta = -\left[ \frac{\theta_{xx}}{\theta_{zz}} \ \frac{\theta_{xy}}{\theta_{zz}} \ \frac{\theta_{xz}}{\theta_{zz}} \ \frac{\theta_{yy}}{\theta_{zz}} \ \frac{\theta_{yz}}{\theta_{zz}} \ \frac{\theta_{x}}{\theta_{zz}} \ \frac{\theta_{y}}{\theta_{zz}} \ \frac{\theta_{z}}{\theta_{zz}} \ \frac{\theta_{r}}{\theta_{zz}} \right]^T \quad (62)$$

$$Q = \left[ \frac{x^2}{z^2} \ \frac{xy}{z^2} \ \frac{xz}{z^2} \ \frac{y^2}{z^2} \ \frac{yz}{z^2} \ \frac{x}{z^2} \ \frac{y}{z^2} \ \frac{z}{z^2} \ \frac{1}{z^2} \right]^T \quad (63)$$

$$R = \begin{bmatrix} \frac{x_1^2}{z_1^2} & \frac{x_1 y_1}{z_1^2} & \frac{x_1 z_1}{z_1^2} & \frac{y_1^2}{z_1^2} & \frac{y_1 z_1}{z_1^2} & \frac{x_1}{z_1^2} & \frac{y_1}{z_1^2} & \frac{z_1}{z_1^2} & \frac{1}{z_1^2} \\ \vdots & \vdots & \vdots & \vdots & \vdots & \vdots & \vdots & \vdots & \vdots \\ \frac{x_N^2}{z_N^2} & \frac{x_N y_N}{z_N^2} & \frac{x_N z_N}{z_N^2} & \frac{y_N^2}{z_N^2} & \frac{y_N z_N}{z_N^2} & \frac{x_N}{z_N^2} & \frac{y_N}{z_N^2} & \frac{z_N}{z_N^2} & \frac{1}{z_N^2} \end{bmatrix} \quad (64)$$

$$W = [1 \ 1 \ 1 \ 1 \ 1 \ 1 \ 1 \ 1]^T \quad (65)$$

The comparative example decides the shape of an ellipsoid using the simultaneous linear equation generated by dividing the ellipsoidal equation by the $x^2$ term, the $y^2$ term, or the $z^2$ term. That is, the comparative example calculates one ellipsoid using only one selected from the first evaluation axis $\xi_1$, the first evaluation axis $\xi_2$, and the first evaluation axis $\xi_3$.

In this case, if the selected evaluation axis is changed, the shape of the calculated ellipsoid is changed, although the distribution pattern of the coordinates indicated by the magnetic data $q_1$ to $q_N$ is the same. In the comparative example, however, only one ellipsoid is calculated with the result that it is not possible to confirm the difference in shape between ellipsoids that could be confirmed if two or more ellipsoids are calculated using two or more evaluation axes. For example, on the premise that two or more ellipsoids are calculated, it is not possible to perform decision using the second condition.

Figure 13:
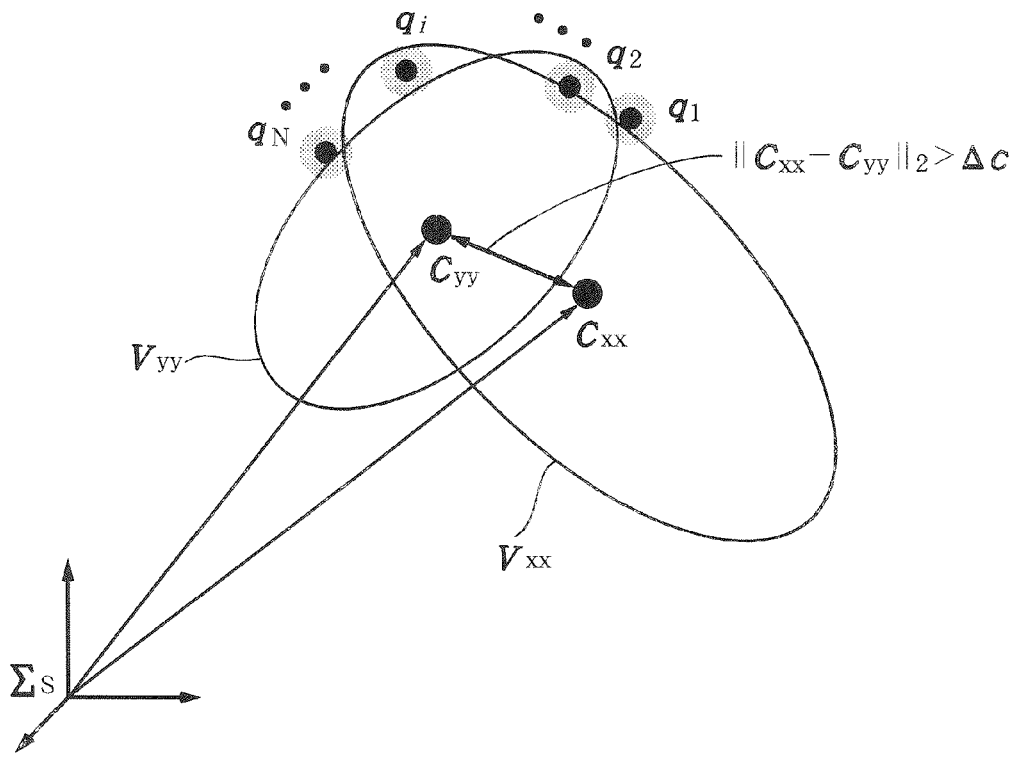
FIG. 13 is a conceptual view illustrating a second condition according to an embodiment of the present invention.

If at least two ellipsoids selected from among the first ellipsoid $V_{xx}$, the second ellipsoid $V_{yy}$, and the third ellipsoid $V_{zz}$ are calculated using the method according to this embodiment as shown in FIG. 13, therefore, the initial ellipsoidal correction matrix $T_O$ is calculated according to the comparative example even in a case where the decision result according to the second condition is no.

Even in a case where it is difficult to specify the shape of the ellipsoid from the distribution pattern of the coordinates indicated by the magnetic data $q_1$ to $q_N$, therefore, the comparative example generates the initial ellipsoidal correction matrix $T_O$ based on an improper initial ellipsoid $V_{EO}$ which does not correctly represent the distribution pattern of the coordinates indicated by the magnetic data $q_1$ to $q_N$.

On the other hand, in generating the initial ellipsoidal correction matrix $T_O$ and the initial central point $c_{EO}$, the initial ellipsoidal correction value generation unit 300 generates the first ellipsoid $V_{xx}$, the second ellipsoid $V_{yy}$, and the third ellipsoid $V_{zz}$. The first ellipsoid $V_{xx}$ is an ellipsoid which minimizes errors between the ellipsoid and the coordinates indicated by the magnetic data $q_1$ to $q_N$ on the basis of the first evaluation axis $\xi_1$ in the space $\Omega$, the second ellipsoid $V_{yy}$ is an ellipsoid which minimizes errors between the ellipsoid and the coordinates indicated by the magnetic data $q_1$ to $q_N$ on the basis of the second evaluation axis $\xi_2$ in the space $\Omega$, and the third ellipsoid $V_{zz}$ is an ellipsoid which minimizes errors between the ellipsoid and the coordinates indicated by the magnetic data $q_1$ to $q_N$ on the basis of the third evaluation axis $\xi_3$ in the space $\Omega$. That is, the initial ellipsoidal correction value generation unit 300 generates three different ellipsoids using three different evaluation axes.

In addition, the initial ellipsoidal correction value generation unit 300 decides that the three different ellipsoids, which have been calculated, have similar shapes using the first condition and the second condition. That is, in a case where the distribution pattern of the coordinates indicated by the magnetic data $q_1$ to $q_N$ is greatly different from the shape of the ellipsoid, and at least one ellipsoid selected from the first ellipsoid $V_{xx}$, the second ellipsoid $V_{yy}$, and the third ellipsoid $V_{zz}$ has a shape different from that of the ellipsoid, the first condition is not satisfied. Also, in a case where the distances between the central points of the three calculated ellipsoids are separated from each other as shown in FIG. 13, the second condition is not satisfied.

In generating the initial ellipsoidal correction matrix $T_O$, as described above, the initial ellipsoidal correction value generation unit 300 generates three different ellipsoids and decides whether or not the first condition and the second condition are satisfied. In a case where it is difficult to specify the shape of the ellipsoid from the distribution pattern of the coordinates indicated by the magnetic data $q_1$ to $q_N$, therefore, it is possible to prevent the generation of an improper initial ellipsoidal correction matrix $T_O$ based on an incorrect initial ellipsoid $V_{EO}$ different from the distribution pattern of the coordinates indicated by the magnetic data $q_1$ to $q_N$.

4. GENERATION OF OPTIMAL ELLIPSOID

The initial ellipsoidal correction matrix $T_O$ is a matrix for expanding and contracting a vector $(q_i - c_{EO})$ having the initial central point $c_{EO}$ as the start point and the coordinates indicated by the magnetic data $q_i$ as the end point along the three main axes of the initial ellipsoid $V_{EO}$ to convert the vector $(q_i - c_{EO})$ to a vector $(s_{oi} - c_{EO})$ having the initial central point $c_{EO}$ as the start point and the coordinates indicated by a magnetic data $s_{oi}$ after conversion as the end point as represented by equation (66). In a case where the coordinates indicated by the magnetic data $q_i$ are present on the initial ellipsoid $V_{EO}$, the coordinates indicated by the magnetic data $s_{oi}$ after conversion are positioned on a spherical surface $S_{EO}$ having the initial central point $c_{EO}$ as the center.

As shown in FIG. 12, the initial ellipsoid $V_{EO}$ is an ellipsoid set to have the coordinates indicated by the magnetic data $q_1$ to $q_N$ in the vicinity thereof but is not an ellipsoid set to minimize errors between the ellipsoid and the coordinates indicated by the magnetic data $q_1$ to $q_N$. In a case where the errors between the coordinates indicated by the magnetic data $q_1$ to $q_N$ and the initial ellipsoid $V_{EO}$ are great, therefore, errors between the coordinates indicated by the initial central point $c_{EO}$, which is the central point of the initial ellipsoid $V_{EO}$, and the coordinates indicated by the central point $c_{OG}$ of the spherical surface $S_G$ representing the geomagnetism $B_g$ become great. In this case, it is not possible to calculate a correct direction of the geomagnetism $B_g$ based on the magnetic data $s_{oi}$ after conversion, obtained by ellipsoidal-correcting the coordinates indicated by the magnetic data $q_i$ using the initial ellipsoidal correction matrix $T_O$ and the initial central point $c_{EO}$, and the initial central point $c_{EO}$.

$$s_{oi} - c_{EO} = T_O(q_i - c_{EO}) \tag{66}$$

In this embodiment, therefore, the coordinates indicated by the magnetic data $q_i$ are ellipsoidal-corrected based on the optimal ellipsoidal correction matrix $T_{OP}$ set based on the optimal ellipsoid $V_{EOP}$ which minimizes errors between the ellipsoid and the coordinates indicated by the magnetic data $q_1$ to $q_N$ and the optimal central point $c_{EOP}$, which is the central point of the optimal ellipsoid $V_{EOP}$. Specifically, the geomagnetism measurement apparatus according to this embodiment adopts the optimal ellipsoidal correction matrix $T_{OP}$ as the ellipsoidal correction matrix $T_E$ and the coordinates indicated by the optimal central point $c_{EOP}$ as the offset $c_{OFF}$ to modify equation (1) to the following equation (67) and to calculate a vector $(s_i - c_{EOP})$ representing the direction of the geomagnetism $^SB_g$. Hereinafter, a vector $(q_i - c_{EOP})$ present at the right side of equation (67) will be referred to as a first magnetic vector, and the vector $(s_i - c_{EOP})$ present at the left side of equation (67) will be referred to as a second magnetic vector.

Since the optimal ellipsoid $V_{EOP}$ is an ellipsoid which minimizes errors between the ellipsoid and the coordinates indicated by the magnetic data $q_1$ to $q_N$, the ellipsoid $V_E$ and the optimal ellipsoid $V_{EOP}$ can be regarded as having the same figure. Consequently, the error between the coordinates indicated by the optimal central point $c_{EOP}$ and the coordinates (the offset $c_{OFF}$) indicated by the central point $C_{OG}$ is less than the error between the coordinates indicated by the initial central point $O_{EO}$ and the coordinates indicated by the central point $c_{OG}$, and therefore, the optimal central point $c_{EOP}$ and the central point $c_{OG}$ can be regarded as indicating the same coordinates. In this way, it is possible to obtain the correct direction of the geomagnetism $B_g$ by ellipsoidal-correcting the coordinates indicated by the magnetic data $q_i$ based on the optimal ellipsoidal correction matrix $T_{OP}$ and the optimal central point $c_{EOP}$. By the way, reciprocal of the determinant of the optimal ellipsoidal correction matrix $T_{OP}$ represents the magnitude of the geomagnetism $B_g$.

$$s_i - c_{EOP} = T_{OP}(q_i - c_{EOP}) \tag{67}$$

The optimal ellipsoidal correction value generation unit 400 performs a nonlinear optimization operation to successively renew each component of a variable matrix T and each element of a variable vector c so that a value of an ellipsoidal optimization function $f_{EL}(T, c)$ represented by the following equation (68) is minimized, and calculates the variable matrix T and the variable vector c when the value of the ellipsoidal optimization function $f_{EL}(T, c)$ is minimized as the optimal ellipsoidal correction matrix $T_{OP}$ and the optimal central point $c_{EOP}$.

Here, the ellipsoidal optimization function $f_{EL}(T, c)$ is a function having the respective components of the variable matrix T, which is a symmetric matrix of 3×3 represented by the following equation (69), and the respective elements of the variable vector c represented by equation (5) as the variables. The ellipsoidal optimization function $f_{EL}(T, c)$ can be represented by the following equation (70). The initial ellipsoidal correction matrix $T_O$ and the initial central point $c_{EO}$ are used as initial values of the variable matrix T and the variable vector c.

$$f_{EL}(T, c) = \sum_{i=1}^{N} (\|T(q_i - c)\| - 1)^2 \tag{68}$$

where $$T = \begin{bmatrix} t_{11} & t_{12} & t_{13} \\ t_{12} & t_{22} & t_{23} \\ t_{13} & t_{23} & t_{33} \end{bmatrix} \tag{69}$$

$$f_{EL}(T, c) = f_{EL}(t_{11}, t_{22}, t_{12}, t_{33}, t_{23}, t_{13}, c_x, c_y, c_z) \tag{70}$$

As represented by equation (68), the ellipsoidal optimization function $f_{EL}(T, c)$ is a function showing to what extent an average value of the lengths of a plurality of second variable vectors $T(q_i - c)$ obtained by converting a plurality of first variable vectors $(q_i - c)$ representing the coordinates indicated by the magnetic data $q_1$ to $q_N$ with the coordinates indicated by the variable vector c as the start point using the variable matrix T is different from 1.

That is, in a case where the second variable vectors $T(q_i - c)$ are disposed so that the coordinates indicated by the variable vector c become the start point, the ellipsoidal optimization function $f_{EL}(T, c)$ represents an error between the coordinates indicated by each of the second variable vectors and a spherical surface having a radius 1 with the coordinates indicated by the variable vector c as the center. At this time, data representing a plurality of coordinates indicated by the second variable vectors $T(q_i - c)$ are referred to as a plurality of data $s_{X1}$ to $s_{XN}$ after conversion. It is possible to minimize errors between the coordinates indicated by the data $s_{X1}$ to $s_{XN}$ after conversion and the spherical surface having the radius 1 with the coordinates indicated by the variable vector c as the center by minimizing the value of the ellipsoidal optimization function $f_{EL}(T, c)$. The data $s_{X1}$ to $s_{XN}$ after conversion at this time represent a plurality of magnetic data $s_1$ to $s_N$ after conversion.

Meanwhile, although, in this embodiment, the second variable vectors $T(q_i - c)$ are disposed with the coordinates indicated by the variable vector c as the start point for the convenience of description, the second variable vectors $T(q_i - c)$ may be disposed so that the origin of the sensor coordinate system $\Sigma_S$ becomes the start point. That is, in a case where the second variable vectors $T(q_i - c)$ is disposed so that the origin of the sensor coordinate system $\Sigma_S$ becomes the start point, equation (68) represents errors between the coordinates indicated by the second variable vectors $T(q_i - c)$ and the spherical surface having the radius 1 with the origin of the sensor coordinate system $\Sigma_S$ as the center. Also, in this case, the magnetic data $s_1$ to $s_N$ after conversion are distributed in the vicinity of the spherical surface having the radius 1 with the origin as the center.

A well-known method may be properly used as the nonlinear optimization operation for minimizing the value indicated by the ellipsoidal optimization function $f_{EL}(T, c)$ to calculate the optimal ellipsoidal correction matrix $T_{OP}$ and the optimal central point $c_{EOP}$. For example, a Newman method may be used as the nonlinear optimization operation.

The nonlinear optimization operation, such as a Newman method and a steepest descent method, successively renews a value of a variable of a nonlinear function to optimize (minimize or maximize) a value indicated by the nonlinear function. Also, when the value of the nonlinear function or the value of the variable satisfies a predetermined stoppage rule, the nonlinear optimization operation stops renewal of the value of the variable, and the value of the variable at this time is adopted as an optimal solution.

Meanwhile, a well-known standard may be properly applied as the stoppage rule of the nonlinear optimization operation. For example, Armijo's rule may be applied.

The nonlinear optimization operation is an operation for calculating an optimal solution of the nonlinear function, i.e. a global optimal solution to minimize (or maximize) the nonlinear function. In a case where an initial value applied to the nonlinear optimization operation is greatly different from the global optimal solution, however, the optimal solution calculated by the nonlinear optimization operation may become a local optimal solution, which is different from the global optimal solution. In a case where an initial value greatly different from the global optimal solution is applied, there is a possibility of the local optimal solution more approximate to the initial value than the global optimal solution being present, and, during repetitive renewal of the solution through the nonlinear optimization operation, there is a great possibility of the solution being renewed to the local optimal solution before the solution is renewed to the global optimal solution. In order to prevent the local optimal solution being calculated through the nonlinear optimization operation, therefore, it is necessary for a value as approximate to the global optimal solution as possible to be adopted as the initial value.

This embodiment calculates the initial ellipsoidal correction matrix $T_O$ and the initial central point $c_{EO}$ based on the initial ellipsoid $V_{EO}$, and applies these values as initial values of the nonlinear optimization operation. The initial ellipsoid $V_{EO}$ set so as to have the coordinates indicated by the magnetic data $q_1$ to $q_N$ in the vicinity thereof has a shape similar to the ellipsoid $V_E$ which minimizes errors between the ellipsoid and the coordinates indicated by the magnetic data $q_1$ to $q_N$. Consequently, the initial ellipsoidal correction matrix $T_O$ and the coordinates indicated by the initial central point $c_{EO}$ are values approximate to the ellipsoidal correction matrix $T_E$ and the coordinates indicated by the central point $c_{OG}$, which are values to be calculated as the global optimal solution (see FIGS. 7 and 12). The optimal ellipsoidal correction matrix $T_{OP}$ and the coordinates indicated by the optimal central point $c_{EOP}$ calculated through the nonlinear optimization operation using such initial values do not become the local optimal solution but become the global optimal solution (strictly speaking, values approximate to the global optimal solution). In this way, the nonlinear optimization operation according this embodiment sets proper initial values having the values approximate to the global optimal solution, and therefore, it is possible to calculate the global optimal solution as the optimal solution without falling into the local optimal solution.

By the way, although, in this embodiment, the variable matrix T, which is a real symmetric matrix, is used as the variable of the ellipsoidal optimization function $f_{EL}(T, c)$ to be optimized in the nonlinear optimization operation as represented by equation (69), a method of performing the nonlinear optimization operation using a variable matrix $T_R$ representing a general real matrix which is not limited to a symmetric matrix instead of the variable matrix T may also be used (see Non-patent literature 1).

Figure 14:
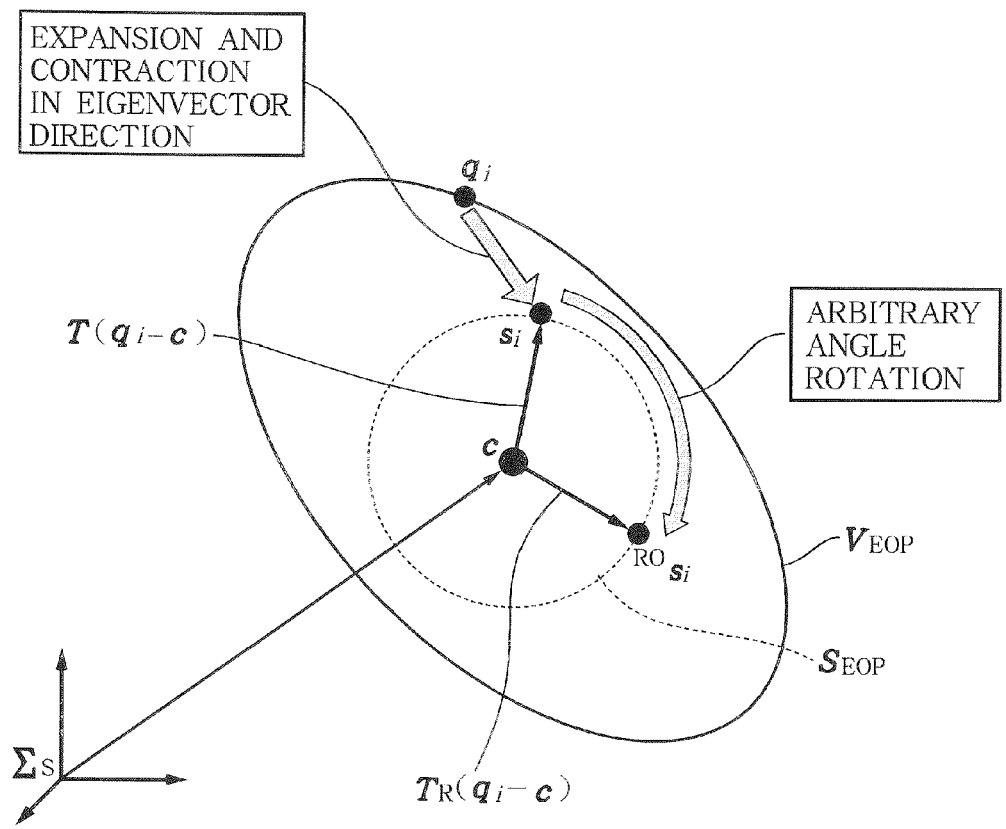
FIG. 14 is a conceptual view illustrating a case in which rotation is generated in ellipsoidal correction.

However, the variable matrix $T_R$ which is not limited to the symmetric matrix may represent coordinate conversion for rotating the direction of an arbitrary vector in addition to coordinate conversion for expanding and contracting the arbitrary vector in three eigenvector directions of the variable matrix $T_R$. As a result, vectors $T_R(q_i-c)$ obtained by converting the first variable vectors $(q_i-c)$ using the variable matrix $T_R$ may be calculated as vectors obtained by rotating the second variable vectors $T(q_i-c)$ by an arbitrary angle. That is, as shown in FIG. 14, coordinates indicated by magnetic data $^{RO}s_i$ after conversion, which are calculated using the variable matrix $T_R$, are calculated as coordinates obtained by rotating the coordinates indicated by the magnetic data $s_i$ after conversion, which are calculated using the variable matrix T, on the spherical surface $S_{EOP}$ by an arbitrary angle.

In this case, it is difficult to calculate the direction of the geomagnetism $B_g$ based on the coordinates indicated by the magnetic data $^{RO}s_i$ after conversion, which are calculated using the variable matrix $T_R$.

According to non-patent literature 1, an angle of rotation generated in coordinate conversion performed by the variable matrix $T_R$ is specified using a reference magnetic field, a direction of which is well known when viewed from the three-dimensional magnetic sensor 60, and the coordinates indicated by the magnetic data $s_i$ after conversion in a case where no rotation is generated in the coordinate conversion are calculated. In this method, it is necessary for the instrument 1 to have an opportunity to measure the reference magnetic field.

In this embodiment, on the other hand, the variable matrix T is limited to a real symmetric matrix. The real symmetric matrix has three eigenvectors perpendicular to each other and three eigenvalues corresponding to the three eigenvectors. Also, in a case where a vector is converted using the real symmetric matrix, the vector after conversion is calculated as the sum of three vectors obtained by expanding and contracting the three vectors by only the corresponding eigenvalues without changing the directions of the vectors when the vector before conversion is represented as the sum of the three vectors directed in the directions of the three eigenvectors of the real symmetric matrix. That is, the real symmetric matrix is a matrix for performing coordinate conversion to expand and contract an arbitrary vector in a direction of each eigenvector of the real symmetric matrix.

Consequently, the nonlinear optimization operation using the variable matrix T, which is the real symmetric matrix, calculates the optimal ellipsoidal correction matrix $T_{OP}$ as a matrix representing coordinate conversion to expand and contract an arbitrary vector in a direction of each eigenvector of the optimal ellipsoidal correction matrix $T_{OP}$, and therefore, coordinate conversion with rotation is not performed by the optimal ellipsoidal correction matrix $T_{OP}$. It is possible to obtain the correct direction of the geomagnetism $B_g$ by converting the coordinates indicated by the magnetic data $q_i$ into the coordinates indicated by the magnetic data $s_i$ after conversion using such optimal ellipsoidal correction matrix $T_{OP}$.

Also, the variable matrix $T_R$ is a matrix of 3×3, thus having nine independent components, and an ellipsoidal optimization function $f_{EL}(T_R, c)$ has twelve variables. On the other hand, the variable matrix T according to this embodiment is a symmetric matrix, thus having six independent components, and the ellipsoidal optimization function $f_{EL}(T, c)$ has nine variables. Consequently, the nonlinear optimization operation according to this embodiment has fewer variables than the nonlinear optimization operation using the variable matrix $T_R$, whereby calculation load is reduced.

Meanwhile, the optimal ellipsoidal correction value generation unit 400 may decide that the optimal ellipsoidal correction matrix $T_{OP}$ is a positive definite matrix, and may output the optimal ellipsoidal correction matrix $T_{OP}$ and the optimal central point $c_{EOP}$. Since the optimal ellipsoidal correction matrix $T_{OP}$ is a matrix for expanding and contracting coordinates on an ellipsoid in the main axis directions of the ellipsoid to convert the coordinates on the ellipsoid to coordinates on a spherical surface, all of the three eigenvalues of the optimal ellipsoidal correction matrix $T_{OP}$ are positive values.

The optimal ellipsoidal correction matrix $T_{OP}$ and the optimal central point $c_{EOP}$ output by the optimal ellipsoidal correction value generation unit 400 are stored in the storage unit 100.

5. CALCULATION OF GEOMAGNETISM

As previously described, the geomagnetism calculation unit 600, including the offset adoption unit 610 and the geomagnetic vector calculation unit 620, performs ellipsoidal correction with respect to the coordinates indicated by the magnetic data $q_i$ output from the three-dimensional magnetic sensor 60 to calculate the direction of geomagnetism $B_g$ (see FIG. 9). Hereinafter, the operation of the geomagnetism calculation unit 600 will be described.

First, the offset adoption unit 610 reads out the optimal central point $c_{EOP}$ and optimal ellipsoidal correction matrix $T_{OP}$ from the storage unit 100, then adopts or sets the optimal ellipsoidal correction matrix $T_{OP}$ as the ellipsoidal correction matrix $T_E$, and adopts a vector indicating the coordinates of the optimal central point $c_{EOP}$ as the offset $c_{OFF}$. Consequently, it is possible for the geomagnetism measurement apparatus according to this embodiment to modify equation (1) representing ellipsoidal correction to equation (67) and to perform ellipsoidal correction based on equation (67).

Next, the geomagnetic vector calculation unit 620 performs ellipsoidal correction based on equation (67) to calculate the direction of geomagnetism $B_g$. Specifically, the geomagnetic vector calculation unit 620 converts first magnetic vectors $(q_i - c_{EOP})$ having the coordinates of the optimal central point $c_{EOP}$, which is the offset $c_{OFF}$, as the start point and the coordinates indicated by the magnetic data $q_i$ as the end point using the optimal ellipsoidal correction matrix $T_{OP}$ to calculate second magnetic vectors $(s_i - c_{EOP})$. At this time, the second magnetic vectors $(s_i - c_{EOP})$ are directed in the same direction as the geomagnetism $B_g$ if a misalignment angle $\phi$ is not considered. In case of necessity, the geomagnetic vector calculation unit 620 calculates the direction of the geomagnetism $B_g$ from the second magnetic vectors $(s_i - c_{EOP})$ in consideration of the misalignment angle $\phi$ (see FIG. 7 and paragraph 0046).

Meanwhile, although, in this embodiment, the second magnetic vectors $(s_i - c_{EOP})$ are disposed with the coordinates indicated by the optimal central point $c_{EOP}$ as the start point for the convenience of description (see FIG. 7), the second magnetic vectors $(s_i - c_{EOP})$ may be disposed so that the origin of the sensor coordinate system $\Sigma_s$ becomes the start point. In this case, the spherical surface $S_{EOP}$ represents a spherical surface having a radius 1 with the origin of the sensor coordinate system $\Sigma_S$ as the center, and the magnetic data $s_i$ after conversion are distributed in the vicinity of the spherical surface having the radius 1 with the origin as the center.

6. CONCLUSION OF FIRST EMBODIMENT

In the first embodiment as described above, an ellipsoid having the coordinates indicated by the magnetic data $q_1$ to $q_N$ in the vicinity thereof is specified on the assumption that the coordinates indicated by the magnetic data $q_1$ to $q_N$ are distributed in the vicinity of the ellipsoid, and ellipsoidal correction is carried out for coordinate conversion of the coordinates indicated by the magnetic data $q_1$ to $q_N$ to the vicinity of a spherical surface having the same central point as the ellipsoid.

As a result, in a case where the instrument having the three-dimensional magnetic sensor 60 mounted therein includes a soft magnetic material, and a soft iron effect is generated, it is possible to calculate the correct direction of the geomagnetism $B_g$ based on the magnetic data $q_1$ to $q_N$.

Meanwhile, even in a case where the instrument having the three-dimensional magnetic sensor 60 mounted therein does not include a soft magnetic material, and a soft iron effect is not generated, the coordinates indicated by the magnetic data $q_1$ to $q_N$ may be distributed in the vicinity of the ellipsoid. For example, in a case where the three-dimensional magnetic sensor 60 is included, and three sensors, such as an X axis geomagnetic sensor 61, a Y axis geomagnetic sensor 62, and a Z axis geomagnetic sensor 63, have different sensitivities, the coordinates indicated by the magnetic data $q_1$ to $q_N$ to be distributed in the vicinity of the original spherical surface in the sensor coordinate system $\Sigma_S$ are distributed in an ellipsoid obtained by expanding and contracting the spherical surface in the respective axis directions of the sensor coordinate system $\Sigma_S$ according to the sensitivities of the three sensors. That is, in a case where the sensitivities of the sensors are different from each other, the coordinates indicated by the magnetic data $q_1$ to $q_N$ are distributed in the vicinity of an ellipsoid having three main axes directed in the same directions as the three axis directions of the sensor coordinate system $\Sigma_S$.

In the first embodiment, ellipsoidal correction is carried out on the assumption that the coordinates indicated by the magnetic data $q_1$ to $q_N$ are distributed in the vicinity of the ellipsoid. Since the three main axes of the ellipsoid used in this ellipsoidal correction can be directed in arbitrary directions while being perpendicular to each other, it is possible to apply the ellipsoidal correction according to the first embodiment even in a case where the main axes of the ellipsoid coincide with the three axis directions of the sensor coordinate system $\Sigma_S$.

In the ellipsoidal correction according to the first embodiment, therefore, it is possible to calculate the correct direction of the geomagnetism $B_g$ in a case where the coordinates indicated by the magnetic data $q_1$ to $q_N$ are distributed in the vicinity of the ellipsoid due to different sensitivities of the sensors, i.e. even in a case where the main axes of the ellipsoid coincide with the three axis directions of the sensor coordinate system $\Sigma_S$.

Also, in the first embodiment, three different ellipsoids are generated using the three different evaluation axes, such as the first evaluation axis $\xi_1$, the first evaluation axis $\xi_2$, and the first evaluation axis $\xi_3$, in the space $\Omega$ when calculating the initial ellipsoid $V_{EO}$, and it is decided whether or not all of the distances between the respective central points of the three different ellipsoids are equal to or less than the first threshold value $\Delta c$ in the sensor coordinate system $\Sigma_S$. In a case where the decision result is affirmative, the initial ellipsoidal correction matrix $T_O$ and the coordinates of the initial central point $c_{EO}$ are calculated.

In case in which it is difficult to specify the shape of the ellipsoid from the distribution pattern of the coordinates indicated by the magnetic data $q_1$ to $q_N$, therefore, it is possible to prevent the generation of an improper initial ellipsoidal correction matrix $T_O$ and the coordinates of the initial central point $c_{EO}$ based on an incorrect initial ellipsoid $V_{EO}$ different from the distribution pattern of the coordinates indicated by the magnetic data $q_1$ to $q_N$. Consequently, it is possible to prevent adoption of an incorrect value as the offset.

Also, in the first embodiment, the optimal ellipsoidal correction matrix $T_{OP}$ and the coordinates of the optimal central point $c_{EOP}$, are calculated through the nonlinear optimization operation having the respective components of the initial ellipsoidal correction matrix $T_O$ and the coordinates of the initial central point $c_{EO}$, which are set based on the initial ellipsoid $V_{EO}$ having a shape approximate to that of the ellipsoid $V_E$, as an initial value.

Since the nonlinear optimization operation adopts a value approximate to the global optimal solution as the initial value, a possibility of the local optimal solution being calculated as the optimal solution is lowered, and a possibility of the global optimal solution being calculated as the optimal solution is raised. Consequently, the nonlinear optimization operation according to this embodiment reduces a possibility of the local optimal solution being calculated as the optimal solution and a possibility of an incorrect direction of the geomagnetism $B_g$ being calculated through ellipsoidal correction using an improper optimal ellipsoidal correction matrix $T_{OP}$.

Also, in the first embodiment, the ellipsoidal optimization function $f_{EL}(T, c)$ having the variable matrix T, which is a real symmetric matrix, as the variable is minimized to calculate the optimal ellipsoidal correction matrix $T_{OP}$ and the optimal central point $c_{EOP}$. As a result, the optimal ellipsoidal correction matrix $T_{OP}$ is calculated as a matrix performing coordinate conversion to expand and contract an arbitrary vector in directions of three eigenvectors of the optimal ellipsoidal correction matrix $T_{O2}$, and therefore, coordinate conversion with rotation is not performed.

That is, the coordinates indicated by the magnetic data $s_i$ after conversion, which are calculated by ellipsoidal-correcting the coordinates indicated by the magnetic data $q_i$ located in the vicinity of the optimal ellipsoid $V_{EOP}$, are found as coordinates directed in the same direction as the geomagnetism $B_g$ when viewed from the optimal central point $c_{EOP}$, and therefore, it is possible to calculate the correct direction of the geomagnetism $B_g$ based on the magnetic data $s_i$ after conversion.

B. Second Embodiment

Hereinafter, a second embodiment of the present invention will be described.

7. OUTLINE OF GEOMAGNETISM MEASUREMENT APPARATUS ACCORDING TO SECOND EMBODIMENT

In the first embodiment, the magnetic field to be detected by the three-dimensional magnetic sensor 60 is limited to the geomagnetism $B_g$, the internal magnetic field $B_i$, and the magnetized magnetic field $B_m$, and it is assumed that the coordinates indicated by the magnetic data $q_1$ to $q_N$ are distributed in the vicinity of the ellipsoid.

In a case where an object generating a magnetic field is present outside the instrument 1, however, a possibility of the coordinates indicated by the central point of the ellipsoid calculated on the assumption that the coordinates indicated by the magnetic data $q_1$ to $q_N$ are distributed in the vicinity of the ellipsoid not coinciding with the coordinates indicating the offset of the three-dimensional magnetic sensor 60 due to an external magnetic field $B_X$ generated by the object is great, and, although correction is carried out with the coordinates indicated by the central point of the ellipsoid as the offset, it is not possible to find the correct direction of the geomagnetism $B_g$.

Also, since a soft iron effect is not generated in a case where the instrument 1 does not include a soft magnetic material 21, the coordinates indicated by the magnetic data $q_1$ to $q_N$ are distributed in the vicinity of the spherical surface as shown in FIG. 3, but not in the vicinity of the ellipsoid. In this case, it is possible to find the correct direction of the geomagnetism $B_g$ although ellipsoidal correction is carried out.

It is an object of the second embodiment of the present invention to realize a geomagnetism measurement apparatus corresponding to a case in which an external magnetic field $B_X$ generated by an object outside the instrument 1 is present and a case in which the instrument 1 does not include a soft magnetic material 21 with the result that the external magnetic field $B_x$ is not present.

Figure 15:
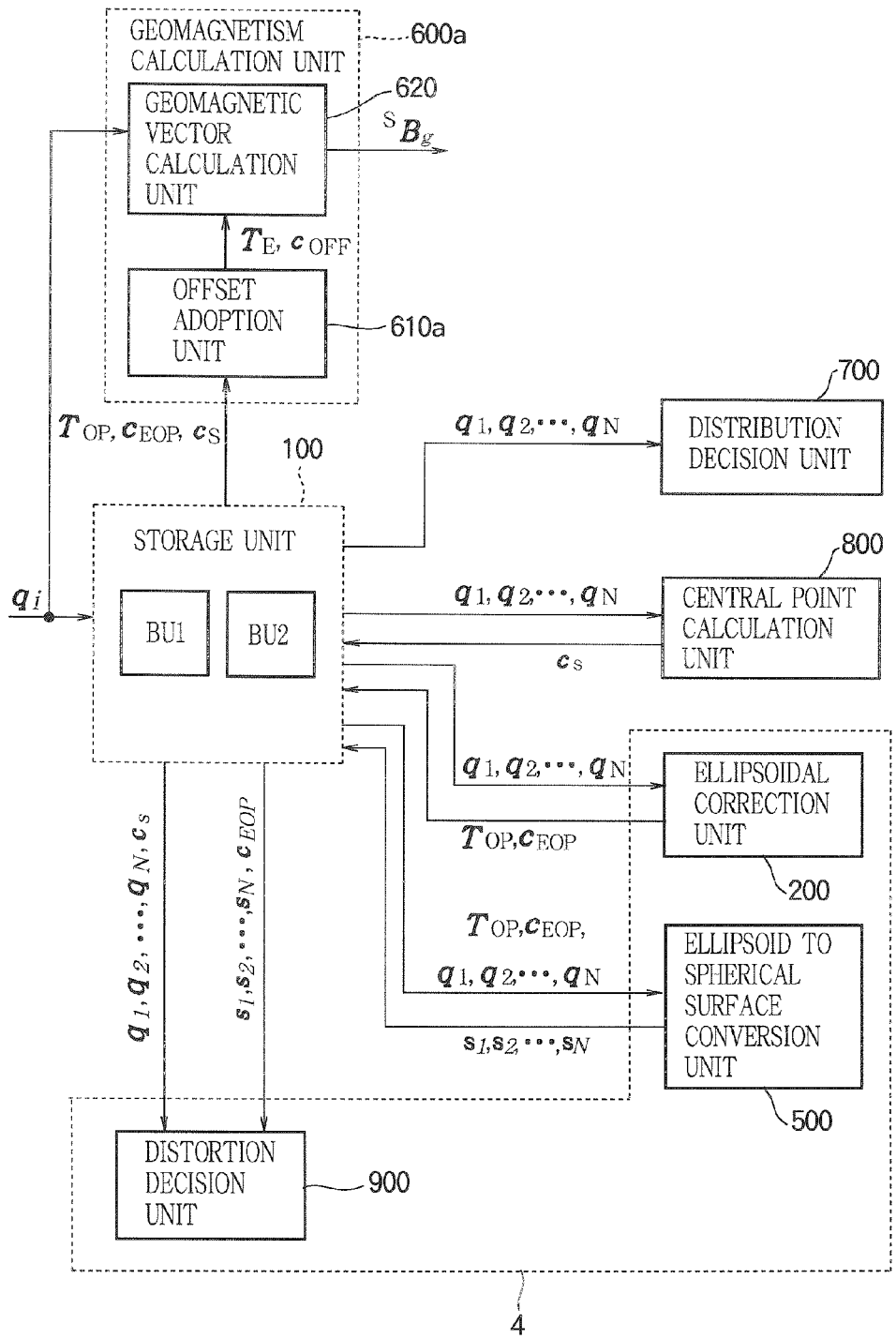
FIG. 15 is a functional block diagram showing the construction of a geomagnetism measurement apparatus according to a second embodiment of the present invention.

FIG. 15 is a functional block diagram showing functions realized by a CPU 10 of a geomagnetism measurement apparatus according to a second embodiment of the present invention executing a magnetic data processing program. The geomagnetism measurement apparatus according to the second embodiment of the present invention is identical in construction to the geomagnetism measurement apparatus according to the first embodiment of the present invention (see FIG. 9) except that the geomagnetism measurement apparatus according to the second embodiment of the present invention includes an ellipsoid to spherical surface conversion unit 500, a distribution decision unit 700, a central point calculation unit 800, and a distortion decision unit 900, and, in addition, the geomagnetism measurement apparatus according to the second embodiment of the present invention includes a geomagnetism calculation unit 600a instead of the geomagnetism calculation unit 600.

The ellipsoid to spherical surface conversion unit 500 calculates a plurality of magnetic data $s_1$ to $s_N$ after conversion from an optimal ellipsoidal correction matrix $T_{OP}$, an optimal central point $c_{EOP}$, and a plurality of magnetic data $q_1$ to $q_N$ based on equation (67). Specifically, first, the ellipsoid to spherical surface conversion unit 500 converts first magnetic vectors ($q_i - c_{EOP}$) having the coordinates of the optimal central point $c_{EOP}$ as the start point and the coordinates indicated by the magnetic data $q_i$ as the end point using the optimal ellipsoidal correction matrix $T_{OP}$ and calculates second magnetic vectors ($s_i - c_{EOP}$) having the coordinates of the optimal central point $c_{EOP}$ as the start point and coordinates indicated by the magnetic data $s_i$ after conversion as the end point to calculate coordinates indicated by the magnetic data $s_i$ after conversion, as represented by equation (67). After that, the ellipsoid to spherical surface conversion unit 500 stores the calculated magnetic data $s_1$ to $s_N$ after conversion in a buffer BU2 of a storage unit 100.

The distribution decision unit 700 decides whether or not distribution of the coordinates indicated by the magnetic data $q_1$ to $q_N$ has three-dimensional extension in a sensor coordinate system $\Sigma_S$, and outputs the decision result.

The central point calculation unit 800 calculates coordinates indicated by a central point $c_S$ of a spherical surface S having the coordinates indicated by the magnetic data $q_1$ to $q_N$ in the vicinity thereof in the sensor coordinate system $\Sigma_S$. In a case where the magnetic field measured by the three-dimensional magnetic sensor 60 includes a geomagnetism $B_g$ and an internal magnetic field $B_i$ as described with reference to FIG. 3, the coordinates indicated by the magnetic data $q_1$ to $q_N$ are distributed in the vicinity of a spherical surface $S_G$. Consequently, it is possible to regard the spherical surface S and the spherical surface $S_G$ as coinciding with each other, and the coordinates indicated by the central point $c_S$ of the spherical surface S represents an offset $c_{OFF}$.

The geomagnetism measurement apparatus according to the second embodiment includes the central point calculation unit 800. In a case where a magnetized magnetic field $B_m$ is not present, and the coordinates indicated by the magnetic data $q_1$ to $q_N$ are distributed in the vicinity of the spherical surface, therefore, it is possible to calculate the offset $C_{OFF}$ of the three-dimensional magnetic sensor 60.

On the assumption that a plurality of input coordinates (coordinates indicated by a plurality of magnetic data $q_1$ to $q_N$ or coordinates indicated by a plurality of magnetic data $s_1$ to $s_N$ after conversion) is distributed in the vicinity of a certain three-dimensional figure in the sensor coordinate system $\Sigma_S$, the distortion decision unit 900 evaluates to what extent the shape of the three-dimensional figure is different from that of the spherical surface to decide whether or not the shape of the three-dimensional figure can be regarded as the spherical surface, and outputs the decision result.

In a case where the external magnetic field $B_x$ is present, the coordinates indicated by the magnetic data $q_1$ to $q_N$ are distributed in the vicinity of a three-dimensional figure having a distorted shape which is different from the spherical surface or the ellipsoid, it is difficult to calculate a correct value of the offset $c_{OFF}$ of the three-dimensional magnetic sensor 60.

The geomagnetism measurement apparatus according to the second embodiment includes the distortion decision unit 900. In a case where the influence of the external magnetic field $B_x$ is great, and it is difficult to calculate the offset $c_{OFF}$, therefore, it is possible to prevent calculation of an incorrect offset $c_{OFF}$ and to prevent calculation of an incorrect geomagnetism $B_g$ through the correction process using the incorrect offset.

The geomagnetism calculation unit 600a is identical in construction to the geomagnetism calculation unit 600 except that the geomagnetism calculation unit 600a includes an offset adoption unit 610a instead of the offset adoption unit 610. The offset adoption unit 610a adopts a vector indicating the coordinates of the optimal central point $c_{EOP}$ or a vector indicating the coordinates of the central point $c_S$ of the spherical surface S as the offset $c_{OFF}$.

Also, in a case where a vector indicating the coordinates of the central point $c_S$ as the offset $c_{OFF}$ is adopted, the offset adoption unit 610a adopts a unit matrix I of 3×3 as the ellipsoidal correction matrix $T_E$. At this time, the geomagnetic vector calculation unit 620 performs ellipsoidal correction based on equation (1) using the coordinates indicated by the central point $c_S$, which is the offset $c_{OFF}$, and the unit matrix I, which is the ellipsoidal correction matrix $T_E$, to calculate the direction of the geomagnetism $B_g$. Specifically, since the ellipsoidal correction matrix $T_E$ is the unit matrix I, the geomagnetic vector calculation unit 620 calculates a vector $(q_i - c_S)$ as a vector indicating the direction of a geomagnetism $^SB_g$. Meanwhile, as is apparent from equation (1), the ellipsoidal correction using the unit matrix I is merely an operation for subtracting the offset $c_{OFF}$ from the coordinates indicated by the magnetic data $q_i$, and ellipsoidal correction is not substantially carried out. In a case where the unit matrix I is adopted as the ellipsoidal correction matrix $T_E$, therefore, the geomagnetic vector calculation unit 620 may merely perform a process of subtracting the coordinates of the central point $c_S$ adopted as the offset $c_{OFF}$ from the coordinates indicated by the magnetic data $q_i$ without execution of an operation based on equation (1).

On the other hand, in a case where a vector indicating the coordinates of the optimal central point $c_{EOP}$ as the offset $c_{OFF}$ is adopted, the offset adoption unit 610a adopts the optimal ellipsoidal correction matrix $T_{OP}$ as the ellipsoidal correction matrix $T_E$. At this time, the geomagnetic vector calculation unit 620 performs ellipsoidal correction based on equation (1) using the coordinates indicated by the optimal central point $c_{EOP}$, which is the offset $c_{OFF}$, and the optimal ellipsoidal correction matrix $T_{OP}$, which is the ellipsoidal correction matrix $T_E$, to calculate the direction of the geomagnetism $B_g$. Specifically, the geomagnetic vector calculation unit 620 calculates the second magnetic vector $(s_i - c_{EOP})$ as a vector indicating the direction of the geomagnetism $^SB_g$ using equation (67) obtained by modifying equation (1).

Hereinafter, properties of an external magnetic field $B_x$ will be described on the premise that a geomagnetism measurement process according to the second embodiment will be described in detail.

Figure 16:
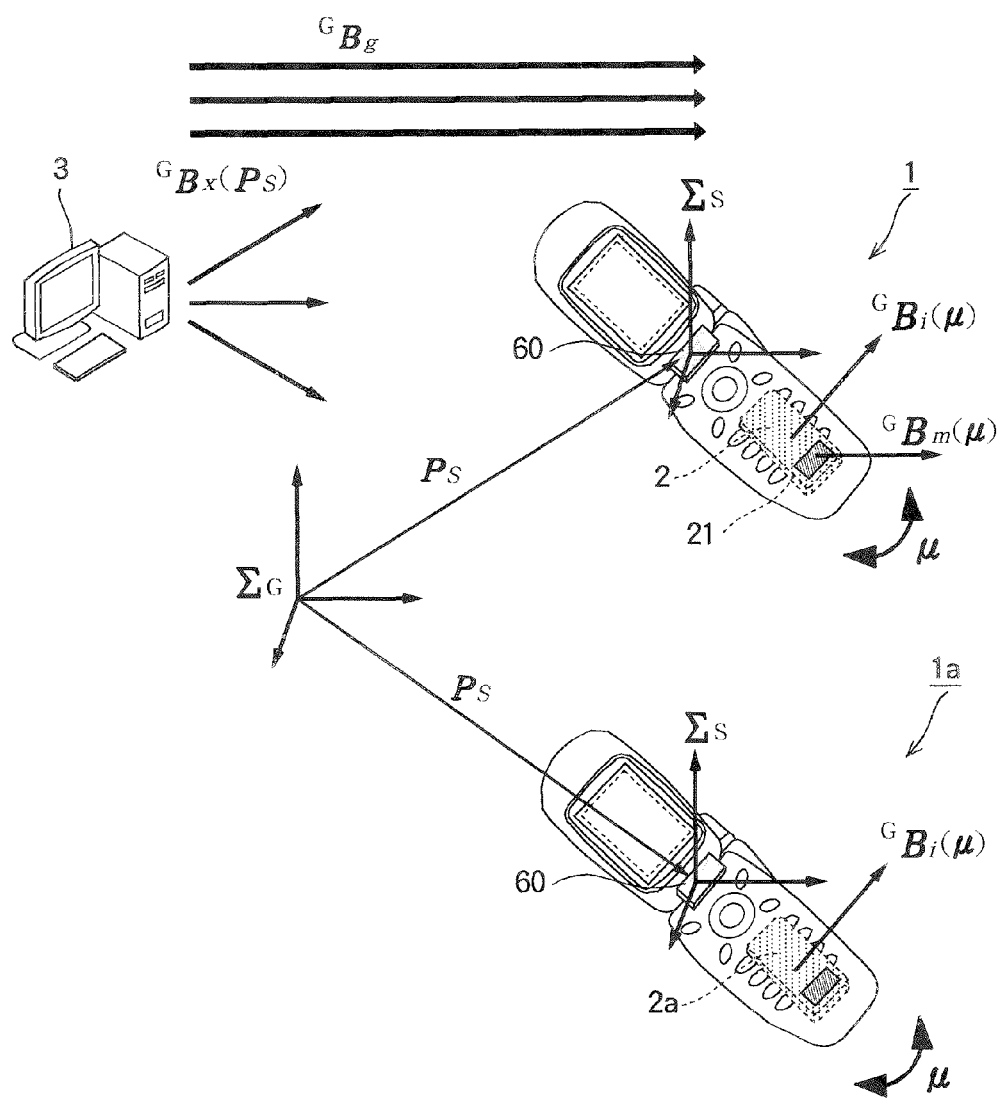
FIG. 16 is a conceptual view illustrating geomagnetism, an internal magnetic field, a magnetized magnetic field, and an external magnetic field measured by a three-dimensional magnetic sensor according to a second embodiment of the present invention.

FIG. 16 is a conceptual view showing geomagnetism $B_g$, an internal magnetic field $B_i$, a magnetized magnetic field $B_m$, and an external magnetic field $B_x$ to be measured by the three-dimensional magnetic sensor 60 in a ground coordinate system $\Sigma_G$. Here, a position $P_S$ shown in FIG. 16 indicates a position of the origin of a sensor coordinate system $\Sigma_S$ in the ground coordinate system $\Sigma_G$ (that is, the position of the three-dimensional magnetic sensor 60 in the ground coordinate system $\Sigma_G$).

The geomagnetism measurement apparatus according to the second embodiment can be applied to an instrument 1a show in FIG. 16 in addition to the instrument 1. Here, the instrument 1a is identical in construction to the instrument 1 except that the instrument 1a includes a part 2a which does not contain a soft magnetic material 21 instead of the part 2. That is, the instrument 1a does not generate a magnetized magnetic field $B_m$ unlike the instrument 1.

As shown in FIG. 16, the external magnetic field $B_x$ is a magnetic field generated by an object 3 present outside the instrument 1 or the instrument 1a. Specifically, the external magnetic field $B_x$ is a nonuniform magnetic field, the direction and magnitude of which are changed depending upon a relative positional relationship between the external magnetic field $B_x$ and the object 3. In a case where the position $P_S$ of the three-dimensional magnetic sensor 60 is changed in the ground coordinate system $\Sigma_G$, the direction and magnitude of the external magnetic field $B_x$ measured by the three-dimensional magnetic sensor 60 are changed. Consequently, the external magnetic field $B_x$ is expressed as a vector $^GB_x(P_S)$, both the direction and magnitude of which are changed depending upon the position $P_S$ in the ground coordinate system $\Sigma_G$. Also, in a case where the posture $\mu$ of the three-dimensional magnetic sensor 60 is changed in the ground coordinate system $\Sigma_G$, the direction of the external magnetic field $B_x$ measured by the three-dimensional magnetic sensor 60 is changed.

Figure 17:
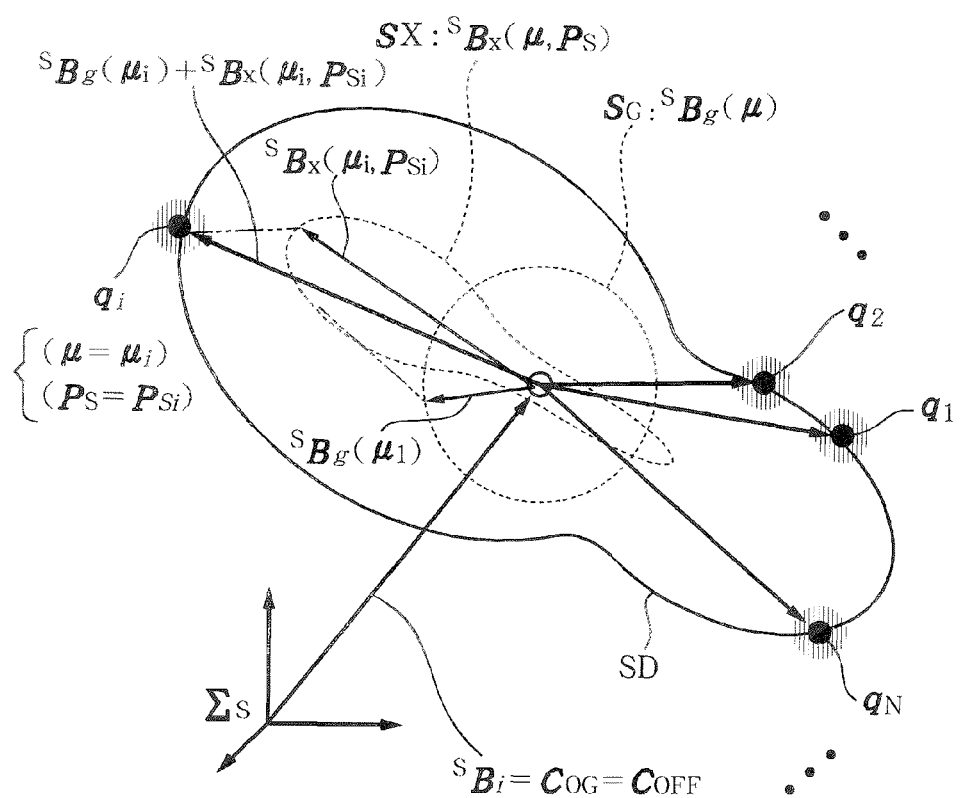
FIG. 17 is a conceptual view illustrating the external magnetic field measured by the three-dimensional magnetic sensor according to the second embodiment of the present invention.

FIG. 17 is a view showing that, when the position $P_S$ of the three-dimensional magnetic sensor 60 is changed into $P_{S1}$ to $P_{SN}$, and, in addition, the posture $\mu$ of the three-dimensional magnetic sensor 60 is changed into $\mu_1$ to $\mu_N$ to measure a magnetic field, the magnetic data $q_1$ to $q_N$ output by the three-dimensional magnetic sensor 60 are plotted in the sensor coordinate system $\Sigma_S$.

Meanwhile, in FIG. 17, it is assumed that the magnetized magnetic field $B_m$ is not present, and the internal magnetic field $B_i$, the geomagnetism $B_g$, and the external magnetic field $B_X$ are present for simplicity.

The external magnetic field $B_X$ is expressed as a vector $^SB_x(\mu, P_S)$, both the direction and magnitude of which are changed depending upon the position $P_S$ of the three-dimensional magnetic sensor 60 and the direction of which is changed depending upon the posture $\mu$ of the three-dimensional magnetic sensor 60.

In a case where the three-dimensional magnetic sensor 60 measures the internal magnetic field $B_i$, the geomagnetism $B_g$, and the external magnetic field $B_x$, the coordinates indicated by the magnetic data $q_1$ to $q_N$ are indicated by a vector representing the sum of a vector ${}^S B_i$ representing the internal magnetic field, a vector ${}^S B_g(\mu)$ representing the geomagnetism, and a vector ${}^S B_x(\mu, P_S)$ representing the external magnetic field. Consequently, the coordinates indicated by the magnetic data $q_1$ to $q_N$ are distributed in the vicinity of the surface of a three-dimensional figure SD obtained by overlapping a spherical surface $S_G$, representing the end point of the vector ${}^S B_g(\mu)$ representing the geomagnetism having the central point $c_{OG}$ as the start point, and a curved surface SX, representing the end point of the vector ${}^S B_x(\mu, P_S)$ representing the external magnetic field having the central point $c_{OG}$ as the start point, with the central point $c_{OG}$ as the start point.

In a case where the curved surface SX representing the external magnetic field $B_x$ has a distorted shape different from the spherical surface, the three-dimensional figure SD also has a distorted shape different from the spherical surface. In a case where the three-dimensional figure SD has a distorted shape different from the spherical surface, it is difficult to calculate the coordinates of the central point $c_{OG}$ of the spherical surface $S_G$ representing the geomagnetism $B_g$ based on the coordinates indicated by the magnetic data $q_i$ to $q_N$. This is because, even if a spherical surface S having the coordinates indicated by the magnetic data $q_1$ to $q_N$ in the vicinity thereof is set, and the central point $c_S$ of the spherical surface S is calculated, a possibility of the central point $c_S$ of the spherical surface S and the central point $c_{OG}$ of the spherical surface $S_G$ having different coordinates is great (see FIG. 24). In a case where the three-dimensional figure SD has a distorted shape different from the spherical surface, and it is difficult to calculate the coordinates indicated by the central point $c_{OG}$ of the spherical surface $S_G$, therefore, it is necessary to prevent calculation of the offset $c_{OFF}$ based on the magnetic data $q_1$ to $q_N$.

Figure 18A:
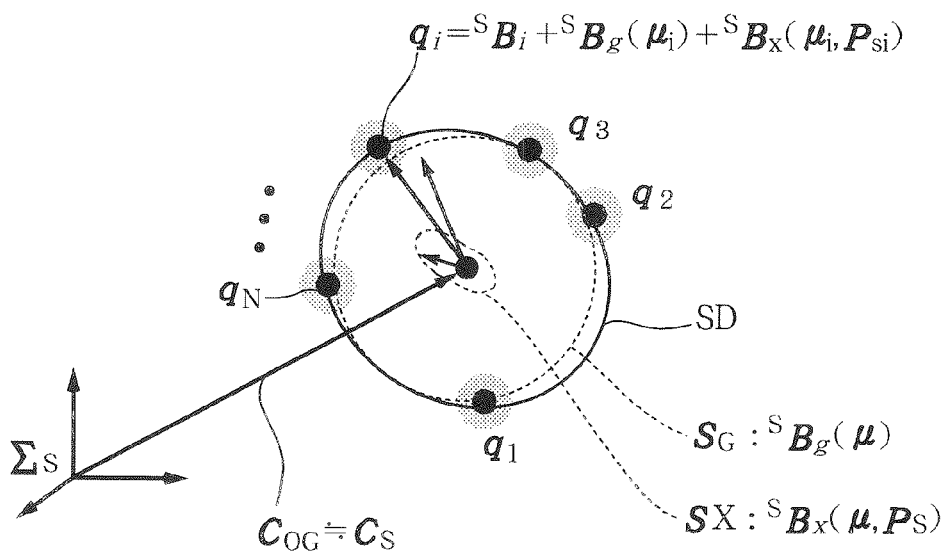

In a case where the influence of the nonuniform external magnetic field $B_X$ is little, and the shape of the three-dimensional figure SD is regarded almost as a spherical surface, however, it is possible to calculate the coordinates indicated by the central point $c_{OG}$ of the spherical surface $S_G$ based on the coordinates indicated by the magnetic data $q_i$ to $q_N$. For example, in a case where the external magnetic field $B_X$ is weak as shown in FIG. 18(A), the three-dimensional figure SD, obtained by overlapping the spherical surface $S_G$ representing the geomagnetism $B_q$ and the curved surface SX representing the external magnetic field $B_X$, has almost the same shape as the spherical surface $S_G$. Consequently, the coordinates indicated by the magnetic data $q_1$ to $q_N$ can be regarded as being distributed in the vicinity of the spherical surface $S_G$, and therefore, it is possible to calculate the central point $c_{OG}$ of the spherical surface $S_G$ from the magnetic data $q_1$ to $q_N$.

Figure 18B:
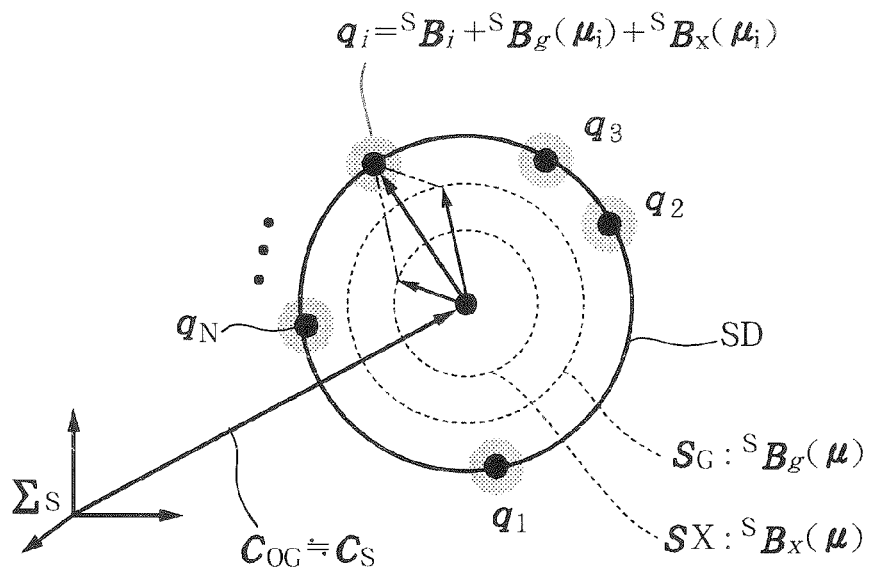

Also, even in a case where the nonuniform external magnetic field $B_X$ is great as shown in FIG. 18(B), the shape of the three-dimensional figure SD may be regarded almost as a spherical surface. For example, even in a case where the nonuniform external magnetic field $B_X$ is present, when, in acquiring N magnetic data $q_1$ to $q_N$, only the posture $\mu$ of the three-dimensional magnetic sensor 60 is changed in a state in which the position $P_S$ of the three-dimensional magnetic sensor 60 is fixed without a user of the instrument 1 or the instrument 1a swinging the instrument 1 or the instrument 1a while holding the instrument 1 or the instrument 1a so that the position $P_S$ of the three-dimensional magnetic sensor 60 is changed, the external magnetic field B, is expressed as a vector ${}^S B_x(\mu)$, only the direction of which is changed depending upon the posture $\mu$ of the three-dimensional magnetic sensor 60 and the magnitude of which is uniform in the sensor coordinate system $\Sigma_S$. In this case, the shape of the curved surface SX representing the external magnetic field $B_X$ becomes a spherical surface having the central point $c_{OG}$ as the center, and therefore, the shape of the three-dimensional figure SD, obtained by overlapping the spherical surface having the central point $c_{OG}$ as the center and the curved surface SX having the shape of the spherical surface having the central point $c_{OG}$ as the center with the central point $c_{OG}$ as the center, becomes a spherical surface having the central point $c_{OG}$ as the center. Consequently, it is possible to calculate the coordinates of the central point of the spherical surface representing the three-dimensional figure SD based on the coordinates indicated by the magnetic data $q_1$ to $q_N$, whereby it is possible to calculate the coordinates indicated by the central point $c_{OG}$ of the spherical surface $S_G$.

This embodiment evaluates the magnitude of the influence of the external magnetic field $B_X$, i.e. to what extent the shape of the three-dimensional figure SD is different from that of the spherical surface, based on the coordinates indicated by the magnetic data $q_1$ to $q_N$. Consequently, it is determined whether the offset $c_{OFF}$ can be calculated based on the coordinates indicated by the magnetic data $q_1$ to $q_N$, thereby preventing calculation of an incorrect offset $c_{OFF}$ influenced by the external magnetic field $B_x$.

Meanwhile, as will be described in detail below, it is possible for the geomagnetism measurement apparatus according to this embodiment to evaluate to what extent the distribution pattern of the coordinates indicated by the magnetic data $q_i$ to $q_N$ is different from the shape of the ellipsoid through the ellipsoidal correction unit 200, the ellipsoid to spherical surface conversion unit 500, and the distortion decision unit 900. This is because, in a case where the coordinates indicated by the magnetic data $q_1$ to $q_N$ are converted into coordinates indicated by magnetic data $S_i$ to $s_N$ after conversion through ellipsoidal correction, the shape of the three-dimensional figure SD having the coordinates indicated by the magnetic data $q_1$ to $q_N$ in the vicinity thereof can be regarded as an ellipsoid if the shape of a three-dimensional figure $SD_E$ having the coordinates indicated by the magnetic data $s_1$ to $s_N$ after conversion in the vicinity thereof can be regarded as a spherical surface.

That is, as shown in FIG. 15, the ellipsoidal correction unit 200, the ellipsoid to spherical surface conversion unit 500, and the distortion decision unit 900 function as a distorted shape determination unit 4 for determining whether the distribution pattern of the coordinates indicated by the magnetic data $q_1$ to $q_N$ corresponds to a shape that can be regarded as a spherical surface, a shape that can be regarded as an ellipsoid, or a distorted shape that can be regarded as neither a spherical surface nor an ellipsoid.

Also, in a case where the distorted shape determination unit 4 determines that the distribution pattern of the coordinates indicated by the magnetic data $q_1$ to $q_N$ corresponds to a shape that can be regarded as a spherical surface or a shape that can be regarded as an ellipsoid, the geomagnetism measurement apparatus calculates the offset $c_{OFF}$. In a case where the distorted shape determination unit 4 determines that the distribution pattern of the coordinates indicated by the magnetic data $q_1$ to $q_N$ corresponds to a distorted shape that is different from both the spherical surface and ellipsoid, however, the geomagnetism measurement apparatus does not calculate the offset $c_{OFF}$.

Therefore, it is possible for the geomagnetism measurement apparatus according to this embodiment, including the distorted shape determination unit 4, to prevent calculation of an incorrect offset due to the influence of the external magnetic field $B_x$, and, in addition, in a case where the influence of the nonuniform external magnetic field $B_x$ is negligible, a correct offset $c_{OFF}$ can be calculated both in a case where a soft iron effect is generated and in a case where the soft iron effect is not generated.

Hereinafter, a method of calculating coordinates as candidates of the offset $c_{OFF}$ and a method of determining whether or not the coordinates are adopted as the offset $c_{OFF}$ in this embodiment will be described in detail.

8. OFFSET DERIVING PROCESS FLOW OF GEOMAGNETISM MEASUREMENT APPARATUS ACCORDING TO SECOND EMBODIMENT

Figure 19:
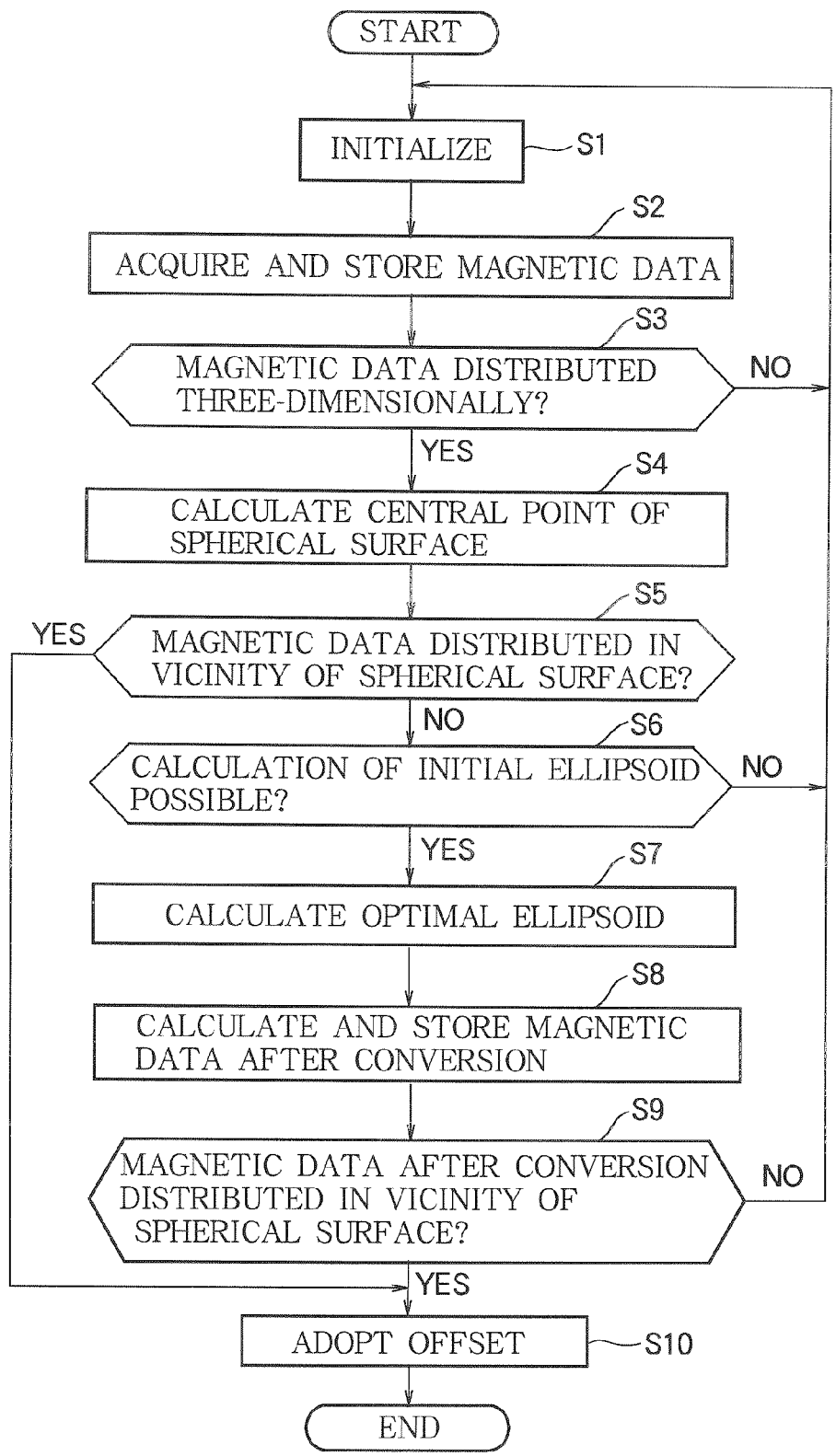
FIG. 19 is a flow chart showing the operation of the geomagnetism measurement apparatus according to the second embodiment of the present invention.

FIG. 19 is a flow chart illustrating an offset deriving operation of the geomagnetism measurement apparatus according to the second embodiment of the present invention. This flow chart is implemented by the CPU 10 executing a magnetic data processing program according to this embodiment.

At step S1, the geomagnetism measurement apparatus performs an initialization process. The initialization process is a process of destroying a plurality of magnetic data $q_1$ to $q_N$ stored in the buffer B111 of the storage unit 100 and various kinds of data (a plurality of magnetic data $s_1$ to $s_N$ after conversion) stored in the buffer BU2 of the storage unit 100. Meanwhile, although the geomagnetism measurement apparatus according to this embodiment destroys all of the magnetic data $q_1$ to $q_N$ stored in the buffer BU1 in the initialization process, only a predetermined old proportion of the magnetic data may be destroyed.

At step S2, the geomagnetism measurement apparatus performs a magnetic data acquisition process. The magnetic data acquisition process is a process of storing a plurality of magnetic data $q_1$ to $q_N$ sequentially output from the three-dimensional magnetic sensor 60 in the buffer BU1 of the storage unit 100 (N being a natural number, equal to or greater than 9, indicating a prescribed number of times for measuring magnetic data necessary to derive a high-precision offset).

At step S3, the geomagnetism measurement apparatus performs a magnetic data distribution decision process. The magnetic data distribution decision process is carried out by the distribution decision unit 700. In the magnetic data distribution decision process, the distribution decision unit 700 decides whether or not distribution of the coordinates indicated by the magnetic data $q_1$ to $q_N$ has three-dimensional extension in the sensor coordinate system $\Sigma_S$, and outputs the decision result.

In a case where the decision result is affirmative, the geomagnetism measurement apparatus advances the process to step S4. On the other hand, In a case where the decision result is negative, i.e. in a case where the distribution of the coordinates indicated by the magnetic data $q_1$ to $q_N$ is two-dimensional or one-dimensional, the geomagnetism measurement apparatus returns the process to step S1.

At step S4, the geomagnetism measurement apparatus performs a central point calculation process. The central point calculation process is carried out by the central point calculation unit 800. In the central point calculation process, the central point calculation unit 800 calculates and outputs coordinates indicated by a central point $c_S$ of a spherical surface S having the coordinates indicated by the magnetic data $q_1$ to $q_N$ in the vicinity thereof in the sensor coordinate system $\Sigma_S$.

At step S5, the geomagnetism measurement apparatus performs a distortion decision process. The distortion decision process at step S5 is carried out by the distortion decision unit 900. On the assumption that the coordinates indicated by the magnetic data $q_1$ to $q_N$ are applied as a plurality of input coordinates, and the input coordinates are distributed or contained in the vicinity of a certain three-dimensional figure SD, the distortion decision unit 900 evaluates to what extent the shape of the three-dimensional figure SD is different from that of a spherical surface to decide whether or not the shape of the three-dimensional figure SD can be regarded as the spherical surface, or to decide whether or not the shape of the three-dimensional figure SD approximates the spherical surface, and outputs the decision result.

In a case where the decision result is affirmative, the geomagnetism measurement apparatus advances the process to step S10. On the other hand, in a case where the decision result is negative, the geomagnetism measurement apparatus advances the process to step S6.

At step S6, the geomagnetism measurement apparatus performs an initial ellipsoid generation process. The initial ellipsoid generation process is carried out by the initial ellipsoidal correction value generation unit 300 described in section 3. As previously described, in the initial ellipsoid generation process, the initial ellipsoidal correction value generation unit 300 calculates the coordinates of an initial central point $c_{EO}$, which is a central point of an initial ellipsoid $V_{EO}$ having the coordinates indicated by the magnetic data $q_1$ to $q_N$ in the vicinity thereof and an initial ellipsoidal correction matrix $T_O$ for converting coordinates on the initial ellipsoid $V_{EO}$ into coordinates on a spherical surface $S_{EO}$. Also, the initial ellipsoidal correction value generation unit 300 decides whether or not the first ellipsoidal coefficient matrix $D_{xx}$, the second ellipsoidal coefficient matrix $D_{yy}$, the third ellipsoidal coefficient matrix $D_{zz}$, the coordinates of the central point $c_{xx}$, the coordinates of the central point $c_{yy}$, and the coordinates of the central point $c_{zz}$, calculated based on the magnetic data $q_1$ to $q_N$ satisfy the first condition and the second condition. In a case where the decision result is affirmative, the geomagnetism measurement apparatus advances the process to step S7. On the other hand, in a case where the decision result is negative, the geomagnetism measurement apparatus returns the process to step S1.

Meanwhile, as previously described, the initial ellipsoidal correction value generation unit 300 may not perform decision based on the first condition but instead may perform decision based on the second condition.

At step S7, the geomagnetism measurement apparatus performs an optimal ellipsoid generation process. The optimal ellipsoid generation process is carried out by the optimal ellipsoidal correction value generation unit 400 described in section 4. As previously described, in the optimal ellipsoid generation process, the optimal ellipsoidal correction value generation unit 400 calculates the optimal ellipsoidal correction matrix $T_{OP}$ and the coordinates of the optimal central point $c_{EOP}$ based on the initial ellipsoidal correction matrix $T_O$ and the initial central point $c_{EO}$.

At step S8, the geomagnetism measurement apparatus performs an ellipsoid to spherical surface conversion process. The ellipsoid to spherical surface conversion process is carried out by the ellipsoid to spherical surface conversion unit 500. In the ellipsoid to spherical surface conversion process, the ellipsoid to spherical surface conversion unit 500 converts the coordinates indicated by the magnetic data $q_1$ to $q_N$ based present in the vicinity of the optimal ellipsoid $V_{EOP}$ into coordinates in the vicinity of a spherical surface $S_{EOP}$ represented by a plurality of magnetic data $s_1$ to $s_N$ after conversion based on the optimal ellipsoidal correction matrix $T_{OP}$ and the coordinates of the optimal central point $c_{EOP}$. After that, the ellipsoid to spherical surface conversion unit 500 stores the magnetic data $s_1$ to $s_N$ after conversion in the buffer BU2 of the storage unit 100. The buffer BU2 is formed by the RAM 20.

At step S9, the geomagnetism measurement apparatus performs a distortion decision process. The distortion decision process at step S9 is carried out by the distortion decision unit 900 in the same manner as the distortion decision process at step S5. In the distortion decision process at step S9, on the assumption that the coordinates indicated by the magnetic data $s_1$ to $s_N$ after conversion are applied as a plurality of input coordinates, and the input coordinates are distributed or contained in the vicinity of a three-dimensional figure $SD_E$, the distortion decision unit 900 evaluates to what extent the shape of the three-dimensional figure $SD_E$ is different from that of a spherical surface to decide whether or not the shape of the three-dimensional figure $SD_E$ can be regarded as the spherical surface, or to decide whether or not the shape of the three-dimensional figure $SD_E$ approximates the spherical surface, and outputs the decision result.

In a case where the decision result is affirmative, the geomagnetism measurement apparatus advances the process to step S10. On the other hand, in a case where the decision result is negative, the geomagnetism measurement apparatus returns the process to step S1.

Meanwhile, In a case where the distortion decision process carried out at step S5 and the distortion decision process carried out at step S9 are distinguished from each other, the former will hereinafter be referred to as a first distortion decision process, and the latter will hereinafter be referred to as a second distortion decision process. Also, the three-dimensional figure, the shape of which is evaluated in the second distortion decision process, will hereinafter be referred to as a three-dimensional figure $SD_E$, so as to distinguish the three-dimensional figure, the shape of which is evaluated in the second distortion decision process, from the three-dimensional figure SD, the shape of which is evaluated in the first distortion decision process. The first distortion decision process and the second distortion decision process are the same process except that the input coordinates have different values.

At step S10, the geomagnetism measurement apparatus performs an offset adoption process.

The offset adoption process is carried out by the offset adoption unit 610a. In the offset adoption process, the offset adoption unit 610a adopts the coordinates indicated by the central point $c_S$ or the central point $c_{EOP}$ as the offset, and, in addition, adopts the unit matrix I or the optimal ellipsoidal correction matrix $T_{OP}$ as the ellipsoidal correction matrix $T_E$.

Specifically, in a case where the decision result at step S5 is affirmative, the offset adoption unit 610a adopts a vector representing the coordinates of the central point $c_S$ of the spherical surface S calculated by the central point calculation unit 800 at step S4 as the offset $c_{OFF}$, and, in addition, adopts the unit matrix I as the ellipsoidal correction matrix $T_E$. On the other hand, in a case where the decision result at step S5 is negative, and the decision result at step S9 is affirmative, the offset adoption unit 610a adopts a vector representing the coordinates of the optimal central point $c_{EOP}$ calculated by the optimal ellipsoidal correction value generation unit 400 at step S7 as the offset $c_{opp}$, and, in addition, adopts the optimal ellipsoidal correction matrix $T_{OP}$ calculated by the optimal ellipsoidal correction value generation unit 400 as the ellipsoidal correction matrix $T_E$. Then, the offset adoption unit 610a outputs the offset $C_{OFF}$ and the ellipsoidal correction matrix $T_E$.

Also, in a case where the decision result at step S9 is negative, the offset adoption unit 610a does not adopt the offset $c_{OFF}$ and the ellipsoidal correction matrix $T_E$.

Meanwhile, as described in section 5, the geomagnetic vector calculation unit 620 performs ellipsoidal correction using the offset $C_{OFF}$ and the ellipsoidal correction matrix $T_E$ with respect to the coordinates indicated by the magnetic data $q_i$ output from the three-dimensional magnetic sensor 60 to calculate the direction of the geomagnetism $B_g$. The offset $c_{OFF}$ and the ellipsoidal correction matrix $T_E$, which the geomagnetic vector calculation unit 620 uses for ellipsoidal correction, are renewed by an offset $c_{OFF}$ and an ellipsoidal correction matrix $T_E$ output from the offset adoption unit 610a.

In this embodiment, in a case where the decision result at step S9 is negative, the geomagnetism measurement apparatus returns the process to step S1. At this time, any message may be output from the display unit 50, and then the process may be temporarily stopped until an instruction from a user is received to resume the process of step S1.

When N magnetic data $q_1$ to $q_N$ are acquired, only the posture of the instrument 1 may be changed in a state in which the position of the instrument 1 is fixed without a user rotating the instrument 1 while holding the instrument 1 to minimize the influence of the external magnetic field $B_x$ (see FIG. 18(B)). In a case where the decision result at step S9 is negative, therefore, rotation of the instrument 1 in a state in which the position of the instrument 1 is fixed may be instructed to the user. The instruction to the user may be carried out by displaying a picture or a motion picture on the display unit 50 of the instrument 1 or outputting voice.

Also, in this embodiment, in a case where the decision result at step S6 or S9 is negative, the process indicated in the flow chart may be finished without the process returning to step S1.

In this way, at step S5, the geomagnetism measurement apparatus according to this embodiment decides whether the coordinates indicated by the magnetic data $q_1$ to $q_N$ are distributed in the vicinity of the spherical surface S or in the vicinity of a three-dimensional figure SD having a distorted shape different from the spherical surface. Also, in a case where it is decided that the coordinates indicated by the magnetic data $q_1$ to $q_N$ are distributed in the vicinity of a three-dimensional figure SD having a distorted shape different from the spherical surface, steps S6 to S9 are carried out to decide whether or not the coordinates indicated by the magnetic data $q_1$ to $q_N$ are present in the vicinity of the optimal ellipsoid $V_{EOP}$.

That is, it is possible for the geomagnetism measurement apparatus according to this embodiment to determine whether it is proper to regard the distribution pattern of the coordinates indicated by the magnetic data $q_1$ to $q_N$ as any one selected from among a spherical surface, an ellipsoid, and a three-dimensional figure having a distorted shape different from both the spherical surface and ellipsoid.

In a case where the coordinates indicated by the magnetic data $q_1$ to $q_N$ are distributed in the vicinity of the spherical surface or the ellipsoid, therefore, it is possible for the geomagnetism measurement apparatus according to this embodiment to adopt these central points as the offset, thereby calculating the correct direction of the geomagnetism. On the other hand, in a case where the coordinates indicated by the magnetic data $q_1$ to $q_N$ are distributed in the vicinity of the three-dimensional figure having the distorted shape different from both the spherical surface and ellipsoid, it is possible for the geomagnetism measurement apparatus according to this embodiment to prevent calculation of the offset, thereby preventing calculation of an incorrect direction of the geomagnetism.

Hereinafter, the magnetic data distribution decision process, the central point calculation process, and the distortion decision process will be described in detail. Meanwhile, the central point calculation process will be described first, and then the magnetic data distribution decision process will be described for ease of understanding.

9. CENTRAL POINT CALCULATION PROCESS

The central point calculation process carried out by the central point calculation unit 800 at step S4 will be described with reference to FIG. 20. On the assumption that coordinates indicated by N magnetic data $q_1$ to $q_N$ output by the three-dimensional magnetic sensor 60 are distributed in the vicinity of a spherical surface S having a radius $r_s$, the central point calculation process calculates coordinates of a central point $c_S$ of the spherical surface S. Since the spherical surface S is introduced for the convenience of calculation in order to find coordinates of a central point of a spherical surface set so as to having coordinates indicated by a plurality of magnetic data $q_1$ to $q_N$ in the vicinity thereof in the sensor coordinate system $\Sigma_S$, the spherical surface S is different from a spherical surface $S_G$ representing a geomagnetism $B_g$. Meanwhile, vectors and coordinates described below are represented in the sensor coordinate system $\Sigma_S$ if not otherwise specified.

Calculation of the coordinates of the central point $c_S$ of the spherical surface S having the coordinates indicated by the magnetic data $q_1$ to $q_N$ in the vicinity thereof may be performed using a well-known method. For example, the following method may be used to perform such calculation.

In a case where the coordinates indicated by the magnetic data $q_i$ are represented by equation (11), and the coordinates of the central point $c_S$ are represented by the following equation (72), the presence of the coordinates indicated by the magnetic data $q_1$ to $q_N$ on the spherical surface S having the radius $r_s$, are represented by the following equation (71).

$$\|q_i - c_S\|_2^2 = r_s^2 \ (i=1,\ldots,N) \tag{71}$$

$$\text{where } c_S = [c_{Sx} \ c_{Sy} \ c_{Sz}]^T \tag{72}$$

Figure 20:
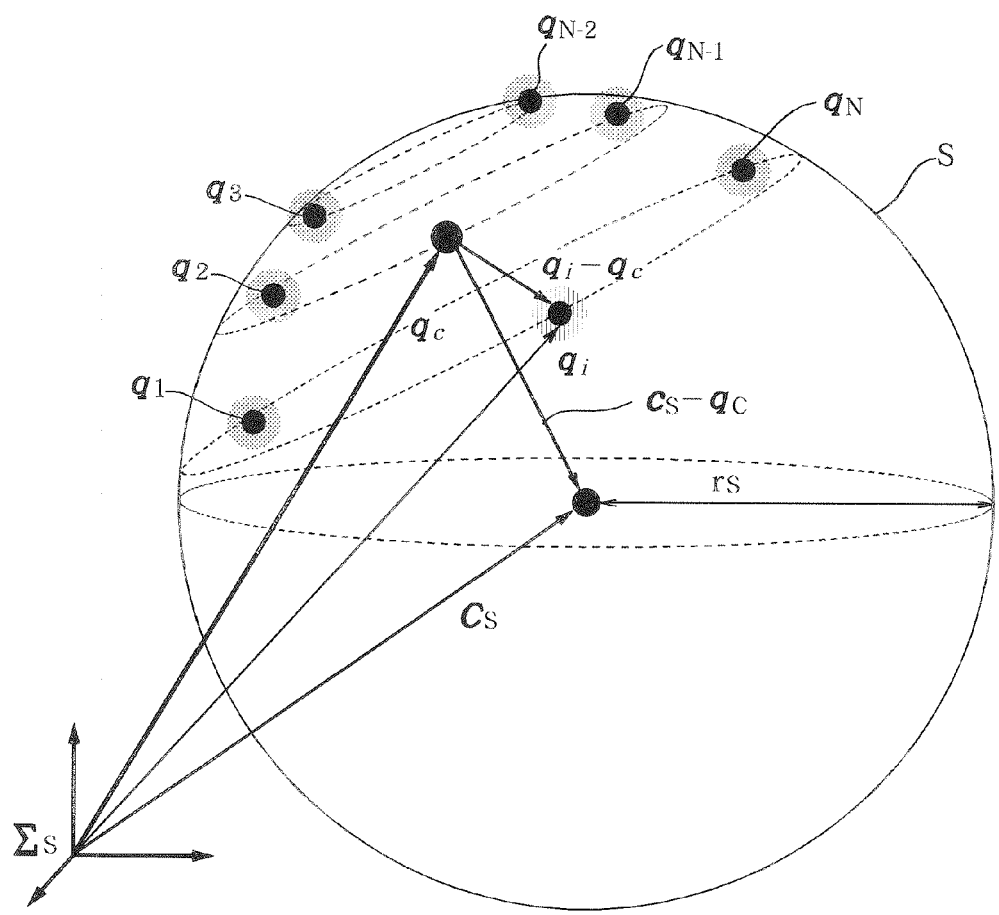
FIG. 20 is a conceptual view illustrating a central point calculation process according to a second embodiment of the present invention.

In a case where the coordinates indicated by the magnetic data $q_i$ are represented by a vector $(q_i - q_c)$ having coordinates indicated by a center of gravity $q_c$ of the magnetic data $q_1$ to $q_N$ as the start point as shown in FIG. 20, it is possible to obtain the following equation (73) based on an equation, obtained by substituting the coordinates indicated by the magnetic data $q_1$ to $q_N$ into equation (71), and equation (71). Hereinafter, equation (73) will be referred to as a spherical surface equation. Here, the center of gravity $q_c$ is a three-dimensional vector defined by the following equations (74) and (75). Also, a matrix X is a matrix of N×3 represented by equation (76), a vector j is an N-dimensional matrix represented by equation (77), and a value $R_{AVE}$ is a value represented by equation (78).

$$X(c_S - q_C) = j \tag{73}$$
where $$q_C = \frac{1}{N} \sum_{i=1}^{N} q_i \tag{74}$$

$$q_C = [q_{Cx} \ q_{Cy} \ q_{Cz}]^T \tag{75}$$

-continued $$X = \begin{bmatrix} (q_1 - q_C)^T \\ \vdots \\ (q_N - q_C)^T \end{bmatrix} \tag{76}$$

$$j = \frac{1}{2} \begin{bmatrix} (q_1 - q_C)^T(q_1 - q_C) - R_{AVE} \\ \vdots \\ (q_N - q_C)^T(q_N - q_C) - R_{AVE} \end{bmatrix} \tag{77}$$

$$R_{AVE} = \frac{1}{N} \sum_{i=1}^{N} (q_i - q_C)^T(q_i - q_C) \tag{78}$$

The spherical equation represented by equation (73) has a solution in a case where all of the coordinates indicated by the magnetic data $q_1$ to $q_N$ completely coincide with the spherical surface S having the central point $c_S$ as the center. When considering a measurement error of the three-dimensional magnetic sensor 60, however, all of the magnetic data $q_1$ to $q_N$ do not completely coincide with the spherical surface S, and therefore, the spherical equation does not have a solution. In order to obtain a presumable solution of the spherical equation using a statistical method, therefore, a first spherical error vector $\delta_S$, which is a vector absorbing an error represented by equation (79), is introduced. Here, a variable vector c present in equation (79) is a three-dimensional vector represented by equation (5). In this section, however, the variable vector c is used as a variable for representing the coordinates of the central point $c_S$.

$$\delta_S = X(c - q_C) - j \tag{79}$$

The coordinates indicated by the vector c to minimize norm of the first spherical error vector $\delta_S$, i.e. the vector c to minimize $(\delta_S)^T(\delta_S)$, may be presumed as the coordinates indicated by the central point $c_S$ of the spherical surface S. Here, when a central point calculation function $f_S(c)$ represented by the following equation (80) is defined, the coordinates indicated by the vector c to minimize the central point calculation function $f_S(c)$ have a value presumed as the coordinates of the central point $c_S$ of the spherical surface S. In a case where a variance-covariance matrix $A$ of 3×3 represented by equation (82) is regular, the coordinates of the central point $c_S$ are calculated by equation (81).

$$f_S(c) = \|\delta_S\|_2 = \|X(c - q_c) - j\|_2 \tag{80}$$

$$c_S = A^{-1} X^T j + q_c \tag{81}$$

$$\text{where } A = X^T X \tag{82}$$

As previously described, in a case where the three-dimensional magnetic sensor 60 detects only the internal magnetic field $B_i$ and the geomagnetism $B_g$, the spherical surface S and the spherical surface $S_G$ representing the geomagnetism $B_g$ become almost the same spherical surface, and the central point $c_S$ of the spherical surface S and the central point $c_{OG}$ of the spherical surface $S_G$ become almost the same coordinates. In a case where the three-dimensional magnetic sensor 60 detects only the internal magnetic field $B_i$ and the geomagnetism $B_g$, therefore, it is possible to adopt the vector indicating the coordinates of the central point $c_S$ represented by equation (81) as the offset $c_{OFF}$ of the magnetic sensor.

10. MAGNETIC DATA DISTRIBUTION DECISION PROCESS

Hereinafter, the magnetic data distribution decision process carried out by the distribution decision unit 700 at step S3 will be described.

In the above-described central point calculation process, it is necessary for the coordinates indicated by the magnetic data $q_1$ to $q_N$ to be distributed so that the coordinates indicated by the magnetic data $q_1$ to $q_N$ have three-dimensional extension in the sensor coordinate system $\Sigma_S$ in order to calculate the central point $c_S$ of the spherical surface S. Since the posture $\mu$ of the instrument 1 (the three-dimensional magnetic sensor 60) is changed as a user of the instrument 1 moves the instrument 1 while holding the instrument 1, however, the posture of the instrument 1 may not be three-dimensionally changed but may be two-dimensionally changed if the movement of the instrument 1 is insufficient. In this case, the coordinates indicated by the magnetic data $q_1$ to $q_N$ in the sensor coordinate system $\Sigma_S$ are two-dimensionally distributed without three-dimensional extension.

Figure 21:
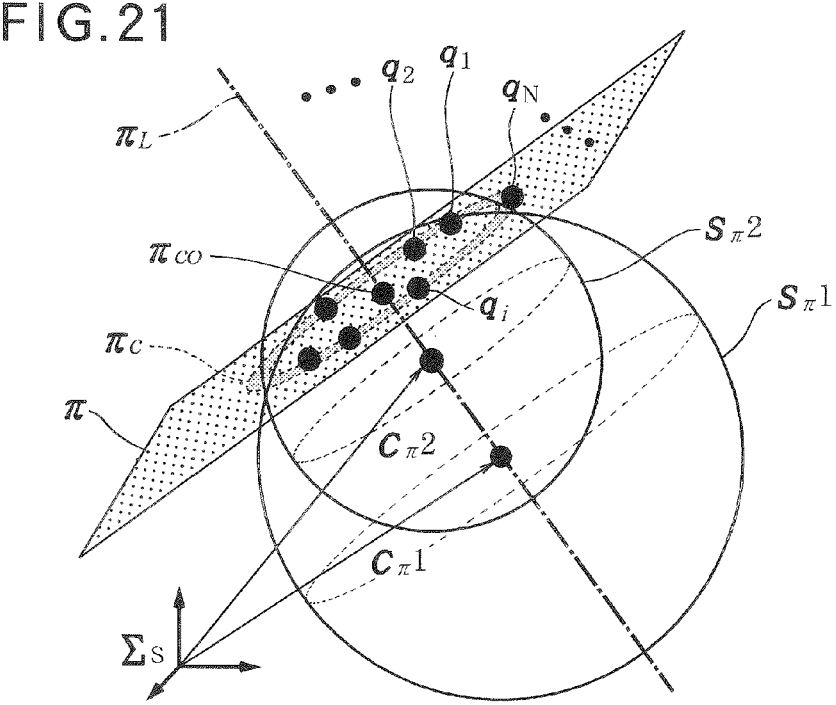
FIG. 21 is a conceptual view illustrating a magnetic data distribution decision process according to a second embodiment of the present invention.

For example, in a case where the coordinates indicated by the magnetic data $q_1$ to $q_N$ are two-dimensionally distributed in the vicinity of a circle $\pi_c$ on a plane n of the sensor coordinate system $\Sigma_S$ as shown in FIG. 21, the spherical surface S is specified only as a spherical surface having the circle $\pi_c$ as the cross section. The spherical surface having the circle $\pi_c$ as the cross section may be a spherical surface $S_{\pi 1}$ having a central point $c_{\pi 1}$ on a straight line $\pi_L$ perpendicular to the plane $\pi$ passing through a central point $\pi_{CO}$ of the circle $\pi_C$ as the center or a spherical surface $S_{\pi 2}$ having a central point $c_{\pi 2}$ on the straight line $\pi_L$ as the center. That is, it is possible to specify that the central point $c_S$ of the spherical surface S is positioned on the straight line $\pi_L$; however, it is not possible to concretely specify at which position on the straight line $\pi_L$ the central point $c_S$ of the spherical surface S is located. In a case where the coordinates indicated by the magnetic data $q_1$ to $q_N$ are two-dimensionally distributed, therefore, it is not possible to calculate the correct central point $c_S$ based on the magnetic data $q_1$ to $q_N$.

Figure 22:
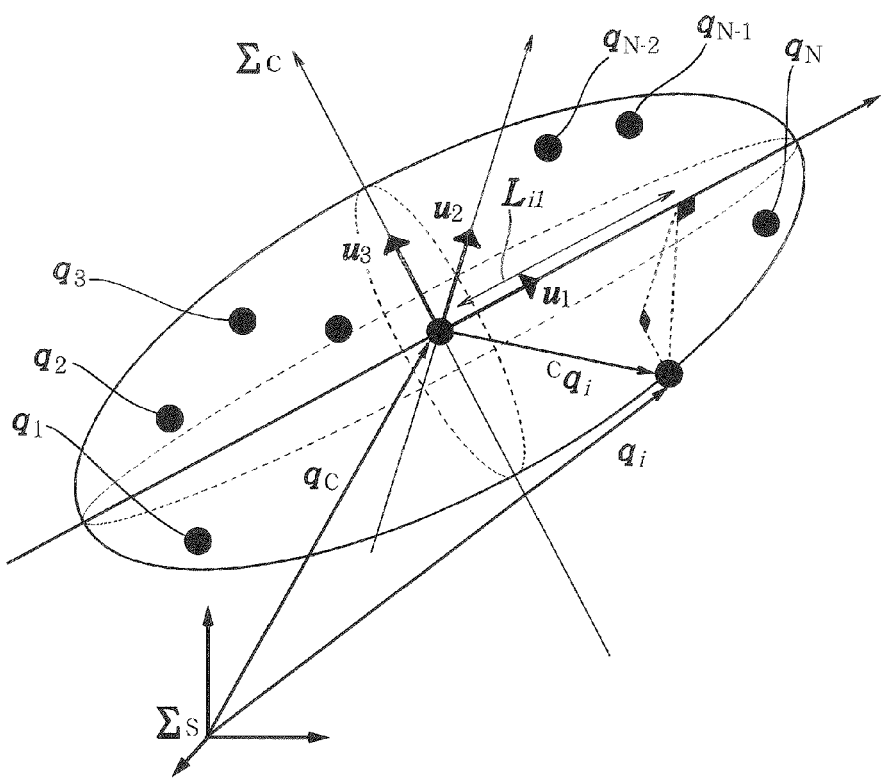
FIG. 22 is a conceptual view illustrating the magnetic data distribution decision process according to the second embodiment of the present invention.

In order to calculate the central point $c_S$ of the spherical surface S based on the magnetic data $q_1$ to $q_N$, it is necessary for the coordinates indicated by the magnetic data $q_1$ to $q_N$ to be distributed with three-dimensional extension in the sensor coordinate system $\Sigma_S$ as shown in FIG. 22. In the magnetic data distribution decision process, the distribution decision unit 700 decides whether or not the coordinates indicated by the magnetic data $q_1$ to $q_N$ are three-dimensionally distributed. Although the decision as to whether or not coordinates indicated by the magnetic data $q_1$ to $q_N$ are three-dimensionally distributed may be performed using a well-known method, such decision may be performed using, for example, the variance-covariance matrix $\Lambda$ represented by equation (82). Hereinafter, properties of the variance-covariance matrix $\Lambda$ will be described.

Eigenvalues of the variance-covariance matrix $\Lambda$ are set to a maximum eigenvalue $\lambda_1$, an intermediate eigenvalue $\lambda_2$, and a minimum eigenvalue $\lambda_3$ in order of size, and eigenvectors normalized to sizes 1 corresponding to the respective eigenvalues are set to $u_1$, $u_2$, and $u_3$. Also, a vector representing the magnetic data $q_i$ in a center of gravity coordinate system $\Sigma_C$ having the above-mentioned center of gravity $q_c$ as the origin is indicated by ${}^c q_i$. At this time, the eigenvalue $\lambda_j$ (j=1, 2, and 3) is equal to a variance $\rho^2_j$ in a direction of the eigenvector $u_j$.

As shown in FIG. 22, the respective eigenvectors $u_1$, $u_2$, and $u_3$ are disposed so that respective eigenvectors $u_1$, $u_2$, and $u_3$ have the origin $q_c$ of the center of gravity coordinate system $\Sigma_C$ as the start point. At this time, for example, a case in which j=1 is examined. The eigenvalue $\lambda_j$ is equal to a value obtained by averaging a square $(L_{j1})^2$ of a length $L_{j1}$ obtained by projecting the vector ${}^c q_i$ on the eigenvector $u_1$ with respect to N magnetic data ${}^c q_i$ (i=1, 2 . . . , and N). That is, the eigenvalue $\lambda_j$ represents to what extent the N magnetic data ${}^c q_i$ are spaced apart from the center of gravity $q_c$ in a direction of the eigenvector $u_j$, i.e. how much extension the distribution of the coordinates indicated by the magnetic data $q_1$ to $q_N$ has in the direction of the eigenvector $u_j$.

The direction of the eigenvector $u_3$ corresponding to the minimum eigenvalue $\lambda_3$ is a direction in which the distribution of the coordinates indicated by the magnetic data $q_1$ to $q_N$ has the least extension, and the minimum eigenvalue $\lambda_3$ is an index for indicating a degree of extension in the direction in which the distribution of the coordinates indicated by the magnetic data $q_1$ to $q_N$ has the least extension. In order for the coordinates indicated by the magnetic data $q_1$ to $q_N$ to be three-dimensionally distributed, therefore, the minimum eigenvalue $\lambda_3$ may have a value equal to or greater than a predetermined threshold value (an allowable variance value) $\lambda_O$.

In the magnetic data distribution decision process, if the minimum eigenvalue $\lambda_3$ of the variance-covariance matrix $\Lambda$ is equal to or greater than the threshold value $\lambda_O$, the distribution decision unit 700 determines that the coordinates indicated by the magnetic data $q_1$ to $q_N$ are sufficiently three-dimensionally distributed, and advances the process to the above-mentioned central point calculation process of step S4. On the other hand, in a case where the minimum eigenvalue $\lambda_3$ is less than the threshold value $\lambda_O$, the distribution decision unit 700 determines that the coordinates indicated by the magnetic data $q_1$ to $q_N$ do not have three-dimensional extension, and returns the process to the initialization process of step S1.

11. DISTORTION DECISION PROCESS

The distortion decision unit 900 performs the first distortion decision process at step S5 and, in addition, performs the second distortion decision process at step S9. The second distortion decision process is identical to the first distortion decision process except that the distortion decision process is performed using coordinates indicated by a plurality of magnetic data $s_1$ to $s_N$ after conversion instead of coordinates indicated by a plurality of magnetic data $q_1$ to $q_N$ as a plurality of input coordinates.

Hereinafter, the first distortion decision process will be described in section 11.1, and the second distortion decision process will be described in section 11.2.

11.1 FIRST DISTORTION DECISION PROCESS

Figure 23:
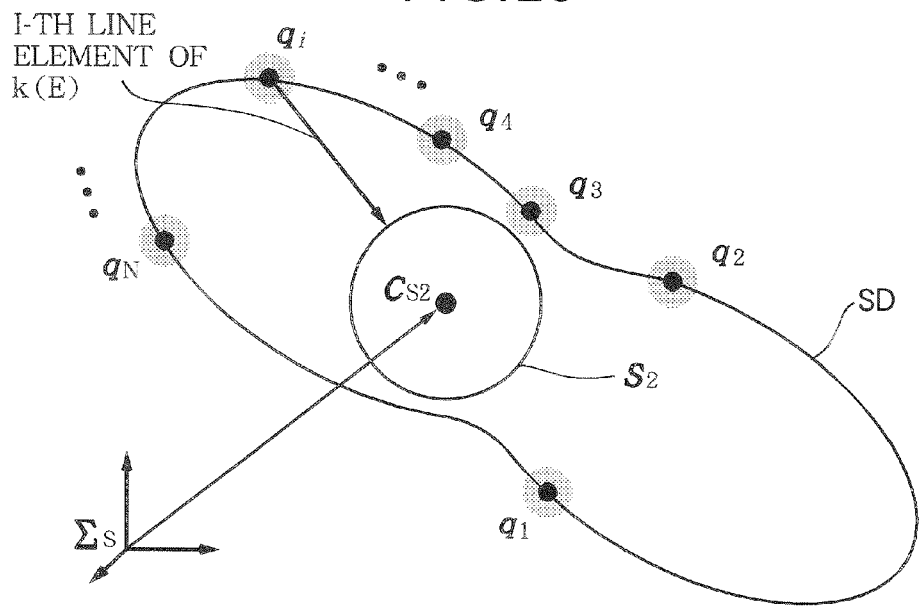
FIG. 23 is a conceptual view illustrating a distortion decision process according to a second embodiment of the present invention.

The distortion decision process assumes that a plurality of input coordinates, i.e. a plurality of coordinates indicated by a plurality of magnetic data $q_1$ to $q_N$, is distributed in the vicinity of the surface of a three-dimensional figure SD having a distorted shape different from a spherical surface. As shown in FIG. 23, the three-dimensional figure SD is a figure obtained by adding a spherical surface (second spherical surface) $S_2$ to a distortion error vector $k(E)$, and is represented by the following equation (83). Hereinafter, equation (83) will be referred to as a solid equation.

Here, the spherical surface $S_2$ is a spherical surface having a central point (a central point of the second spherical surface) $c_{S2}$ as the center, and is represented as a component $X(c-q_c)-j$ of the solid equation excluding the distortion error vector $k(E)$.

The distortion error vector $k(E)$ is an N-dimensional vector represented by the following equation (84). Where, a distortion evaluation matrix E is a symmetric matrix of 3×3 represented by the following equation (85), and a reference point $w_{KE}$ is a three-dimensional vector represented by the following equation (86). Also, $0_N$ present at the right side of equation (83) is an N-dimensional zero vector. A variable vector c present at the left side of equation (83) is a three-dimensional vector represented by equation (5). In this section, however, the variable vector c is used as a variable for representing the central point $c_{S2}$ of the spherical surface $S_2$.

The distortion decision process evaluates the magnitude of the distortion indicating component k(E) of the solid equation to evaluate to what extent the shape of the three-dimensional figure SD and the shape of the spherical surface $S_2$ are different from each other. Specifically, the magnitude of the influence of the distortion error vector k(E) of the solid equation is evaluated based on a distortion evaluation value $g_D(E)$ represented by equations (93) and (94), which will be described below.

$$X(c - q_C) + k(E) - j = O_N \tag{83}$$
where $$k(E) = \begin{bmatrix} (q_1 - w_{KE})^T E(q_1 - w_{KE}) \\ \vdots \\ (q_N - w_{KE})^T E(q_N - w_{KE}) \end{bmatrix} \tag{84}$$

$$E = \begin{bmatrix} e_{11} & e_{12} & e_{13} \\ e_{12} & e_{22} & e_{23} \\ e_{13} & e_{23} & e_{33} \end{bmatrix} \tag{85}$$

$$w_{KE} = \begin{bmatrix} w_x & w_y & w_z \end{bmatrix}^T \tag{86}$$

An i-th line element $ke(q_i - w_{KE})$ of N elements constituting the N-dimensional distortion error vector k(E) is given by substituting a vector $(q_i - w_{KE})$ representing coordinates indicated by the magnetic data $q_i$ with coordinates induced by the reference point $w_{KE}$ as the start point into a function ke(v) represented by the following equation (87). The function ke(v) is a function expressed in a quadratic form having the distortion evaluation matrix E represented by equation (85) as a coefficient matrix and three elements of a vector v represented by equation (88) as variables. That is, the function ke(v) indicates the inner product of the vector v and a vector Ev obtained by converting the vector v using the distortion evaluation matrix E.

Meanwhile, in the first distortion decision process, the central point $c_S$ of the spherical surface S is adopted as the reference point $w_{KE}$ as represented by the following equation $$ke(v) = v^T E v \tag{87}$$

$$\text{where } v = [v_x, v_y, v_z]^T \tag{88}$$

$$w_{KE} = c_S \tag{89}$$

When considering a measurement error of the three-dimensional magnetic sensor 60, all of the coordinates indicated by the magnetic data $q_1$ to $q_N$ do not present at positions completely coinciding with the three-dimensional figure SD with the result that the solid equation represented by equation (83) does not have a solution. In order to obtain a value presumed as the solution of the solid equation using a statistical method, therefore, a solid error vector $\delta_{3D}$, which is a vector absorbing an error represented by equation (90), is introduced. The solid error vector $\delta_{SD}$ is obtained by adding a second spherical error vector $\delta_{S2}$ to the distortion error vector k(E). The second spherical error vector $\delta_{S2}$ is a component of the solid equation corresponding to the component $X(c-q_c)-j$ indicating the spherical surface $S_2$.

The solid error vector $\delta_{SD}$ is an N-dimensional vector indicating errors between the coordinates indicated by the magnetic data $q_1$ to $q_N$ and the surface of the three-dimensional figure SD. The three-dimensional figure SD having the coordinates indicated by the magnetic data $q_1$ to $q_N$ in the vicinity of the surface thereof is expressed based on the variable vector c to minimize norm of the solid error vector $\delta_{SD}$ and the distortion evaluation matrix E, i.e. the variable vector c to minimize a distortion evaluation function $f_{SD}(E, c)$ represented by the following equation (92) and the distortion evaluation matrix E.

$$\delta_{SD} = \delta_{S2} + k(E) \tag{90}$$

$$\delta_{S2} = X(c - q_c) - j \tag{91}$$

$$f_{SD}(E,c) = \|\delta_{SD}\|_2 = \|X(c-q_c) + k(E) - j\|_2 \tag{92}$$

Hereinafter, properties of the solid error vector $\delta_{SD}$ represented by equation (90) will be described while being compared with the properties of the first spherical error vector $\delta_S$ represented by equation (79).

First, the first spherical error vector $\delta_S$ is a vector for absorbing errors between the coordinates indicated by the magnetic data $q_1$ to $q_N$ and the spherical surface S. A first line element to an N-th line element constituting the first spherical error vector $\delta_S$ are independent variables. In a case where errors between the coordinates indicated by the magnetic data $q_1$ to $q_N$ and the spherical surface S are absorbed by the first spherical error vector $\delta_S$, therefore, N errors between the coordinates indicated by the magnetic data $q_1$ to $q_N$ and the spherical surface S become values independently set without restriction. That is, the N errors represented by the first spherical error vector $\delta_S$ are independently probably set. All of the N errors are white noise which is symmetric and is not dependent on direction.

That is, the central point calculation process is a process of expressing the errors between the coordinates indicated by the magnetic data $q_1$ to $q_N$ and the spherical surface S according to the first spherical error vector $\delta_S$, which is white noise, and finding the central point $c_S$ of the spherical surface S to minimize the first spherical error vector $\delta_S$.

On the other hand, the solid error vector $\delta_{SD}$ is a vector represented by the sum of the second spherical error vector $\delta_{S2}$ and the distortion error vector k(E) for absorbing errors between the coordinates indicated by the magnetic data $q_1$ to $q_N$ and the three-dimensional figure SD.

In the same manner as the first spherical error vector $\delta_S$, the second spherical error vector $\delta_{S2}$ is a vector expressing the errors between the coordinates indicated by the magnetic data $q_1$ to $q_N$ and the spherical surface $S_2$ as white noise.

On the other hand, the distortion error vector k(E) is a vector having the function ke(v), configured in a quadratic form having three variables, represented by equation (87) as each element. The quadratic form having three variables is a function in which variables consist of quadratic terms. Various curved surfaces in the three-dimensional space, such as a straight line, a plane, a cylindrical surface, a spherical surface, an ellipsoid, a conical surface, a hyperboloid of one sheet, a hyperboloid of two sheets, and various paraboloids may be represented. Consequently, the distortion error vector k(E) does not express N errors between the coordinates indicated by the magnetic data $q_1$ to $q_N$ and the spherical surface $S_2$ as independent values but expresses all of the N errors as values having a restriction that the N errors are present on a curved surface in a three-dimensional space represented by the same function ke(v).

Consequently, the solid error vector $\delta_{SD}$ separately expresses the N errors between the coordinates indicated by the magnetic data $q_1$ to $q_N$ and the spherical surface $S_2$ as the second spherical error vector $\delta_{S2}$, which is white noise, and the distortion error vector k(E) indicating the curved surface representing distortion from the spherical surface $S_2$.

In a case where the influence of the distortion error vector k(E) in the solid equation is negligible, the three-dimensional figure SD and the spherical surface $S_2$ can be regarded as the same figure, and the distortion evaluation function $f_{SD}(E, c)$ set by equation (92) and the central point calculation function $f_S(c)$ set by equation (80) can be regarded as the same function. At this time, the three-dimensional figure SD obtained by minimizing the distortion evaluation function $f_{SD}(E, c)$ and the spherical surface S obtained by minimizing the central point calculation function $f_S(c)$ can be regarded as the same, and therefore, the coordinates indicated by the magnetic data $q_1$ to $q_N$ distributed in the vicinity of the surface of the three-dimensional figure SD can be regarded as also being distributed in the vicinity of the spherical surface S. In a case where the shape of the three-dimensional figure SD is regarded as a spherical surface as previously described, the coordinates indicated by the central point of the spherical surface represented by the three-dimensional figure SD and the central point $c_{OG}$ of the spherical surface $S_G$ can be regarded as coinciding with each other. Consequently, the coordinates indicated by the central point $c_S$ of the spherical surface S and the coordinates indicated by the central point $c_{OG}$ of the spherical surface $S_G$ can be regarded as the same.

In a case where the influence of the distortion error vector k(E) in the solid equation is little, therefore, the coordinates indicated by the central point $c_S$ of the spherical surface S calculated by the central point calculation means are regarded as the same as the coordinates indicated by the central point $c_{OG}$ of the spherical surface $S_G$, whereby it is possible to adopt the coordinates indicated by the central point $c_S$ as the offset $c_{OFF}$.

On the other hand, in a case where the influence of the distortion error vector k(E) in the solid equation is great, errors between the coordinates indicated by the magnetic data $q_1$ to $q_N$ and the spherical surface $S_2$ are absorbed by the second spherical error vector $\delta_{S2}$, which is white noise, and the distortion error vector k(E) representing distortion from the spherical surface $S_2$ as shown in FIG. 23. In this case, the three-dimensional figure SD has a shape different from the spherical surface.

Figure 24:
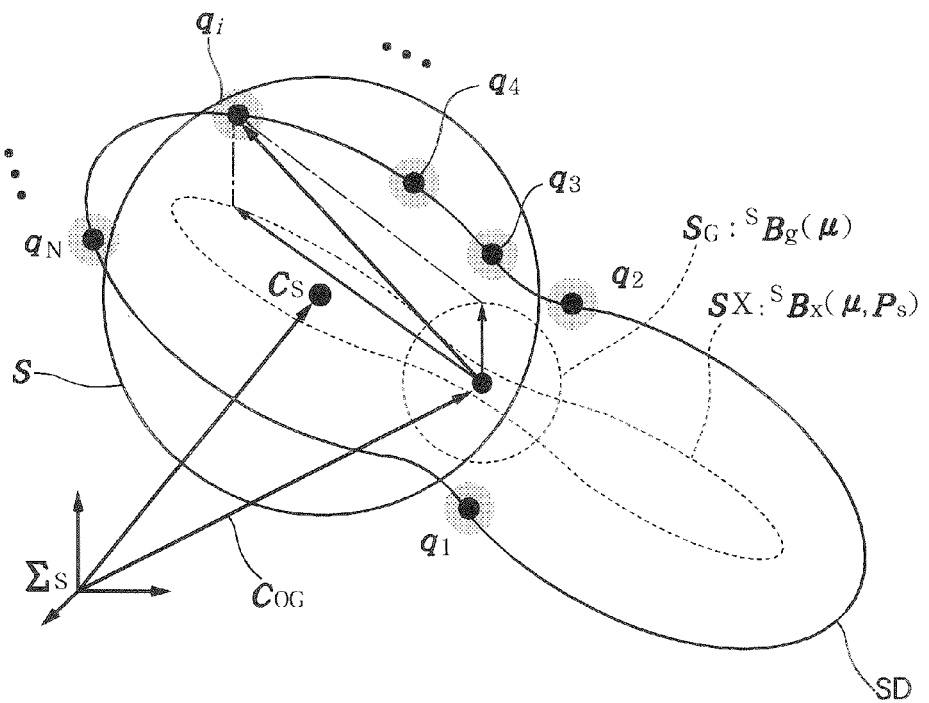
FIG. 24 is a conceptual view illustrating the distortion decision process according to the second embodiment of the present invention.

Also, in a case where the influence of the distortion error vector k(E) in the solid equation is great, the distortion evaluation function $f_{SD}(E, c)$ and the central point calculation function $f_S(c)$ are different from each other. In this case, as shown in FIG. 24, the three-dimensional FIG. 5D obtained by minimizing the distortion evaluation function $f_{SD}(E, c)$ and the spherical surface S obtained by minimizing the central point calculation function $f_S(c)$ are different from each other, and therefore, the coordinates indicated by the magnetic data $q_1$ to $q_N$ distributed in the vicinity of the surface of the three-dimensional figure SD cannot be regarded as being distributed in the vicinity of the spherical surface S.

The central point calculation process is a process of calculating the coordinates indicated by the central point $c_S$ that can be regarded as the same as the central point $c_{OG}$ of the spherical surface $S_G$ on the premise that the coordinates indicated by the magnetic data $q_1$ to $q_N$ are present in the vicinity of the spherical surface S. In a case where the coordinates indicated by the magnetic data $q_1$ to $q_N$ are not present in the vicinity of the spherical surface S, therefore, the central point $c_S$ and the central point $c_{OG}$ do not coincide with each other. In this case, it is not possible to adopt the vector indicating the coordinates of the central point $c_S$ as the offset $c_{OFF}$.

In this way, the magnitude of the influence of the distortion error vector k(E) in the solid equation is evaluated to determine whether or not the central point $c_S$ of the spherical surface S can be adopted as the offset $c_{OFF}$. Hereinafter, a method of evaluating the magnitude of the influence of the distortion error vector k(E) will be described.

Here, the distortion evaluation value $g_D(E)$ represented by equations (93) and (94) is defined as an evaluation value for evaluating the magnitude of the influence of the distortion error vector k(E) in the solid equation. The distortion evaluation value $g_D(E)$ is an absolute value of a maximum eigenvalue $\lambda_{E1}$ having the maximum absolute value (that is, norm of the distortion evaluation matrix E), which is one of the three eigenvalues of the distortion evaluation matrix E.

If the distortion evaluation value $g_D(E)$ is a small value equal to or less than an allowable distortion value $\delta_O$, the three-dimensional figure SD and the spherical surface $S_2$ can be regarded as the same figure, and the coordinates indicated by the magnetic data $q_1$ to $q_N$ distributed in the vicinity of the surface of the three-dimensional figure SD can also be regarded as also being distributed in the vicinity of the spherical surface S. At this time, it is possible to adopt the vector indicating the coordinates of the central point $c_S$ of the spherical surface S as the offset $c_{OFF}$ of the magnetic sensor.

$$g_D(E)=|\lambda_{E1}|=\|E\|_2 \tag{93}$$

$$\text{where } f_{SD}(E,c) \to \text{Min} \tag{94}$$

Meanwhile, as previously described, each element of the distortion error vector k(E) is the inner product of the vector $(q_i - w_{KE})$ representing the coordinates indicated by the magnetic data $q_i$ viewed from the coordinates indicated by the reference point $w_{KE}$ and a vector $E(q_i - w_{KE})$ obtained by converting the vector $(q_i - w_{KE})$ using the distortion evaluation matrix E.

That is, absolute values of the elements constituting the distortion error vector k(E) are great in a case where the vector $(q_i - w_{KE})$ representing the coordinates indicated by the magnetic data $q_i$ corresponding to such elements from the coordinates indicated by the reference point $w_{KE}$ and an eigenvector $u_{E1}$ corresponding to the maximum eigenvalue $\lambda_{E1}$ having the maximum absolute value, which is one of the three eigenvalues of the distortion evaluation matrix E are parallel to each other.

In a case where the respective components of the distortion evaluation matrix E are set such that a direction in which a region, at which a large amount of magnetic data $q_i$ indicating coordinates having great errors between the coordinates and the spherical surface $S_2$ are present, is represented from the coordinates indicated by the reference point $w_{KE}$ and a direction of the eigenvector $u_{E1}$ corresponding to the maximum eigenvalue $\lambda_{E1}$ of the distortion evaluation matrix E are the same, therefore, the distortion error vector k(E) correctly expresses the magnitude of the errors between the coordinates indicated by the magnetic data $q_1$ to $q_N$ and the spherical surface $S_2$.

The distortion evaluation matrix E for minimizing the distortion evaluation function $f_{SD}(E, c)$ is set to correctly express the errors between the coordinates indicated by the magnetic data $q_1$ to $q_N$ and the spherical surface $S_2$. Consequently, the respective components of the distortion evaluation matrix E are set so that the direction of the eigenvector $u_{E1}$ corresponding to the maximum eigenvalue $\lambda_{E1}$ and the direction of the vector representing the region, at which a large amount of magnetic data having great errors from the spherical surface $S_2$ are present, from the coordinates indicated by the reference point $w_{KE}$ are close to each other. Also, the maximum eigenvalue $\lambda_{E1}$ of the distortion evaluation matrix E becomes a value expressing the magnitude of an error of the magnetic data $q_i$ having a great error from the spherical surface $S_2$.

In this embodiment, the distortion evaluation value $g_D(E)$ indicating to what extent the shape of the three-dimensional figure SD and the shape of the spherical surface are different from each other is set based on the maximum eigenvalue $\lambda_{E1}$ of the distortion evaluation matrix E. Consequently, it is possible to evaluate the magnitude of the error between the magnetic data $q_i$ indicating coordinates having a great distance from the spherical surface $S_2$ and the spherical surface $S_2$, i.e. to what extent the shape of the three-dimensional figure SD and the shape of the spherical surface are different from each other, using the distortion evaluation value $g_D(E)$.

Hereinafter, a method of finding the distortion evaluation value $g_D(E)$ will be described.

First, the function ke(v) represented by equation (87) can be modified into the following equation (95). Also, an i-th line element $ke(q_i - w_{KE})$ of the N-dimensional distortion error vector k(E) can be modified into the following equation (96) using a six-dimensional vector $ke_2(i)$ represented by equation (97) and a six-dimensional vector $e_E$ in which each component of the distortion evaluation matrix E is arranged as represented by equation (98).

$$ke(v) = \begin{bmatrix} v_x^2 \\ v_y^2 \\ 2v_x v_y \\ v_z^2 \\ 2v_y v_z \\ 2v_x v_z \end{bmatrix}^T \begin{bmatrix} e_{11} \\ e_{22} \\ e_{12} \\ e_{33} \\ e_{23} \\ e_{13} \end{bmatrix} \tag{95}$$

$$ke(q_i - w_{KE}) = ke_2(i)^T e_E \quad (i = 1, \ldots, N) \tag{96}$$

where $$ke_2(i) = \begin{bmatrix} (q_{ix} - w_x)^2 \\ (q_{iy} - w_y)^2 \\ 2(q_{ix} - w_x)(q_{iy} - w_y) \\ (q_{iz} - w_z)^2 \\ 2(q_{iy} - w_y)(q_{iz} - w_z) \\ 2(q_{ix} - w_x)(q_{iz} - w_z) \end{bmatrix} \quad (i = 1, \ldots, N) \tag{97}$$

$$e_E = [e_{11} \ e_{22} \ e_{12} \ e_{33} \ e_{23} \ e_{13}]^T \tag{98}$$

Here, a matrix $X_2$ represented by equation (99) is introduced. The matrix $X_2$ is a matrix of N×9 generated by arranging a vector of 1×6 obtained by transposing the vector $ke_2(i)$ and a vector of 1×3 obtained by transposing the vector $(q_i - q_c)$ at each row.

$$X_2 = \begin{bmatrix} ke_2(1)^T & (q_1 - q_C)^T \\ ke_2(2)^T & (q_2 - q_C)^T \\ \vdots & \vdots \\ ke_2(N)^T & (q_N - q_C)^T \end{bmatrix} \tag{99}$$

The distortion evaluation function $f_{SD}(E, c)$ represented by equation (92) is modified into a function $g_{SD}(e)$ represented by the following equation (100) using the matrix $X_2$. Meanwhile, a vector e is a nine-dimensional vector in which the vector $e_E$ and a three-dimensional vector $e_x$ represented by the following equation (102) are arranged as represented by the following equation (101).

$$g_{SD}(e) = \|X_2 e - j\|_2 \tag{100}$$

where $$e = \begin{bmatrix} e_E \\ e_X \end{bmatrix} \tag{101}$$

here $$e_X = c - q_C \tag{102}$$

A solution $e = e_O$ to minimize the function $g_{SD}(e)$ represented by equation (100) is found by applying a Gauss elimination method or a Cholesky factorization method to a simultaneous equation represented by the following equation (103). Meanwhile, equation (103) is a normal equation calculated by applying a least squares method to equation $$(X_2^T X_2) e_O = X_2^T j \tag{103}$$

The distortion evaluation matrix E of equation (85) is restored based on the solution $e_O$ obtained as described above. Also, the distortion evaluation value $g_D(E)$ represented by equation (93), i.e. the norm of the distortion evaluation matrix E, is found, and it is decided whether or not the distortion evaluation value $g_D(E)$ is equal to or less than the allowable distortion value $\delta_O$. Meanwhile, the norm of the distortion evaluation matrix E is equal to an absolute value of the maximum eigenvalue $X_{E1}$ having the maximum absolute value, which is one of the three eigenvalues of the distortion evaluation matrix E, and therefore, it is possible to find the norm of the distortion evaluation matrix E using a Jacobi method or a power method.

In a case where the distortion evaluation value $g_D(E)$ is equal to or less than the allowable distortion value $\delta_O$, the geomagnetism measurement apparatus advances the process to the offset adoption process of step S10, and adopts a vector indicating the coordinates of the central point $c_S$ of the spherical surface S as the offset $c_{OFF}$.

On the other hand, in a case where the distortion evaluation value $g_D(E)$ is greater than the allowable distortion value $\delta_O$, it is not possible to adopt the vector indicating the coordinates of the central point $c_S$ of the spherical surface S as the offset $c_{OFF}$. In this case, the geomagnetism measurement apparatus advances the process to the initial ellipsoid generation process of step S6.

In this way, the first distortion decision process evaluates to what extent the shape of the three-dimensional figure SD having the coordinates indicated by the magnetic data $q_1$ to $q_N$ in the vicinity thereof is different from that of the spherical surface. In a case where the difference between the shape of the three-dimensional figure SD and the shape of the spherical surface is negligible, the three-dimensional figure SD can be regarded as the spherical surface, and therefore, it is possible to adopt the vector indicating the coordinates of the central point $c_S$ of the spherical surface S as the offset $c_{OFF}$. In this case, a soft iron effect can be regarded as not being generated, and therefore, it is possible to calculate the direction of the geomagnetism $B_g$ without execution of the ellipsoidal correction (the initial ellipsoid generation process, the optimal ellipsoid generation process, and the ellipsoid to spherical surface conversion process) of steps S6 to S8.

That is, the geomagnetism measurement apparatus according to this embodiment performs the first distortion decision process to determine whether or not the soft iron effect is generated. Upon determining that the soft iron effect is generated, the geomagnetism measurement apparatus calculates the direction of the geomagnetism $B_g$ without execution of the ellipsoidal correction. Consequently, it is possible for the geomagnetism measurement apparatus according to this embodiment to greatly reduce calculation load involved in calculating the direction of the geomagnetism $B_g$.

Meanwhile, although, in this embodiment, the offset adoption unit 610a adopts the vector indicating the coordinates of the central point $c_S$ of the spherical surface S as the offset $c_{OFF}$ in a case where the distortion evaluation value $g_D(E)$ is equal to or less than the allowable distortion value $\delta_O$, a vector indicating the coordinates of the central point $c_{S2}$ of the spherical surface $S_2$ may be adopted as the offset $c_{OFF}$. This is because, in a case where the distortion evaluation value $g_D(E)$ is equal to or less than the allowable distortion value $\delta_O$, the coordinates indicated by the central point $c_S$ of the spherical surface S and the coordinates indicated by the central point $c_{S2}$ of the spherical surface $S_2$ become almost the same, and therefore, it is possible to adopt both the coordinates indicated by the central point $c_S$ of the spherical surface S and the coordinates indicated by the central point $c_{S2}$ of the spherical surface $S_2$ as the offset $c_{OFF}$.

Meanwhile, the coordinates of the central point $c_{S2}$ of the spherical surface $S_2$ are calculated as the variable vector c in a case where a three-dimensional vector, corresponding to $e_x$ of equation (101), of the solution eO to minimize the function $g_{SD}(e)$ is substituted into equation (102).

11.2 SECOND DISTORTION DECISION PROCESS

Figure 25:
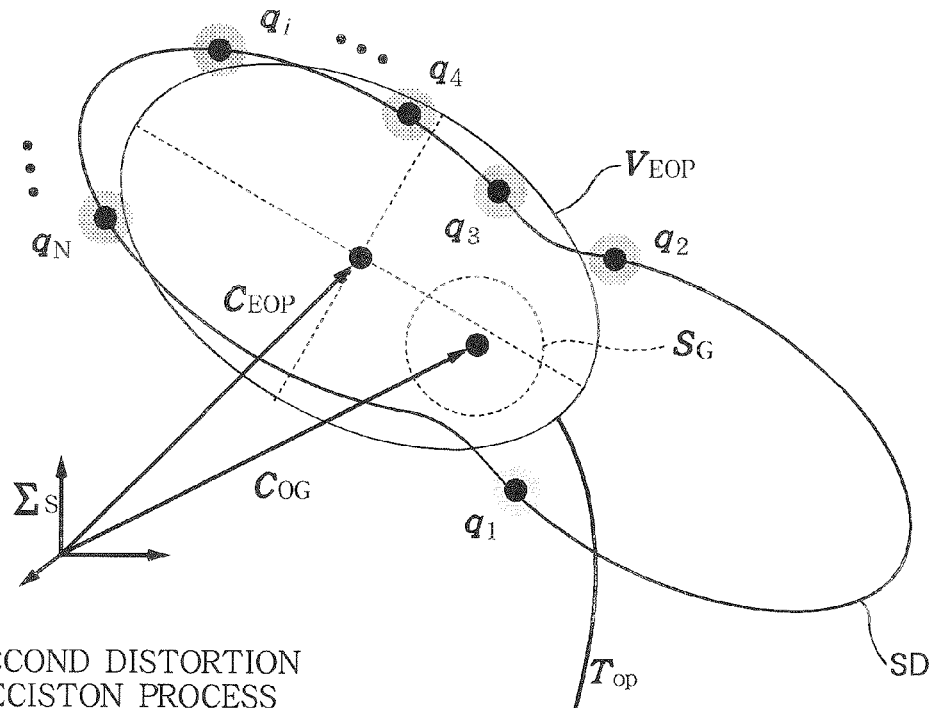
FIG. 25 is a conceptual view illustrating the distortion decision process according to the second embodiment of the present invention.
Figure 25:
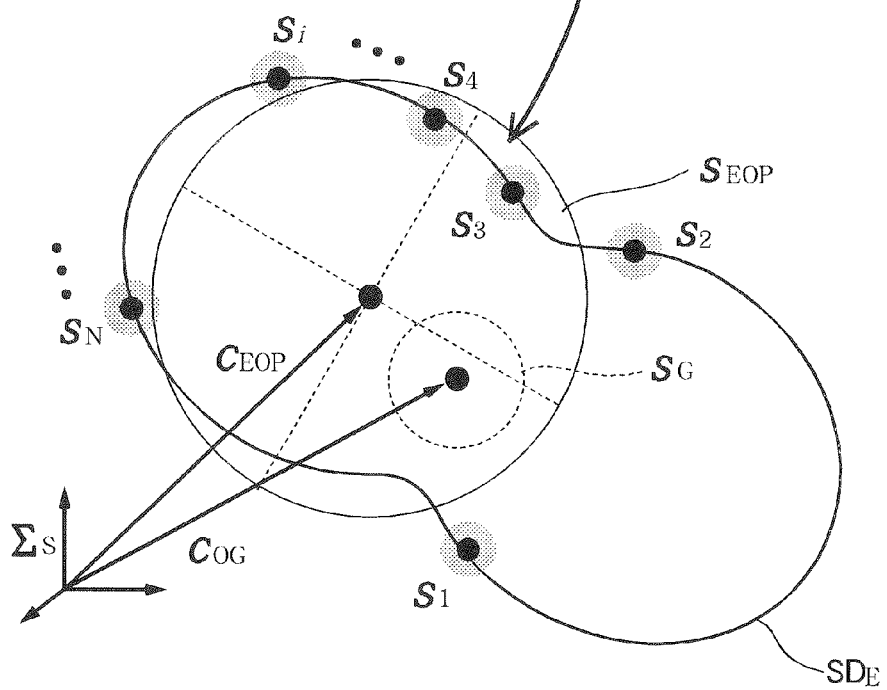

The second distortion decision process performed by the distortion decision unit 900 at step S9 will be described with reference to FIG. 25.

In a case where the decision result of the first distortion decision process at step S5 is negative, i.e. in a case where it is decided that the shape of the three-dimensional figure SD having the coordinates indicated by the magnetic data $q_1$ to $q_N$ in the vicinity thereof is a distorted shape different from the spherical surface as shown in FIG. 25(A), the second distortion decision process is performed to evaluate the distribution pattern of the coordinates indicated by a plurality of magnetic data $s_1$ to $s_N$ after conversion as shown in FIG. 25(B). That is, in the second distortion decision process, the distortion decision unit 900 uses the coordinates indicated by the magnetic data $s_1$ to $s_N$ after conversion as a plurality of input coordinates.

In a case where, in the first distortion decision process, it is evaluated that the shape of the three-dimensional figure SD having the coordinates indicated by the magnetic data $q_1$ to $q_N$ in the vicinity thereof is a distorted shape different from the spherical surface, the three-dimensional figure SD may not be distorted by a nonuniform external magnetic field $B_X$ but by a soft iron effect. In a case where a nonuniform external magnetic field $B_X$ is not present, and the soft iron effect is not generated, the three-dimensional figure SD having the coordinates indicated by the magnetic data $q_1$ to $q_N$ in the vicinity thereof can be regarded as having the same shape as the ellipsoid $V_E$. In this case, the coordinates indicated by the magnetic data $s_1$ to $s_N$ after conversion obtained by converting the coordinates indicated by the magnetic data $q_1$ to $q_N$ using the optimal ellipsoidal correction matrix $T_{OP}$ are distributed in the vicinity of the spherical surface $S_{EOP}$, and therefore, the shape of the three-dimensional figure $SD_E$ having the coordinates indicated by the magnetic data $s_1$ to $s_N$ after conversion in the vicinity thereof can be regarded as the spherical surface.

On the other hand, in a case where a nonuniform external magnetic field $B_X$ is present, as shown in FIG. 25(A), the three-dimensional figure SD having the coordinates indicated by the magnetic data $q_1$ to $q_N$ in the vicinity thereof has a distorted shape different from the spherical surface, and, in addition, has a shape different from the ellipsoid. In this case, the coordinates indicated by the magnetic data $s_1$ to $s_N$ after conversion obtained by converting the coordinates indicated by the magnetic data $q_1$ to $q_N$ using the optimal ellipsoidal correction matrix $T_{OP}$ are distributed in the vicinity of the three-dimensional figure $SD_E$ having a distorted shape different from the spherical surface $S_{EOP}$ as shown in FIG. 25(B).

In this way, the second distortion decision process evaluates to what extent the shape of the three-dimensional figure $SD_E$ having the coordinates indicated by the magnetic data $s_1$ to $s_N$ after conversion in the vicinity thereof is different from that of the spherical surface (for example, spherical surface $S_{EOP}$) to evaluate to what extent the shape of the three-dimensional figure SD having the coordinates indicated by the magnetic data $q_1$ to $q_N$ in the vicinity thereof is different from that of the ellipsoid (for example, the ellipsoid $V_E$).

Meanwhile, in the second distortion decision process, in a case where the shape of the three-dimensional figure $SD_E$ is regarded as the same as that of spherical surface, the coordinates indicated by the optimal central point $c_{EOP}$ can be adopted as the offset $c_{OFF}$ since the influence of the nonuniform external magnetic field $B_X$ is not present although the soft iron effect is generated.

On the other hand, in a case where, in the second distortion decision process, it is evaluated that the shape of the three-dimensional figure $SD_E$ is a distorted shape different from that of the spherical surface as shown in FIG. 25(B), it is not possible to calculate the offset $c_{OFF}$ based on the magnetic data $q_1$ to $q_N$ since the magnetic data $q_1$ to $q_N$ are influenced by the nonuniform external magnetic field E.

Hereinafter, the second distortion decision process will be described in detail.

As previously described, the second distortion decision process is identical to the first distortion decision process except that the distortion decision process is performed using coordinates indicated by a plurality of magnetic data $s_1$ to $s_N$ after conversion instead of coordinates indicated by a plurality of magnetic data $q_1$ to $q_N$ as a plurality of input coordinates. That is, the second distortion decision process is a process of substituting values of the coordinates of the magnetic data $s_1$ to $s_N$ after conversion represented by the following equations (104) and (105) into the coordinates indicated by the magnetic data $q_1$ to $q_N$ used in the first distortion decision process and executing the first distortion decision process described in section 11.1.

Meanwhile, the value calculated in the central point calculation process described in section 9, which is one of the values used in the distortion decision process, e.g. the matrix X present in the solid equation represented by equation (83), is also calculated using the coordinates of the magnetic data $s_1$ to $s_N$ after conversion instead of the coordinates indicated by the magnetic data $q_1$ to $q_N$. For example, a center of gravity $s_c$ of the coordinates of the magnetic data $s_1$ to $s_N$ after conversion represented by the following equation (106) is substituted into the center of gravity $q_c$ represented by equation (74), and then the second distortion decision process is carried out. Although these values are calculated by the central point calculation unit 800, such calculation may be carried out by the distortion decision unit 900.

Also, the coordinates indicated by the optimal central point $c_{EOP}$ as expressed by the following equation (107) are substituted into the reference point $w_{KE}$ instead of the coordinates indicated by the central point $c_S$, and then second distortion decision process is carried out.

The second distortion decision process calculates the distortion evaluation value $g_D(E)$ from the distortion evaluation matrix E obtained by minimizing the value of the distortion evaluation function $f_{SD}(E, c)$ set based on the coordinates indicated by the magnetic data $s_1$ to $s_N$ after conversion as described above to evaluate to what extent the shape of the three-dimensional figure $SD_E$ is different from that of the spherical surface.

$$q_i = s_i \ (i = 1, \ldots, N) \tag{104}$$
where
$$s_i = [x_i \ y_i \ z_i]^T \ (i = 1, \ldots, N) \tag{105}$$
$$s_C = \frac{1}{N}\sum_{i=1}^{N} s_i \tag{106}$$
$$w_{KE} = c_{E0P} \tag{107}$$

In a case where the distortion evaluation value $g_D(E)$ calculated based on the coordinates indicated by the magnetic data $s_1$ to $s_N$ after conversion is equal to or less than the allowable distortion value $\delta_O$, the influence of the nonuniform external magnetic field $B_X$ is not present although the soft iron effect is generated. Consequently, the geomagnetism measurement apparatus advances the process to the offset adoption process of step S10, and adopts a vector indicating the coordinates of the optimal central point $c_{EOP}$ as the offset $c_{OFF}$. As previously described, the vector indicating the coordinates of the central point $c_{S2}$ of the spherical surface $S_2$ in the second distortion decision process may be adopted as the offset $c_{OFF}$.

On the other hand, in a case where the distortion evaluation value $g_D(E)$ calculated based on the coordinates indicated by the magnetic data $s_1$ to $s_N$ after conversion is greater than the allowable distortion value $\delta_O$, the influence of the nonuniform external magnetic field $B_X$ is present. Consequently, the geomagnetism measurement apparatus returns the process to the initialization process of step S1, and prevents the vector indicating the coordinates of the optimal central point $c_{EOP}$ of the spherical surface $S_{EOP}$ from being adopted as the offset $c_{OFF}$.

Meanwhile, although, in this embodiment, the allowable distortion value $\delta_O$ in the first distortion decision process and the allowable distortion value $\delta_O$ in the second distortion decision process are set to the same value, the allowable distortion value $\delta_O$ in the first distortion decision process and the allowable distortion value $\delta_O$ in the second distortion decision process may be set to different values.

12. CONCLUSION OF SECOND EMBODIMENT

As described above, the geomagnetism measurement apparatus according to the second embodiment, including the distortion decision unit 900, evaluates to what extent the shape of the three-dimensional figure SD having the coordinates indicated by the magnetic data $q_1$ to $q_N$ in the vicinity thereof is different from that of the spherical surface.

In a case where the shape of the three-dimensional figure SD can be regarded as the spherical surface, it is possible to calculate the direction of the geomagnetism $B_g$ through simple calculation. Specifically, in a case where the distortion decision unit 900 decides that the coordinates indicated by the magnetic data $q_1$ to $q_N$ are distributed in the vicinity of the spherical surface, the geomagnetism measurement apparatus according to the second embodiment the vector representing the coordinates of the central point $c_S$ calculated by the central point calculation unit 800 adopts as the offset $c_{OFF}$. Also, the geomagnetism measurement apparatus calculates the direction of the geomagnetism $B_g$ based on the coordinates of the central point $c_S$ and the coordinates indicated by the magnetic data $q_i$.

In a case where the three-dimensional magnetic sensor 60 is mounted in the instrument 1a which does not include a soft magnetic material, and a soft iron effect is not generated, therefore, it is possible for the geomagnetism measurement apparatus according to the second embodiment to calculate the direction of the geomagnetism $B_g$ without ellipsoidal correction, thereby reducing calculation load.

Also, the geomagnetism measurement apparatus according to the second embodiment includes the ellipsoidal correction unit 200, the ellipsoid to spherical surface conversion unit 500, and the distortion decision unit 900. In a case where the distortion decision unit 900 decides that the shape of the three-dimensional figure SD having the coordinates indicated by the magnetic data $q_1$ to $q_N$ in the vicinity thereof is a distorted shape different from the spherical surface, the distortion decision unit 900 evaluates to what extent the shape of the three-dimensional figure $SD_E$ having the coordinates indicated by the magnetic data $s_1$ to $s_N$ after conversion, calculated by the ellipsoid to spherical surface conversion unit 500, in the vicinity thereof is different from that of the spherical surface to determine whether the three-dimensional figure SD is distorted by the soft iron effect or by the nonuniform external magnetic field B.

In a case where the shape of the three-dimensional figure $SD_E$ is a distorted shape different from the spherical surface, i.e. in a case where the three-dimensional figure SD is distorted by the nonuniform external magnetic field $B_X$, the geomagnetism measurement apparatus prevents calculation of the offset $c_{OFF}$ based on the coordinates indicated by the magnetic data $q_1$ to $q_N$ measured under the influence of the nonuniform external magnetic field B.

On the other hand, in a case where the shape of the three-dimensional figure $SD_E$ is regarded as the spherical surface, the geomagnetism measurement apparatus calculates the direction of the geomagnetism $B_g$ based on the coordinates indicated by the optimal central point $c_{EOP}$, the optimal ellipsoidal correction matrix $T_{OP}$, and the coordinates indicated by the magnetic data $q_i$ output by the three-dimensional magnetic sensor 60.

In this way, the ellipsoidal correction unit 200, the ellipsoid to spherical surface conversion unit 500, and the distortion decision unit 900 function as the distorted shape determination unit 4 for determining whether the three-dimensional figure SD having the coordinates indicated by the magnetic data $q_1$ to $q_N$ in the vicinity thereof is a spherical surface, an ellipsoid, or a three-dimensional figure having a distorted shape different from the spherical surface and the ellipsoid, and therefore, it is possible to prevent calculation of incorrect geomagnetism $B_g$ due to the incorrect offset $c_{OFF}$.

Also, it is possible for the geomagnetism measurement apparatus according to the second embodiment to decide whether or not the coordinates indicated by the magnetic data $q_1$ to $q_N$ are distributed while having three-dimensional extension in the sensor coordinate system $\Sigma_S$. In a case where the coordinates indicated by the magnetic data $q_1$ to $q_N$ are two-dimensionally or one-dimensionally distributed, therefore, it is possible to prevent the central point calculation unit 800 from calculating the coordinates indicated by the central point $c_S$ and to prevent the incorrect central point $c_S$ from being adopted as the offset $c_{OFF}$.

Also, in a case where the coordinates indicated by the magnetic data $q_1$ to $q_N$ are two-dimensionally or one-dimensionally distributed, it may frequently be difficult to specify the shape of the ellipsoid from the distribution pattern of the coordinates indicated by the magnetic data $q_1$ to $q_N$. In this case, therefore, the ellipsoidal correction unit 200 is prevented from performing ellipsoidal correction.

C. Modifications

The present invention is not limited to the above-described embodiments but may be modified as follows. Also, two or more of the following modifications can be properly combined within the scope of non-contradiction.

(1) First Modification

Although, in the above-described embodiments, the central point $c_S$ represented by equation (89) or the optimal central point $c_{EOP}$ represented by equation (107) is adopted as the reference point $W_{EE}$ used in the distortion error vector $k(E)$, the present invention is not limited thereto. The center of gravity $q_c$ represented by equation (74) or the center of gravity $s_c$ represented by equation (106) may be adopted as the reference point $w_{KE}$.

The respective components of the distortion evaluation matrix E are set so that, when viewed from the coordinates indicated by the reference point $w_{KE}$, the direction of the eigenvector $u_{E1}$ corresponding to the maximum eigenvalue $\lambda_{E1}$ of the distortion evaluation matrix E and the direction indicating the region, at which a large amount of magnetic data $q_i$ (or magnetic data $s_i$ after conversion) having great errors from the spherical surface $S_2$ are present, are close to each other. Also, when viewed from the reference point $w_{KE}$, the maximum eigenvalue $\lambda_{E1}$ of the distortion evaluation matrix E becomes a value indicating the magnitude of the error between the coordinates indicated by the magnetic data $q_i$ (or magnetic data $s_i$ after conversion) present in the direction of the eigenvector $u_{E1}$ and the spherical surface $S_2$.

Therefore, in a case where the coordinates indicated by the magnetic data $q_1$ to $q_N$ (or the magnetic data $s_1$ to $s_N$ after conversion) are widely distributed, when viewed from the reference point $w_{KE}$, although the reference point $w_{KE}$ can be set to any value, it is possible to evaluate to what extent the shape of the three-dimensional figure SD (or the three-dimensional figure $SD_E$) is different from that of the spherical surface $S_2$ using the distortion evaluation matrix E.

(2) Second Modification

Although, in the above-described embodiments and modification, both the first distortion decision process and the second distortion decision process evaluate to what extent the shape of the three-dimensional figure SD (or the three-dimensional figure $SD_E$) is different from that of the spherical surface using the distortion evaluation value $g_D(E)$ calculated based on the distortion error vector $k(E)$ using one reference point $w_{KE}$, the present invention is not limited thereto. Two distortion evaluation values $g_D(E)$ may be calculated based on the two different distortion error vectors $k(E)$ calculated using two reference points $w_{KE}$ to evaluate to what extent the shape of the three-dimensional figure SD (or the three-dimensional figure $SD_E$) is different from that of the spherical surface.

For example, in the second distortion decision process, it may be evaluated to what extent the shape of the three-dimensional figure $SD_E$ is different from that of the spherical surface based on the distortion evaluation value $g_D(E)$ calculated by adopting the optimal central point $c_{EOP}$ as the reference point $w_{KE}$, and then it may be evaluated to what extent the shape of the three-dimensional figure $SD_E$ is different from that of the spherical surface based on the distortion evaluation value $g_D(E)$ calculated by adopting the center of gravity $s_C$ as the reference point $w_{KE}$. In this case, in these two evaluations, the result of the distortion decision process may be affirmative in a case where the shape of the three-dimensional figure $SD_E$ can be regarded as that of the spherical surface.

In this way, the magnitudes of the errors between the coordinates indicated by the magnetic data $q_1$ to $q_N$ (or the magnetic data $s_1$ to $s_N$ after conversion) and spherical surface $S_2$ are evaluated using the two reference points $w_{KE}$, and therefore, it is possible to correctly evaluate to what extent the shape of the three-dimensional figure SD (or the three-dimensional figure $SD_E$) is different from that of the spherical surface as compared with a case in which only one reference point $w_{KE}$ is used.

(3) Third Modification

Although, in the above-described embodiments and modifications, the geomagnetism measurement apparatus performs both the first distortion decision process (step S5) and the second distortion decision process (step S9), the present invention is not limited thereto. The geomagnetism measurement apparatus may perform the first distortion decision process or the second distortion decision process.

For example, in a case where the geomagnetism measurement apparatus performs only the first distortion decision process, it is possible to decide whether or not the shape of the three-dimensional figure SD having the coordinates indicated by the magnetic data $q_1$ to $q_N$ in the vicinity thereof can be regarded as the spherical surface, and therefore, it is possible to decide whether or not a soft iron effect is generated. Also, in a case where the soft iron effect is not generated, it is possible to calculate the direction of the geomagnetism Bg based on the coordinates indicated by the magnetic data $q_i$ output by the three-dimensional magnetic sensor 60 and the coordinates indicated by the central point $c_S$ of the spherical surface S calculated by the central point calculation unit 800 without the ellipsoidal correction unit 200 performing ellipsoidal correction, thereby reducing calculation load.

Also, for example, in a case where the geomagnetism measurement apparatus performs only the second distortion decision process, it is possible to decide whether or not the shape of the three-dimensional figure $SD_E$ having the coordinates indicated by the magnetic data $s_1$ to $s_N$ after conversion in the vicinity thereof can be regarded as the spherical surface.

In a case where the decision result of the second distortion decision process is affirmative, it is possible to regard the shape of the three-dimensional figure SD having the coordinates indicated by the magnetic data $q_1$ to $q_N$ in the vicinity thereof as an ellipsoid, and therefore, it is possible to calculate the direction of the geomagnetism $B_g$ based on the coordinates indicated by the magnetic data $q_i$ output by the three-dimensional magnetic sensor 60, the optimal ellipsoidal correction matrix $T_{OP}$, and the coordinates indicated by the optimal central point $c_{EOP}$. Meanwhile, since an ellipsoid includes a spherical surface (for example, in a case where all of the three eigenvalues of the ellipsoidal correction matrix $T_E$ are 1), it is possible to calculate the direction of the geomagnetism $B_g$ irrespective of whether or not a soft iron effect is generated.

On the other hand, in a case where the decision result of the second distortion decision process is negative, the magnetic data $q_1$ to $q_N$ are influenced by the nonuniform external magnetic field $B_X$, and therefore, the geomagnetism measurement apparatus prevents calculation of the offset $c_{OFF}$ and the direction of the geomagnetism $B_g$.

(4) Fourth Modification

Although, in the above-described embodiments and modifications, the geomagnetism measurement apparatus, including the optimal ellipsoidal correction value generation unit 400, performs ellipsoidal correction for converting the coordinates indicated by the magnetic data $q_i$ into the coordinates indicated by the magnetic data $s_i$ after conversion based on the optimal ellipsoidal correction matrix $T_{OP}$ and the coordinates indicated by the optimal central point $c_{EOP}$, the present invention is not limited thereto. The geomagnetism measurement apparatus may be configured not to include the optimal ellipsoidal correction value generation unit 400. In this case, the geomagnetism measurement apparatus (the geomagnetism calculation unit 600 or the geomagnetism calculation unit 600a) may adopt the initial ellipsoidal correction matrix $T_O$ and the coordinates of the initial central point $c_{EO}$ generated by the initial ellipsoidal correction value generation unit 300 as the ellipsoidal correction matrix $T_E$ and the offset $C_{OFF}$ to perform ellipsoidal correction. In this case, the geomagnetism measurement apparatus does not perform the optimal ellipsoid generation process, and therefore, it is possible to reduce calculation load involved in calculating the geomagnetism $B_g$.

Meanwhile, the initial ellipsoidal correction value generation unit 300 generates three different ellipsoids using three different evaluation axes, such as the first evaluation axis $\xi_1$, the first evaluation axis $\xi_2$, and the first evaluation axis $\xi_3$, in the space $\Omega$, decides whether or not distances between the respective central points of these three ellipsoids are equal to or less than the first threshold value $\Delta c$, and, in a case where the decision result is affirmative, generates the initial ellipsoidal correction matrix $T_O$ and the coordinates of the initial central point $c_{EO}$. Consequently, the initial ellipsoid $V_{EO}$ represented by the initial ellipsoidal correction matrix $T_O$ and the coordinates of the initial central point $c_{EO}$ is not an ellipsoid to minimize the errors between the ellipsoid and the coordinates indicated by the magnetic data $q_1$ to $q_N$ but correctly represents the distribution pattern of the coordinates indicated by the magnetic data $q_1$ to $q_N$. That is, it is possible to calculate the correct direction of the geomagnetism $B_g$ through ellipsoidal correction using the initial ellipsoidal correction matrix $T_O$ and the coordinates of the initial central point $c_{EO}$.

In the above described embodiments and modifications of the geomagnetism measurement apparatus, the initial ellipsoidal correction value generation unit 300 generates a first ellipsoid ($V_{xx}$), a second ellipsoid ($V_{yy}$) and a third ellipsoid ($V_{zz}$), and calculates the initial ellipsoidal correction matrix $T_O$ and the initial central point $c_{EO}$ based on these three ellipsoids. However, the present invention is not limited to these embodiments and modifications. A known method may be appropriately adapted to calculate the initial ellipsoidal correction matrix $T_O$ and the initial central point $c_{EO}$.

For example, the initial ellipsoidal correction matrix $T_O$ and the initial central point $c_{EO}$, can be calculated according to the comparative example disclosed in the non-patent literature 2 and described before in the specification. Further, it may be possible to adopt unit matrix of 3×3 as the initial ellipsoidal correction matrix $T_O$, and to adopt the origin point $^sO = (0,0,0)^T$ as the initial central point $c_{EO}$. In this case, it is possible to reduce work load required for computation of the initial ellipsoidal correction matrix $T_O$ and the initial central point $c_{EO}$.

(5) Fifth Modification

Although, in the above-described embodiments and modifications, the geomagnetism measurement apparatus applies the coordinates indicated by the magnetic data $s_1$ to $s_N$ after conversion as a plurality of input coordinates used in the second distortion decision process, the present invention is not limited thereto. A plurality of vectors representing the coordinates indicated by the magnetic data $s_1$ to $s_N$ after conversion with the optimal central point $c_{EOP}$ as the start point, i.e. a vector $(s_i - c_{EOP})$ to a vector $(s_N - c_{EOP})$, may be applied as the plurality of input coordinates. In this case, it is possible to decrease the amount of data used in the distortion decision process, to save the size of a memory necessary for the process, and to improve processing speed.

(6) Sixth Modification

Although, in the above-described embodiments and modifications, the initial ellipsoid generation unit 310 calculates the coefficient matrix of each of the three ellipsoids (the first ellipsoid $V_{xx}$, the second ellipsoid $V_{yy}$, and the third ellipsoid $V_{zz}$) and the coordinates of the central point thereof, the present invention is not limited thereto. The initial ellipsoid generation unit 310 may calculate the coefficient matrix of each of two ellipsoids selected from among the first ellipsoid $V_{xx}$, the second ellipsoid $V_{yy}$, and the third ellipsoid $V_{zz}$ and the coordinates of the central point thereof. In this case, the initial ellipsoid generation unit 310 may include at least two selected from among the first ellipsoid generation unit 311, the second ellipsoid generation unit 312, and the third ellipsoid generation unit 313.

As described with reference to FIG. 13, it is possible to determine whether or not it is difficult to specify the shape of the ellipsoid from the coordinates indicated by the magnetic data $q_1$ to $q_N$ by evaluating to what extent the shapes of two ellipsoids selected from among the first ellipsoid $V_{xx}$, the second ellipsoid $V_{yy}$, and the third ellipsoid $V_{zz}$ are different from each other (specifically, the distance between two central points of the two ellipsoids). If the initial ellipsoid generation unit 310 calculates the coefficient matrix of each of at least two ellipsoids selected from among the first ellipsoid $V_{xx}$, the second ellipsoid $V_{yy}$, and the third ellipsoid $V_{zz}$ and the coordinates of the central point thereof, therefore, it is possible to prevent generation of an improper initial ellipsoidal correction matrix $T_O$. Also, in a case where the initial ellipsoid generation unit 310 calculates the coefficient matrix of each of two ellipsoids and the coordinates of the central point thereof, it is possible to reduce calculation load as compared with a case of calculating the coefficient matrix of each of three ellipsoids and the coordinates of the central point thereof.

Meanwhile, in a case where the initial ellipsoid generation unit 310 calculates the coefficient matrix of each of two ellipsoids and the coordinates of the central point thereof, the initial correction value generation unit 330 may calculate the initial ellipsoidal correction matrix $T_O$ based on the coefficient matrix of at least one of the two ellipsoids. In the same manner, the initial correction value generation unit 330 may calculate the coordinates of the initial central point $c_{EO}$ based on the central point of at least one of the two ellipsoids.

(7) Seventh Modification

Although, in the above-described embodiments and modifications, the initial ellipsoidal central point decision unit 322 decides whether or not all of the distances between three central points, such as the central point $c_{xx}$, the central point $c_{yy}$, and the central point $c_{zz}$, are equal to or less than the first threshold value $\Delta c$ (whether or not the second condition is satisfied), the present invention is not limited to such a decision method. The initial ellipsoidal central point decision unit 322 may decide whether or not the distance between two central pointes selected from among the central point $c_{xx}$, the central point $c_{yy}$, and the central point $c_{zz}$ is equal to or less than the first threshold value $\Delta c$.

For example, in a case where the initial ellipsoid generation unit 310 calculates the coordinates of the central points (for example, the central point $c_{xx}$ and the central point $c_{yy}$) of two ellipsoids (for example, the first ellipsoid $V_{xx}$ and the second ellipsoid $V_{yy}$) selected from among the first ellipsoid $V_{xx}$, the second ellipsoid $V_{yy}$, and the third ellipsoid $V_{zz}$ as in the sixth modification, the initial ellipsoidal central point decision unit 322 may decide whether or not the distance between two central pointes $c_{xx}$ and $c_{yy}$ is equal to or less than the first threshold value $\Delta c$.

It is possible to determine whether or not it is difficult to specify the shape of the ellipsoid from the distribution pattern of the coordinates indicated by the magnetic data $q_1$ to $q_N$ even through the above-mentioned decision, and therefore, it is possible to prevent the generation of an improper initial ellipsoidal correction matrix $T_O$.

What is claimed is:

1. A geomagnetism measurement apparatus mounted in an instrument containing a part having a soft magnetic material, the geomagnetism measurement apparatus comprising:
a three-dimensional magnetic sensor configured to detect magnetic components in three directions, the magnetic components being influenced by a magnetic field produced by the soft magnetic material, and wherein the three-dimensional magnetic sensor is configured to output magnetic data representing a vector of three-dimension composed of the detected magnetic components; and
a central processing unit configured to execute program instructions to realize a plurality of functional sections comprising:
an ellipsoid generation section configured to calculate coordinates representing an ellipsoidal central point of each of at least two ellipsoids selected from among a first ellipsoid, a second ellipsoid, and a third ellipsoid, each of which has a different shape, wherein coordinates indicated by a plurality of the magnetic data are distributed in the vicinity of a surface of each of the at least two ellipsoids;
an ellipsoidal central point decision section configured to decide whether or not a distance between the coordinates representing the ellipsoidal central points of the at least two ellipsoids is equal to or less than a threshold value; and
a correction value generation section configured to calculate an ellipsoidal correction matrix for converting coordinates on an ellipsoid into coordinates on a sphere based on a coefficient matrix representing a shape of the at least one of the at least two ellipsoids and also configured to calculate coordinates of a central point based on the coordinates representing the ellipsoidal central point of the at least one ellipsoid, using values of the ellipsoidal correction matrix and the central point to calculate a direction of the geomagnetism based on the magnetic data outputted from the three-dimensional magnetic sensor, in accordance with a decision result of the ellipsoidal central point decision section.

2. The geomagnetism measurement apparatus according to claim 1, wherein the ellipsoid generation section is configured to assume that the coordinates indicated by the magnetic data probabilistically distribute in the vicinity of an ellipsoid and to assume that the ellipsoid is expressed by an ellipsoidal equation comprising a term representing a square of a first axis component, a term representing a square of a second axis component and a term representing a square of a third axis component, and wherein the ellipsoid generation section comprises at least two selected from among: a first ellipsoid generation section configured to calculate the coordinates representing the ellipsoidal central point of the first ellipsoid such as to minimize each of an error between a value obtained by substituting each of the coordinates indicated by the magnetic data into terms of the ellipsoidal equation excluding the term representing the square of the first axis component and a square value of the first axis component of each of the coordinates indicated by the magnetic data; a second ellipsoid generation section configured to calculate the coordinates representing the ellipsoidal central point of the second ellipsoid such as to minimize each of an error between a value obtained by substituting each of the coordinates indicated by the magnetic data into terms of the ellipsoidal equation excluding the term representing the square of the second axis component and a square value of the second axis component of each of the coordinates indicated by the magnetic data; and a third ellipsoid generation section configured to calculate the coordinates representing the ellipsoidal central point of the third ellipsoid such as to minimize each of an error between a value obtained by substituting each of the coordinates indicated by the magnetic data into terms of the ellipsoidal equation excluding the term representing the square of the third axis component and a square value of the third axis component of each of the coordinates indicated by the magnetic data.

3. The geomagnetism measurement apparatus according to claim 1, wherein the plurality of functional sections further include an optimal ellipsoidal correction value generation section configured to set a variable vector of three-dimension indicating a start point and a first variable vector of three-dimension defined as a vector which has the start point and an end point which means the coordinates indicated by the magnetic data, and configured to set a variable matrix and a second variable vector of three-dimension obtained by converting the first variable vector using the variable matrix so that coordinates of the second variable vector are defined as data after conversion, wherein the optimal ellipsoidal correction value generation section is further configured to set an ellipsoidal optimization function which represents an error between the coordinates indicated by a plurality of the data after conversion and a spherical surface having a center corresponding to the start point indicated by the variable vector and which contains components of the variable matrix and components of the variable vector as variables, wherein the optimal ellipsoidal correction value generation section is configured to apply components of the ellipsoidal correction matrix and the coordinates of the central point calculated by the correction value generation section to the variables of the ellipsoidal optimization function as initial values, and then configured to sequentially update the variables of the ellipsoidal optimization function so as to calculate an optimal ellipsoidal correction matrix for converting coordinates on an ellipsoid to coordinates on a sphere and also to calculate coordinates indicating an optimal central point as a solution which minimizes the ellipsoidal optimization function; and wherein the plurality of functional sections further include a geomagnetism calculation section configured to convert a vector obtained by subtracting a vector of three-dimension which represents coordinates indicated by the magnetic data from a vector of three-dimension which represents coordinates indicated by the optimal central point using the optimal ellipsoidal correction matrix so as to calculate a direction of the geomagnetism.

4. The geomagnetism measurement apparatus according to claim 1, wherein the plurality of functional sections further include a geomagnetism calculation section configured to convert a vector obtained by subtracting a vector of three-dimension which represents coordinates indicated by the magnetic data from a vector of three-dimension which represents coordinates indicated by the central point generated by the correction value generation section using the ellipsoidal correction matrix also generated by the correction value generation section so as to calculate a direction of the geomagnetism.

5. The geomagnetism measurement apparatus according to claim 1, wherein the plurality of functional sections further include an ellipsoidal coefficient matrix decision section configured to decide whether or not the coefficient matrix is a positive definite, wherein the correction value generation section is configured to calculate the ellipsoidal correction matrix and to calculate the coordinates of the central point in accordance with a decision result of the ellipsoidal coefficient matrix decision section as well as the decision result of the ellipsoidal central point decision section.

6. The geomagnetism measurement apparatus according to claim 5, wherein the correction value generation section is configured to calculate the ellipsoidal correction matrix and to calculate the coordinates of the central point in case that the ellipsoidal coefficient matrix decision section decides that the coefficient matrix is a positive definite and in case that the ellipsoidal central point decision section decides that a distance between the coordinates representing the ellipsoidal central points of the at least two ellipsoids is equal to or less than the threshold value.

7. The geomagnetism measurement apparatus according to claim 1, further comprising a storage unit configured to store the magnetic data sequentially output from the three-dimensional magnetic sensor, and wherein coordinates indicated by a plurality of the magnetic data stored in the storage unit are distributed in the vicinity of a surface of each of the at least two ellipsoids.

8. A geomagnetism measurement method comprising:
providing an instrument containing a part having a soft magnetic material and a three-dimensional magnetic sensor configured to detect magnetic components in three directions, the magnetic components being influenced by a magnetic field produced by the soft magnetic material, and wherein the three-dimensional magnetic sensor is configured to output magnetic data representing a vector of three-dimension composed of the detected magnetic components;
calculating coordinates representing an ellipsoidal central point of each of at least two ellipsoids selected from among a first ellipsoid, a second ellipsoid, and a third ellipsoid, each of which has a different shape, wherein coordinates indicated by a plurality of the magnetic data are distributed in the vicinity of a surface of each of the at least two ellipsoids;
deciding whether or not a distance between the coordinates representing the ellipsoidal central points of the at least two ellipsoids is equal to or less than a threshold value to provide a decision result;
calculating an ellipsoidal correction matrix for converting coordinates on an ellipsoid into coordinates on a sphere based on a coefficient matrix representing a shape of the at least one of the at least two ellipsoids in accordance with the decision result;
calculating coordinates of a central point based on the coordinates representing the ellipsoidal central point of the at least one ellipsoid in accordance with the decision result; and
using values of the ellipsoidal correction matrix and the central point to calculate a direction of the geomagnetism based on the magnetic data outputted from the three-dimensional magnetic sensor.

9. An instrument, comprising:
a geomagnetism measurement apparatus; and
a part having a soft magnetic material; and
wherein the geomagnetism measurement apparatus includes:
a three-dimensional magnetic sensor configured to detect magnetic components in three directions, the magnetic components being influenced by a magnetic field produced by the soft magnetic material, and wherein the three-dimensional magnetic sensor is configured to output magnetic data representing a vector of three-dimension composed of the detected magnetic components; and
a central processing unit configured to execute program instructions to realize a plurality of functional sections comprising:
an ellipsoid generation section configured to calculate coordinates representing an ellipsoidal central point of each of at least two ellipsoids selected from among a first ellipsoid, a second ellipsoid, and a third ellipsoid, each of which has a different shape, wherein coordinates indicated by a plurality of the magnetic data are distributed in the vicinity of a surface of each of the at least two ellipsoids;
an ellipsoidal central point decision section configured to decide whether or not a distance between the coordinates representing the ellipsoidal central points of the at least two ellipsoids is equal to or less than a threshold value; and
a correction value generation section configured to calculate an ellipsoidal correction matrix for converting coordinates on an ellipsoid into coordinates on a sphere based on a coefficient matrix representing a shape of the at least one of the at least two ellipsoids and also configured to calculate coordinates of a central point based on the coordinates representing the ellipsoidal central point of the at least one ellipsoid, using values of the ellipsoidal correction matrix and the central point to calculate a direction of the geomagnetism based on the magnetic data outputted from the three-dimensional magnetic sensor, in accordance with a decision result of the ellipsoidal central point decision section.

10. The instrument according to claim 9, wherein the instrument includes a mobile device, and wherein the geomagnetism measurement apparatus and the part having the soft magnetic material are included within the mobile device.

* * * * *